United States Patent [19]

Bistry et al.

[11] Patent Number: 5,940,859
[45] Date of Patent: *Aug. 17, 1999

[54] EMPTYING PACKED DATA STATE DURING EXECUTION OF PACKED DATA INSTRUCTIONS

[75] Inventors: David Bistry, Cupertino; Larry Mennemeier, Boulder Creek, both of Calif.; Alexander D. Peleg, Haifa, Israel; Carole Dulong, Saratoga, Calif.; Eiichi Kowashi, Ryugasaki, Japan; Millind Mittal, South San Francisco, Calif.; Benny Eitan, Haifa, Israel

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/574,891

[22] Filed: Dec. 19, 1995

[51] Int. Cl.⁶ .................................................. G06F 12/00
[52] U.S. Cl. ..................... 711/147; 395/563; 395/800.43; 395/570
[58] Field of Search .................................. 395/800, 377, 395/563, 570, 800.01, 800.43; 711/147

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,229,801 | 10/1980 | Whipple | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |

(List continued on next page.)

FOREIGN PATENT DOCUMENTS 9301543  7/1992  WIPO.

OTHER PUBLICATIONS

*i860™ Microprocessor Family Programmer's Reference Manual*, Intel Corporation (1992) Ch. 2, 9, 10, 11.
J. Shipnes, *Graphics Processing with the 88110 RISC Microprocessor*, IEEE (1992), pp. 169–174.
*MC88110 Second Generation RISC Microprocessor User's Manual*, Motorola Inc. (1991).

(List continued on next page.)

*Primary Examiner*—Meng-Ai T. An
*Assistant Examiner*—Walter D. Davis, Jr.
*Attorney, Agent, or Firm*—Blakely, Sokoloff, Taylor & Zafman LLP

[57] ABSTRACT

A method in a computer system which includes receiving a first instruction which indicates indicates termination of execution of instructions which operate upon packed data stored in a first storage area. The first storage area is used for modifying data responsive to execution of floating point instructions. A plurality of tags is associated with the first storage area indicating that locations in the first storage area are either empty or non-empty responsive to the execution of the floating point instructions which modify data contained in the first storage area. Responsive to the receiving of the first instruction which indicates termination of execution of instructions which operate upon the packed data stored in the first storage area, the method sets only the plurality of tags to an empty state. In different embodiments, setting of the plurality of tags to a non-empty state occurs responsive to receiving a second instruction. The second instruction (or instructions) specifies an operation upon packed data stored in the first storage area. The setting of the plurality of tags indicates execution of instructions which operate upon the packed data. This method advantageously provides a means for clearing the packed data state at the end of blocks of packed data instructions to leave the floating point state in a clear condition for subsequent operations (e.g. floating point calculations).

25 Claims, 20 Drawing Sheets

U.S. PATENT DOCUMENTS

| | | | |
|---|---|---|---|
| 4,989,168 | 1/1991 | Kuroda et al. | 364/715.09 |
| 4,992,938 | 2/1991 | Cocke et al. | 364/200 |
| 5,008,812 | 4/1991 | Bhandarkar et al. | 364/200 |
| 5,095,457 | 3/1992 | Jeong | 364/758 |
| 5,187,679 | 2/1993 | Vassiliadis | 364/786 |
| 5,241,635 | 8/1993 | Papadopoulos et al. | 395/377 |
| 5,267,350 | 11/1993 | Matsubara et al. | 395/381 |
| 5,467,473 | 11/1995 | Kahle et al. | 395/800 |
| 5,481,719 | 1/1996 | Ackerman et al. | 303/796 |
| 5,499,352 | 3/1996 | Clift et al. | 395/412 |
| 5,519,841 | 5/1996 | Sager et al. | 395/412 |
| 5,522,051 | 5/1996 | Sharangpani et al. | 395/375 |
| 5,535,397 | 7/1996 | Durante et al. | 85/409 |
| 5,537,606 | 7/1996 | Byrne et al. | 395/800 |
| 5,546,554 | 8/1996 | Yung et al. | 395/413 |
| 5,560,035 | 9/1996 | Garg et al. | 465/239 |
| 5,634,118 | 5/1997 | Blomgren | 395/567 |
| 5,651,125 | 7/1997 | Witt et al. | 395/394 |
| 5,677,862 | 10/1997 | Peleg et al. | 364/754 |
| 5,687,336 | 11/1997 | Shen et al. | 395/378 |
| 5,701,508 | 12/1997 | Glew et al. | 395/800.23 |
| 5,721,892 | 2/1998 | Peleg et al. | 395/562 |
| 5,760,792 | 6/1998 | Holt et al. | 345/509 |

OTHER PUBLICATIONS

*Errata to MC88110 Second Generation RISC Microprocessor User's Manual,* Motorola Inc. (1992), pp. 1–11.

*MC88110 Programmer's Reference Guide,* Motorola Inc. (1992), pp. 1–4.

*i860 ™ Microprocessor Family Programmer's Reference Manual,* Intel Corporation (1992), Ch. 1, 3, 8, 12.

R. B. Lee, *Accelerating Multimedia With Enhanced Microprocessors,* IEEE Micro (Apr. 1995), pp. 22–32.

*TMS320C2x User's Guide,* Texas Instruments (1993) pp 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video,* Microprocessor Report (Jan. 1994), pp. 16, 17.

SPARC Technology Business, *UltraSPARC Multimedia Capabilities On–Chip Support for Real–Time Video and Advanced Graphics,* Sun Microsystems (Sep. 1994).

Y. Kawakami et al., *LSI Applications: A Single–Chip Digital Signal Processor for Voiceband Applications,* Solid State Circuits Conference, Digest of Technical Papers; IEEE International (1980).

B. Case, *Philips Hopes to Displace DSPs with VLIW,* Microprocessor Report (Dec. 94), pp. 12–18.

N. Margulis, *i860 Microprocessor Architecture,* McGraw–Hill, Inc. (1990) Ch. 6, 7, 8, 10, 11.

*Pentium Processor User's Manual, vol. 3: Architecture and Programming Manual,* Intel Corporation (1993), Ch. 1, 3, 4, 6, 8, and 18.

Case a: TOS = 0
Case b: TOS = 2
Outer circle = FP register's logical location relative to TOS
Inner circle = FP/MM tags = MM register's location = FP register's physical location

EMPTYING PACKED DATA STATE DURING EXECUTION OF PACKED DATA INSTRUCTIONS

BACKGROUND OF THE INVENTION

1. Field of the Invention

The invention relates to the field of computer systems. More specifically, the invention relates to the execution of floating point and packed data instructions by a processor.

2. Background Information

In a typical computer system, one or more processors operate on data values represented by a large number of bits (e.g., 16, 32, 64, etc.) to produce a result in response to a programmed instruction. For example, the execution of an add instruction will add a first data value and a second data value and store the result as a third data value. However, multimedia applications (e.g., applications targeted at computer supported cooperation (CSC—the integration of teleconferencing with mixed media data manipulation), 2D/3D graphics, image processing, video compression/ decompression, recognition algorithms and audio manipulation) require the manipulation of large amounts of data which is often represented by a smaller number of bits. For example, multimedia data is typically represented as 64-bit numbers, but only a handful of bits may carry the significant information.

To improve efficiency of multimedia applications (as well as other applications that have the same characteristics), prior art processors provide packed data formats. A packed data format is one in which the bits used to represent a single value are broken into a number of fixed sized data elements, each of which represents a separate value. For example, data in a 64-bit register may be broken into two 32-bit elements, each of which represents a separate 32-bit value.

Hewlett-Packard's basic 32-bit architecture machine took this approach to implementing multi-media data types. That is, the processor utilized its 32-bit general purpose integer registers in parallel to implement 64-bit data types. The main drawback of this simple approach is that it severely restricts the available register space. Additionally, the performance advantage of operating on multimedia data in this manner in view of the effort required to extend the existing architecture is considered minimal.

A somewhat similar approach adopted in the Motorola® 88110™ processor is to combine integer register pairs. The idea of pairing two 32-bit registers involves concatenating random combinations of specified registers for a single operation or instruction. Once again, however, the chief disadvantage of implementing 64-bit multi-media data types using paired registers is that there are only a limited number of register pairs that are available. Short of adding additional register space to the architecture, another technique of implementing multimedia data types is needed.

One line of processors which has a large software and hardware base is the Intel Architecture family of processors, including the Pentium® processor, manufactured by Intel Corporation of Santa Clara, Calif. FIG. 1 shows a block diagram illustrating an exemplary computer system 100 in which the Pentium processor is used. For a more detailed description of the Pentium processor than 20 provided here, see *Pentium Processor's Users Manual—Volume 3: Architecture and Programming Manual,* 1994, available from Intel Corporation of Santa Clara, Calif. The exemplary computer system 100 includes a processor 105, a storage device 110, and a bus 115. The processor 105 is coupled to the storage device 110 by the bus 115. In addition, a number of user input/output devices, such as a keyboard 120 and a display 125, are also coupled to the bus 115. A network 130 may also be coupled to bus 115. The processor 105 represents the Pentium processor. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed as bus controllers).

FIG. 1 also illustrates that the storage device 110 has stored therein an operating system 132 for execution on the processor 105. Of course, the storage device 110 preferably contains additional software (not shown). FIG. 1 additionally illustrates that the processor 105 includes a floating point unit 135 and a floating point status register 155 (the notation "FP" is used herein to refer to the term "floating point"). Of course, the processor 105 contains additional circuitry which is not necessary to understanding the invention.

The floating point unit 135 is used for storing floating point data and includes a set of floating point registers (also termed as the floating point register file) 145, a set of tags 150, and a floating point status register 155. The set of floating point registers 145 includes eight registers labeled R0 to R7 (the notation Rn is used herein to refer to the physical location of the floating point registers). Each of these eight registers is 80 bits wide and contains a sign field (bit 79), an exponent field (bits [78:64]), and a mantissa field (bits [63:0]). The floating point unit 135 operates the set of floating point registers 145 as a stack. In other words, the floating point unit 135 includes a stack referenced register file. When a set of register is operated as a stack, operations are performed with reference to the top of the stack, rather than the physical locations of the registers in the set of floating point registers 145 (the notation STn is used herein to refer to the relative location of the logical floating point register n to the top of the stack). The floating point status register 155 includes a top of stack field 160 that identifies which register in the set of floating point registers 145 is currently at the top of the floating point stack. In FIG. 1, the top of stack indication identifies a register 165 at physical location R4 as the top of the stack.

The set of tags 150 includes 8 tags and is stored in a single register. Each tag corresponds to a different floating point register and comprises two bits. As shown in FIG. 1, tag 170 corresponds to register 165. A tag identifies information concerning the current contents of the floating point register to which the tag corresponds—00=valid; 01=zero; 10=special; and 11=empty. These tags are used by the floating point unit 135 to distinguish between empty and non-empty register locations. Thus, the tags can be thought of as identifying two states: empty which is indicated by 11, and non-empty which is indicated by any one of 00, 01, or 10.

These tags may also be used for servicing events. An "event" is any action or occurrence to which a computer system might respond, including hardware interrupts, software interrupts, exceptions, faults, traps, aborts, machine checks, assists, and debug events. Upon receiving an event, the processor's event handling mechanism causes the processor to interrupt execution of the current process, store the interrupted process'execution environment (i.e., the information necessary to resume execution of the interrupted process), and invoke the appropriate event handler to service the event. After servicing the event, the event handler causes the processor to resume the interrupted process using the process' previously stored execution environment. Programmers of event handlers may use these tags to check the contents of the different floating registers in order to better service an event.

While each of the tags have been described as containing two bits, alternative embodiments could store only one bit for each tag. Each of these one bit tags identifying either empty or non-empty. In such embodiments, these one bit tags may be made to appear to the user as comprising two bits by determining the appropriate two bit tag value when the tag values are needed.

The status register 140 includes an EM field 175 and a TS field 180 for respectively storing an EM indication and a TS indication. If the EM indication is 1 and/or the TS indication is 1, the processor hardware causes a trap to the operating system upon execution of a floating point instruction by generating a "device not available" exception. According to a software convention, the EM and TS indications are respectively used for emulating floating point instructions and implementing multi-tasking. However, the use of these indications is purely a software convention. Thus, either or both indications may be used for any purpose. For example, the EM indication may be used for implementing multitasking.

According to the software convention described above, the EM field 175 is used for storing a floating point emulate indication ("EM indication") that identifies whether the floating point unit should be emulated using software. A series of instructions or a single instruction (e.g. CPUID) is typically executed when a system is booted to determine if a floating point unit is present and to alter the EM indication if necessary. Thus, the EM indication is typically altered to indicate the floating point unit should be emulated when the processor does not contain a floating point unit. While in one implementation the EM indication equals 1 when the floating point unit should be emulated, alternative implementations could use other values.

Through the use of the operating system, many processors are capable of multitasking several processes (referred to herein as tasks) using techniques such as cooperative multitasking, time-slice multitasking, etc. Since a processor can execute only one task at a time, a processor must divide its processing time between the various tasks by switching between the various task. When a processor switches from one task to another, a task switch (also termed as a "context switch" or a "process switch") is said to have occurred. To perform a task switch, the processor must stop execution of one task and either resume or start execution of another task. There are a number of registers (the floating point registers included) whose contents must be preserved to resume execution of a task after a task switch. The contents of these registers at any given time during the execution of a task is referred to as the "register state" of that task. While multitasking several processes, a task's "register state" is preserved during the execution of other processes by storing it in a data structure (referred to as the task's "context structure") that is contained in a memory external to the processor. When execution of a task is to be resumed, the task's register state is restored (e.g., loaded back into the processor) using the task's context structure.

The preservation and restoration of a task's register state can be accomplished using a number of different techniques. For example, one operating system stores the previous task's entire register state and restores the next task's entire register state upon each task switch. However, since it is time consuming to store and restore entire register states, it is desirable to avoid storing and/or restoring any unnecessary portions during task switches. If a task does not use the floating point unit, it is unnecessary to store and restore the contents of the floating point registers as part of that task's register state. To this end, the TS indication has been historically used by operating systems, according to the previously described software convention, to avoid storing and restoring the contents of the floating point registers during task switches (commonly referred to as "partial context switching" or "on demand context switching").

The use of the TS indication to implement partial context switching is well known. However, for purposes of the invention, it is relevant that the attempted execution of a floating point instruction while the TS indication indicates a partial context switch was performed (i.e., that floating point unit is "unavailable" or "disabled") results in a "device not available" exception. In response to this exception, the event handler, executing on the processor, determines if the current task is the owner of the floating point unit (if data stored in the floating point unit belongs to the current task or a previously executed task). If the current task is not the owner, the event handler causes the processor to store the contents of the floating point registers in the previous task's context structure, restore the current task's floating point state (if available), and identifies the current task as the owner. However, if the current task is the owner of the floating point unit, the current task was the last task to use the floating point unit (the floating point portion of the current task's register state is already stored in the floating point unit) and no action with respect to the floating point unit need be taken, and TS would not be set and no exception will occur. The execution of the handler also causes the processor to alter the TS indication to indicate the floating point unit is owned by the current task (also termed as "available" or "enabled").

Upon completion of the event handler, execution of the current task is resumed by restarting the floating point instruction that caused the device not available exception. Since the TS indication was altered to indicate the floating point unit is available, the execution of following floating point instructions will not result in additional device not available exceptions. However, during the next partial context switch, the TS indication is altered to indicate a partial context switch was performed. Thus, when and if execution of another floating point instruction is attempted, another device not available exception will be generated and the event handler will again be executed. In this manner, the TS indication permits the operating system to delay, and possibly avoid, the saving and loading of the floating point register file. By doing so, task switch overhead is reduced by reducing the number of registers which must be saved and loaded.

While one operating system is described in which the floating point state is not stored or restored during task switches, alternative implementations can use any number of other techniques. For example, as previously mentioned above, an operating system could be implemented to always store and restore the entire register state on each task switch.

In addition to the different times at which the floating point state of a process can be stored (e.g., during context switches, in response to a device not available event, etc.), there are also different techniques for storing the floating point state. For example, an operating system can be implemented to store the entire floating point state (referred to herein as a "simple task switch"). Alternatively, an operating system can be implemented to store the contents of only those floating point registers whose corresponding tags indicate a non-empty state (referred to herein as a "minimal task switch"). In doing so, the operating system stores the contents of only those floating point registers which contain useful data. In this manner, the overhead for storing the floating point state may be reduced by reducing the number of registers which must be saved.

FIGS. 2 is a flow diagram illustrating the execution of an instruction by the Pentium processor. The flow diagram starts at step 200; from which flow passes to step 205.

As shown in step 205, a set of bits is accessed as an instruction and flow passes to step 210. This set of bits includes an opcode that identifies the operation(s) to be performed by the instruction.

At step 210, it is determined whether the opcode is valid. If the opcode is not valid, flow passes to step 215. Otherwise, flow passes to step 220.

As shown in step 215, an invalid opcode exception is generated and the appropriate event handler is executed. This event handler may be implemented to cause the processor to display a message, abort execution of the current task, and go on to execute other tasks. Of course, alternative embodiments may implement this event handler in any number of ways.

At step 220, it is determined whether the instruction is a floating point instruction. If the instruction is not a floating point instruction, flow passes to step 225. Otherwise, flow passes to step 230.

As shown in step 225, the processor executes the instruction. Since this step is not necessary to describe the invention, it is not further described here.

As shown in step 230, it is determined whether the EM indication is equal to 1 (according to the described software convention, if the floating point unit should be emulated) and whether the TS indication is equal to 1 (according to the described software convention, if a partial context switch was performed). If the EM indication and/or the TS indication are equal to 1, flow passes to step 235. Otherwise, flow passes to step 240.

At step 235, the "device not available" exception is generated and the corresponding event handler is executed. In response to this event, the corresponding event handler can be implemented to poll the EM and TS indications. If the EM indication is equal to 1, then the event handler can be implemented to cause the processor to execute the instruction by emulating the floating point unit and to resume execution at the next instruction (the instruction which logically follows the instruction received in step 205). If the TS indication is equal to 1, then the event handler can be implemented to function as previously described with reference to partial context switches (to store the contents of the floating point unit and restore the correct floating point state if required) and to cause the processor to resume execution by restarting execution of the instruction received in step 205. Of course, alternative embodiments may implement this event handler in any number of ways.

If certain numeric errors are generated during the execution of a floating point instruction, those errors are held pending until the attempted execution of the next floating point instruction whose execution can be interrupted to service the pending floating point numeric errors. As shown in step 240, it is determined whether there are any such pending errors. If there are any such pending errors, flow passes to step 245. Otherwise, flow passes to step 250.

At step 245, a pending floating point error event is generated. In response to this event, the processor determines if the floating point error is masked. If so, the processor attempts to handle the event internally using microcode and the floating point instruction is "micro restarted." The term micro restart refers to the technique of servicing an event without executing any non-microcode handlers (also termed as operating system event handlers). Such an event is referred to as internal event (also termed as a software invisible event) because the event is handled internally by the processor, and thus, does not require the execution of any external operating system handlers. In contrast, if the floating point error is not masked, the event is an external event (also termed as a "software visible events") and the event's corresponding event handler is executed. This event handler may be implemented to service the error and cause the processor to resume execution by restarting execution of the instruction received in step 205. This technique of restarting an instruction is referred to as a "macro restart" or an "instruction level restart. Of course, alternative embodiments may implement this non-microcode event handler in any number of ways.

As shown in step 250, the floating point instruction is executed. During such execution, the tags are altered as necessary, any numeric errors that can be serviced now are reported, and any other numeric errors are held pending.

One limitation of the Intel Architecture processor family (including the Pentium processor), as well as certain other general purpose processors, is that they do not include a set of instructions for operating on packed data. Thus, it is desirable to incorporate a set of instructions for operating on packed data into such processors in a manner which is compatible with existing software and hardware. Furthermore, it is desirable to produce new processors that support a set of packed data instructions and that are compatible with existing software, including operating systems.

SUMMARY

A method in a computer system which includes receiving a first instruction which indicates indicates termination of execution of instructions which operate upon packed data stored in a first storage area. The first storage area is used for modifying data responsive to execution of floating point instructions. A plurality of tags is associated with the first storage area indicating that locations in the first storage area are either empty or non-empty responsive to the execution of the floating point instructions which modify data contained in the first storage area. Responsive to the receiving of the first instruction which indicates termination of execution of instructions which operate upon the packed data stored in the first storage area, the method sets only the plurality of tags to an empty state. In different embodiments, setting of the plurality of tags to a non-empty state occurs responsive to receiving a second instruction. The second instruction (or instructions) specifies an operation upon packed data stored in the first storage area. The setting of the plurality of tags indicates execution of instructions which operate upon the packed data. This method advantageously provides a means for clearing the packed data state at the end of blocks of packed data instructions to leave the floating point state in a clear condition for subsequent operations (e.g. floating point calculations).

The method can also include clearing a top of stack pointer responsive to the receiving the first instruction or the second instruction.

In implemented embodiments, the first storage area includes a mantissa portion and a corresponding exponent portion, and the packed data is packed in a mantissa portion of the first storage area. The method can further include the step of setting the corresponding exponent portion of the first storage area to a predetermined value responsive to the receiving of the second instruction which operates upon packed data stored in the first storage area.

Each of the plurality of tags can include two bits wherein the setting of only the plurality of tags to an empty state includes setting the two bits to a set state. The setting of only the plurality of tags to a non-empty state includes setting both of the two bits to other than the set state.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

According to one embodiment of the invention, this application describes a method and apparatus for executing different sets of instructions that cause a processor to perform different data type operations in a manner that is invisible to various operating system techniques, that promotes good programming practices, and that is invisible to existing software. To accomplish this, the different sets of instructions that cause a processor to perform different data type operations are executed on what at least logically appears to software as a single aliased register file. The data type operations performed as a result of executing the different sets of instructions may be of any type. For example, one set of instructions may cause the processor to perform scalar operations (floating point and/or integer) and another set of instruction may cause the processor to perform packed operations (floating point and/or integer). As another example, one set of instructions may cause the processor to perform floating point operations (scalar and/or packed) and another set of instruction may cause the processor to perform integer operations (scalar and/or packed). As another example, the single aliased register file can be operated as a stack referenced register file and as a flat register file. In addition, this application describes a method and apparatus for executing these different set of instructions using separate physical register files that logically appear to software as a single aliased register file. Furthermore, this application described a method and apparatus for executing these different set of instructions using a single physical register file.

For purposes of clarity, the invention will be described with reference to the execution of floating point instructions and packed data instructions (floating point and/or integer). However, it is to be understood that any number of different data type operations could be performed, and the invention is in no way limited to floating point and packed data operations.

Figure 3A:
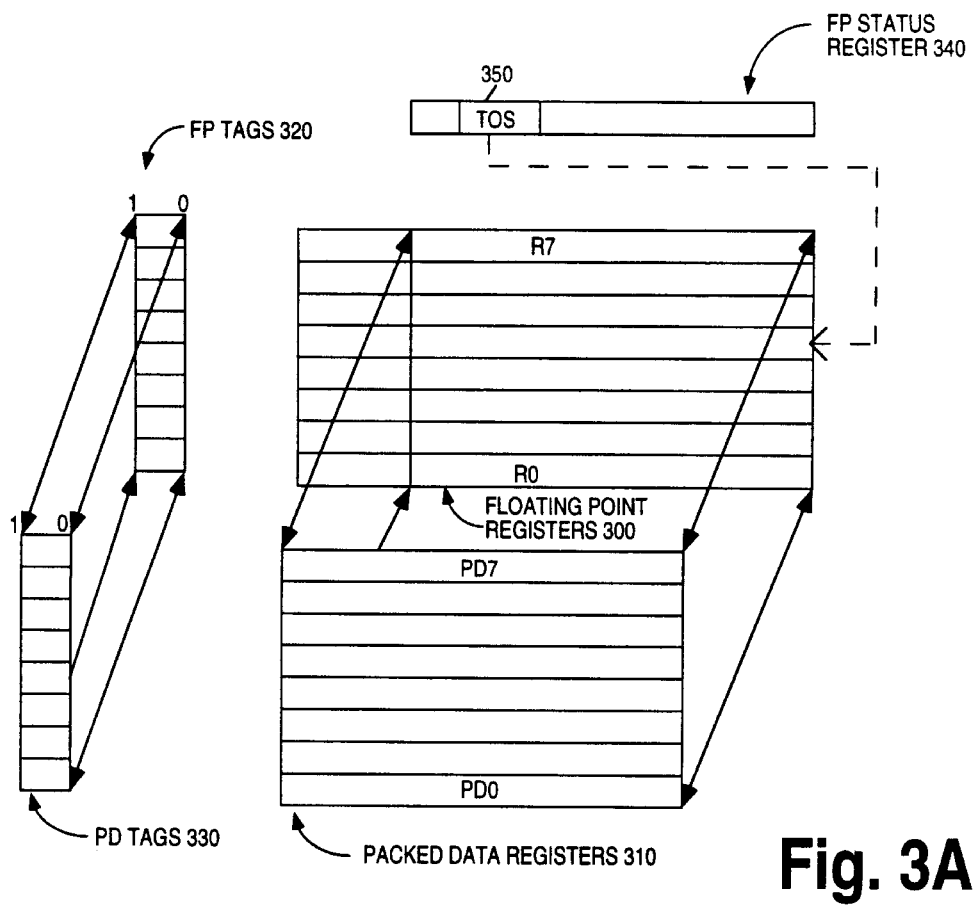
FIG. 3A is a functional diagram illustrating the aliasing of the packed data state and the floating point state according to one embodiment of the invention.

FIG. 3A is a functional diagram illustrating the aliasing of the packed data state and the floating point state according to one embodiment of the invention. FIG. 3A shows a set of floating point registers 300 for storing floating point data (referred to herein as the floating point state) and a set of packed data registers 310 for storing packed data (referred to herein as the packed data state). The notation PDn is used herein to refer to the physical locations of the packed data registers. FIG. 3A also shows that the packed data state is aliased on the floating point state. That is, the floating point instructions and the packed data instructions at least appear to software to be executed on the same set of logical registers. There are a number of techniques for implementing this aliasing, including using multiple separate physical register files or a single physical register file. Examples of such techniques will be later described with reference to FIGS. 4–13.

As previously described, existing operating systems are implemented to cause the processor to store the floating point state as a result of multi-tasking. Since the packed data state is aliased on the floating point state, these same operating systems will cause the processor to store any packed data state that is aliased on the floating point state. As a result, the invention does not require old operating system task switch routine(s) (of course, the task switch routines may be implemented as one or more event handlers) or event handlers be modified or new operating system event handlers be written. Therefore, a new or modified operating system need not be designed to store the packed data state when multitasking. As such, the cost and time required to develop such an operating system is not required. In addition, in one embodiment any events generated by the execution of the packed data instructions are serviced internally by the processor or mapped to existing events whose corresponding operating system event handlers can service the events. As a result, the packed data instructions are executed in a manner which is operating system invisible.

FIG. 3A also shows a set of floating point tags 320 and a set of packed data tags 330. The floating point tags 320 operate in a similar fashion to the tags 150 described with reference to FIG. 1. Thus, each tag includes two-bits which indicate whether the contents of the corresponding floating point register are empty or non-empty (e.g., valid, special or zero). The packed data tags 330 correspond to the packed data registers 310 and are aliased on the floating point tags 320. While each of the tags may be implemented using two bits, alternative embodiments could store only one bit for each tag. Each of these one bit tags identifying either empty or non-empty. In such embodiments, these one bit tags may be made to appear to software as comprising two bits by determining the appropriate two bit tag value when the tag values are needed. Operating systems that implement minimal task switching store out the contents of only those registers whose corresponding tags indicate the non-empty state. Since the tags are aliased, such operating system will store out any necessary packed data and floating point state. In contrast, operating systems that implement simple task switching will store out the entire contents of the logical aliased register file, regardless of the state of the tags.

Figure 1:
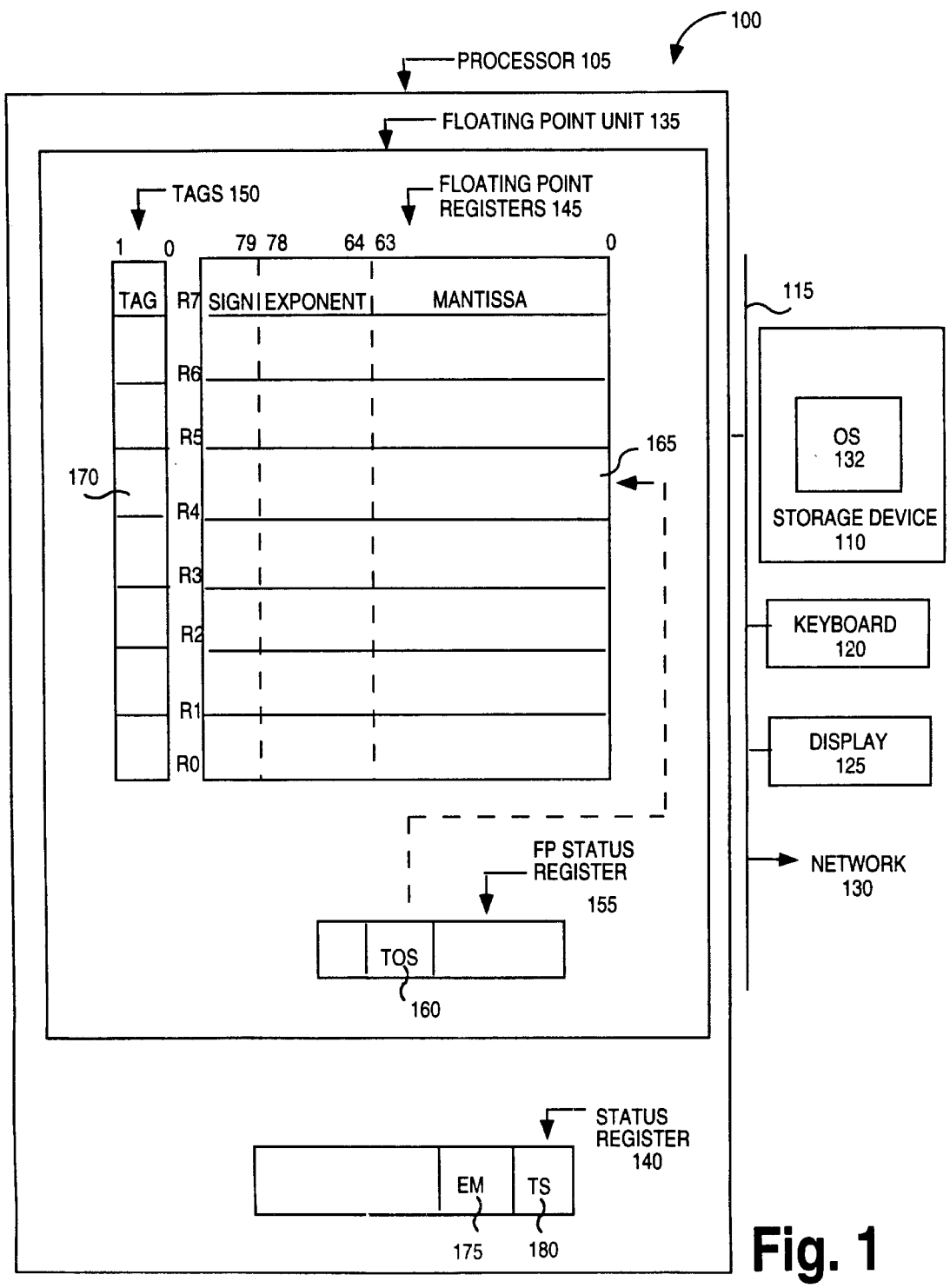
FIG. 1 shows a block diagram illustrating an exemplary computer system in which the Pentium processor is used.

In one embodiment, the floating point registers 300 are operated in a similar manner to the floating point registers 145 described in FIG. 1. Thus, FIG. 3A additionally shows a floating point status register 340 containing a top of stack field 350. The top of stack field 350 is used for storing a top of stack indication (TOS) for identifying one of floating point registers 300. When the floating point registers 300 are operated as a stack, operations are performed with reference to the top of stack register as opposed to the physical locations of the registers. In contrast, the packed data registers 310 are operated as a fixed register file (also termed as a direct access register file). Thus, the packed data instructions designate the physical locations of the registers to be used. The packed data registers 310 are mapped to the physical locations of the floating point registers 300, and this mapping does not change when the top of stack changes. As a result, it at least appears to software that a single logical register file exists that can be operated as a stack referenced register file or as a flat register file.

Figures 3B, 3C:
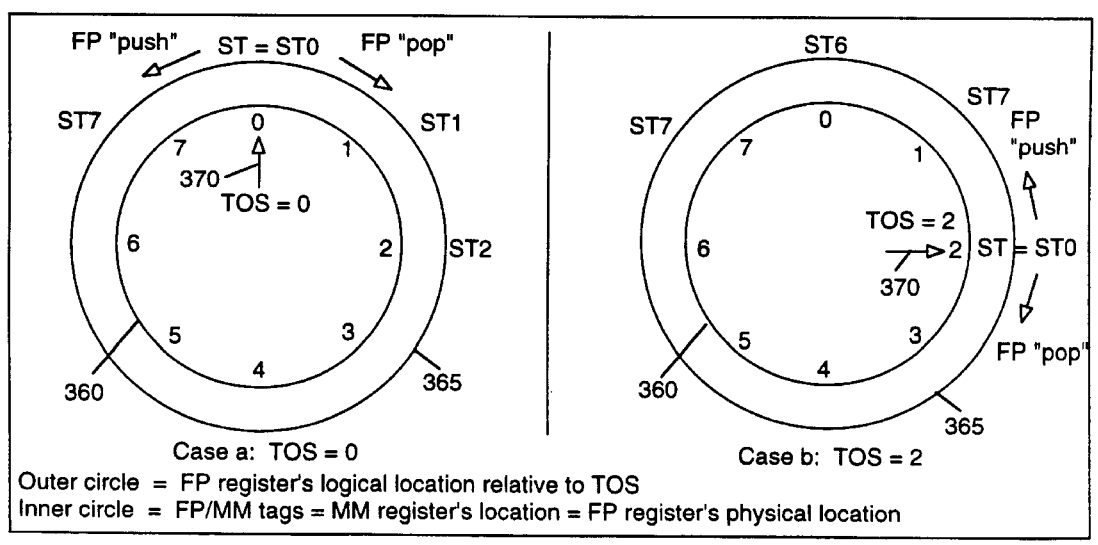
FIG. 3B and 3C illustrate the mapping of physical floating point and packed data registers with respect to the logical floating point registers.

FIGS. 3B and 3C illustrate the mapping of the aliased floating point registers 300 and floating point tags 320 with reference to the packed data registers 310 and the packed data tags 330 as shown in FIG. 3A. As discussed above, in the floating point environment, each register n is specified relative to the floating point register identified by the TOS pointer. Two cases are shown in FIGS. 3B and 3C. Each of the figures represents the relationship between the logical or programmer-visible floating point registers (stack) and the logical or programmer-visible packed data registers. The inner circle 360 shown in FIGS. 3B and 3C represents the physical floating point/packed data registers and corresponding tags, and the outer circle represents the logical floating point registers as referenced by the top of stack pointer 370. As shown in FIG. 3B, the top of stack pointer 370 points to the physical floating point/packed data register 0. Thus, there is a correspondence of the logical floating point registers and the physical floating point/packed data registers. As shown in the figure, as the top of stack pointer 370 is modified, by a floating point instruction which causes either a push or pop, the top of stack pointer 370 changes accordingly. A push is shown by the rotation of the top of stack pointer in a counterclockwise direction in the figure, and a floating point pop operation results in the top of stack pointer rotating in a clockwise direction.

In the example shown in FIG. 3C, the logical floating point register ST0 and the physical register 0 do not correspond. Thus, in the instance of FIG. 3C as illustrated, the top of stack pointer 370 points at physical floating point/packed data register 2, which corresponds with the logical floating point register ST0. All other logical floating point registers are accessed with reference to the TOS 370. While one embodiment has been described in which the floating point registers are operated as a stack and the packed data registers are operated as a fixed register file, alternative embodiments may implement these sets of registers in any fashion. In addition, while one embodiment has been described with reference to floating point and packed data operations, it is understood that this technique could be used to alias any fixed register file on any stack referenced register file, regardless of the type of operations performed thereon.

The packed data state can be aliased on any portion or all of the floating point state. In one embodiment, the packed data state is aliased on the mantissa fields of the floating point state. Furthermore, the aliasing can be full or partial. Full aliasing is used to refer to an embodiment in which the entire contents of the registers are aliased. Partial aliasing is further described with reference to FIG. 6A.

Figure 3D:
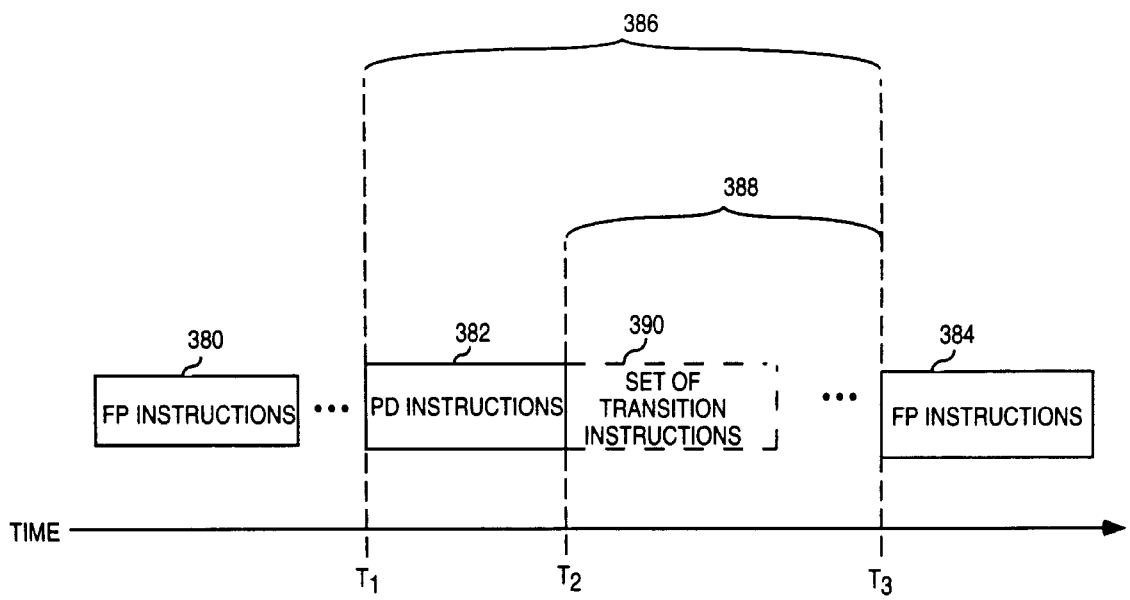
FIG. 3D illustrates an execution stream including packed data and floating point instructions.

FIG. 3D is a block diagram illustrating the execution of floating point and packed data instructions over time according to one embodiment of the invention. FIG. 3D shows, in chronological order of execution, a first set of floating point instructions 380, a set of packed data instructions 382, and a second set of floating point instructions 384. The execution of the set of packed data instructions 382 starts at time T1 and ends at time T2, while the execution of the set of floating point instruction starts at time T3. Other instructions may or may not be executed between the execution of said set of packed data instructions 382 and the second set of floating point instructions 384. A first interval 386 marks the time between time Ti and time T3, while a second interval 388 marks the time between T2 and T3.

Since the floating point and packed data states are stored in an aliased register file, the tags should be altered to empty before the execution of the second set of floating point instructions 384. Otherwise, a stack overflow exception could be generated. Thus, sometime during the first interval 386 the tags are altered to empty. This can be accomplished in a number of different ways. For example, an embodiment may accomplish this by: 1) causing the execution of the first packed data instruction in the set of packed data instructions 382 to alter the tags to the empty state; 2) causing the execution each packed data instruction in the set of packed data instructions 382 to alter the tags to the empty state; 3) altering the tags to the empty state upon attempting to execute the first floating point instruction whose execution modifies the aliased register file; etc. These embodiments remain operating system invisible to existing operating systems that support simple context switching (store and restore the entire register state on each task switch) because the packed data state will be stored and restored along with the rest of the register state.

In another embodiment, in order to remain compatible with operating systems that support simple and/or minimal context switches, the execution of the set of packed data instructions 382 results in the tags being altered to the non-empty state in the first interval 386 unless a set of transition instructions represented by block 390 is executed after time T2 and prior to time T3 (the time at which the second set of floating point instructions 384 is begun). For example, assume the set of packed data instructions 382 belongs to a task A. Also assume, that task A is interrupted by a full task switch (i.e., not a partial task switch) prior to the execution of the set of transition instructions 390. Since it performs a full task switch, the task switch handler will include floating point instructions (illustrated by the second set of floating point instructions 384, and referred to in this example as the "FP task switch routine") for storing the floating point/packed data state. Since the set of transition instructions 390 was not executed, the processor will alter the tags to the non-empty state sometime prior to the execution of the FP task switch routine. As a result, the FP task switch routine, whether minimal or simple, will store out the contents of the entire aliased register file (in this example, the packed data state of task A). In contrast, if the set of transition instructions 390 is executed, the processor alters the tags to the empty state sometime in the second interval 388. Thus, whether or not a task switch interrupts task A after the execution of the set of transition instructions 390, the processor will alter the tags to the empty state sometime prior to the execution of the second set of floating point instructions 384 (regardless of whether the second set of floating point instructions 384 belong to the task switch handler, task A, or another program).

As another example, again assume the set of packed data instructions 382 belongs to a task A and that task A is interrupted by a task switch prior to the execution of the set of transition instructions 390. However, this time the task switch is a partial task switch (i.e., the floating point/packed data state is not stored or restored). If no other tasks are executed that utilize floating point or packed data instructions, then the processor will eventually return to executing task A and the set of transition instructions 390 will be executed. However, if another task (e.g., task B) uses floating point or packed data instructions, the attempted execution of these instructions will cause an operating system handler call to store the floating point/packed data state of task A and restore the floating point/packed data state of task B. This handler will include the FP task switch routine (in this example, illustrated by the second set of floating point instructions 384) for storing the floating point/packed data state. Since the set of transition instructions 390 was not executed, the processor will alter the tags to the non-empty state sometime prior to the execution of the FP task switch routine. As a result, the FP task switch routine, whether minimal or simple, will store out the contents of the entire aliased register file (i.e., the packed data state of task A). In this manner, this embodiment remains operating system invisible regardless the technique used to stored the state of the aliased registers.

The set of transition instructions may be implemented in any number of ways. In one embodiment, this set of transition instructions may include a new instruction referred to herein as the EMMS (empty multimedia state) instruction. This instruction causes the clearing of the floating point/ packed data tags to indicate to any subsequently executed code that all the floating point registers 300 are available for any subsequent floating point instructions which may be executed. This avoids the generation of a stack overflow condition which may otherwise occur if the EMMS instruction is not executed after packed data instructions but before floating point instruction execution.

In prior art floating point programming practice using the Intel architecture processor, it is common to terminate blocks of floating point code by an operation or operations which clear the floating point state. Irrespective of whether partial and/or minimal context switching is used, the floating point state is left in a clear condition upon the termination of a first block of floating point code. Therefore, the EMMS instruction is intended to be used in packed data sequences in order to clear the packed data state. The EMMS instruction should be executed after a block of packed data code. Thus, a processor implementing the methods and apparatus described here retains full compatibility with prior art floating point processors using the Intel Architecture processor, but yet, also have the capability of executing packed data instructions which, if programmed with good programming techniques and appropriate housekeeping (clearing the state before transitions between packed data code and floating point code), allow transitions between packed data and floating point code without adversely affecting either the floating point or packed data state.

In another embodiment, the set of transition instructions may be implemented using existing floating point instructions that cause the processor to alter the tags to the empty state when executed.

In one embodiment, switching between executing packed data instructions and floating point instructions is time consuming. Thus, a good programming technique is to minimize the number of these transitions. The number of transitions between floating point and packed data instructions can be reduced by grouping floating point instructions apart from packed data instructions. Since it is desirable to promote such good programming techniques, it is desirable to implement a processor which makes it difficult to ignore such good programming techniques. Thus, one embodiment also alters the top of stack indication to an initialization state (e.g., zero to indicate register R0) during the first interval 386. This may be accomplished in any number of different ways, including: 1) causing the execution of the first packed data instruction to alter the top of stack indication; 2) causing the execution each packed data instruction in the set of packed data instructions 382 to alter the top of stack indication; 3) causing the execution of the EMMS instruction to set the top of stack indication; 4) altering the top of stack indication upon attempting to execute a floating point instruction at time T3 from FIG. 3D; etc. Again, this is to maintain full compatibility in code which mixes packed data instructions with floating point instructions. Also from the perspective of promoting good programming techniques, one embodiment, during the first interval 386, also stores a value indicating not a number in the sign and exponent fields of any aliased register that packed data is written to.

Figure 4A:
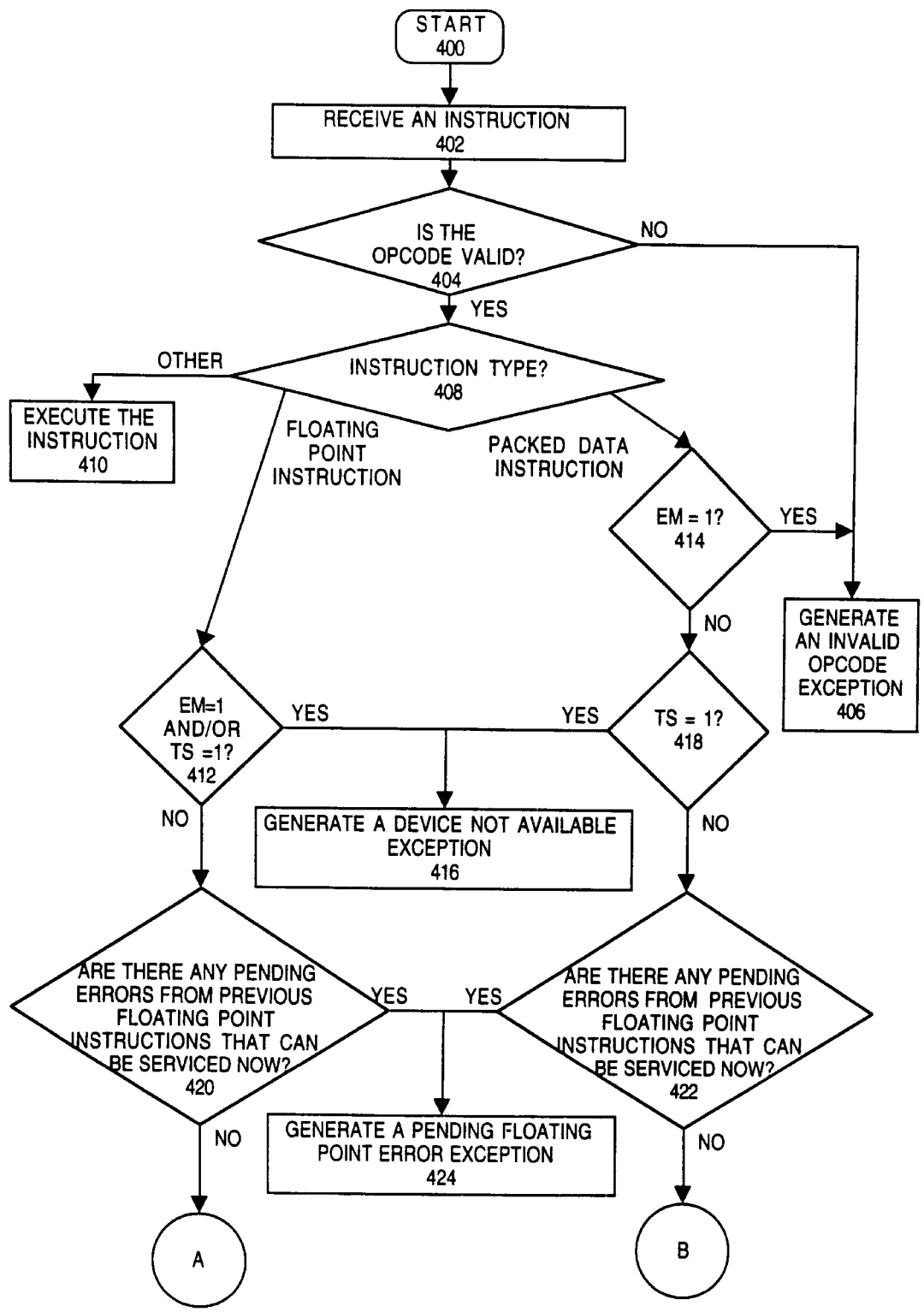
FIGS. 4A is a flow diagram illustrating a portion of a method for executing floating point and packed data instructions in a manner that is compatible with existing software, invisible to various operating system techniques, and that promotes efficient programming techniques according to one embodiment of the invention.
Figure 4B:
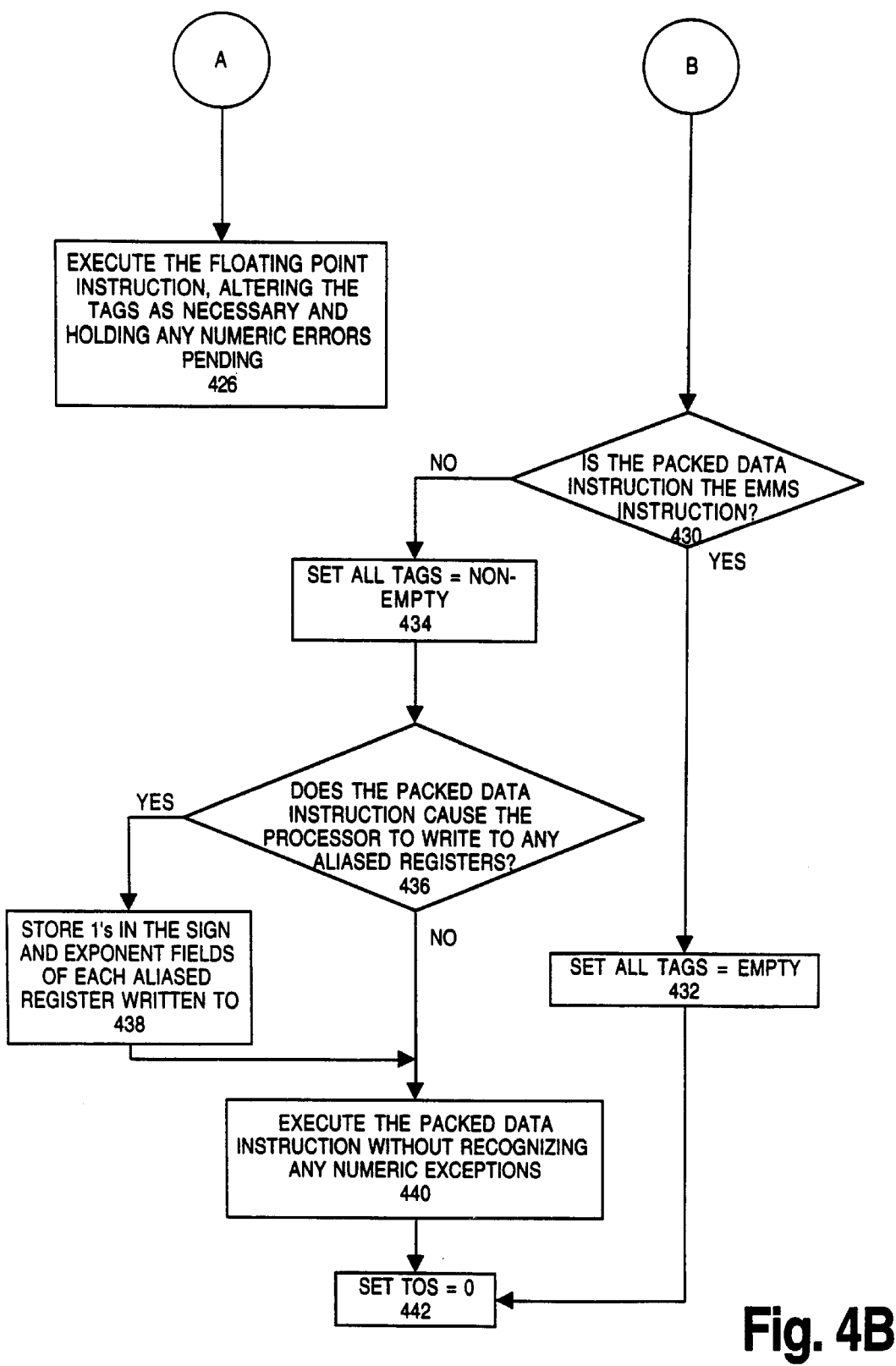
FIG. 4B is a flow diagram illustrating the remainder of the method partially illustrated in FIG. 4A.

FIGS. 4A and 4B are a general flow diagram illustrating a method for executing floating point and packed data instructions in a manner that is invisible to various operating system techniques and that promotes efficient programming techniques according to one embodiment of the invention. The flow diagram starts at step 400. From step 400, flow passes to step 402.

As shown in step 402, a set of bits is accessed as an instruction and flow passes to step 404. This set of bits includes an opcode that identifies the operation(s) to be performed by the instruction.

At step 404, it is determined whether the opcode is valid. If the opcode is not valid, flow passes to step 406. Otherwise, flow passes to step 408. Assuming execution of a routine containing packed data instructions is attempted on a processor which does not support packed data instructions, the opcodes for the packed data instructions will not be valid and flow will pass to step 406. In contrast, if the processor is capable of executing packed data instructions, the opcodes for these instructions will be valid and flow will pass to step 408.

As shown in step 406, an invalid opcode exception is generated and the appropriate event handler is executed. As previously described with reference to step 215 in FIG. 2, this event handler may be implemented to cause the processor to display a message, abort execution of the current task, and go on to execute other tasks. Of course, this event handler can be implemented in any number of ways. For example, this event handler may be implemented to identify whether the processor is incapable of executing packed data instructions. This same event handler could also be implemented to set an indication identifying that the processor cannot execute packed data instructions. Other applications executing on the processor could use this indication to determine whether to execute using a set of scalar routines or a duplicative set of packed data routines. However, such an implementation would require either the alteration of an existing operating system or the development of a new operating system.

At step 408, it is determined what type of instruction has been received. If the instruction is neither a floating point instruction nor a packed data instruction, flow passes to step 410. However, if the instruction is a floating point instruction, flow passes to step 412. In contrast, if the instruction is a packed data instruction, flow passes to step 414.

As shown in step 410, the processor executes the instruction. Since this step is not necessary to understanding the invention, it is not further described here.

As shown in step 412, it is determined whether the EM indication is equal to 1 (according to the described software convention, if the floating point unit should be emulated) and whether the TS indication is equal to 1 (according to the described software convention, if a partial context switch was performed). If the EM indication and/or the TS indication are equal to 1, flow passes to step 416. Otherwise, flow passes to step 420. While one embodiment is implemented to cause a device not available exception when the EM indication is 1 and/or the TS indication is 1, alternate embodiments could be implemented to use any number of other values.

At step 416, the device not available exception is generated and the corresponding event handler is executed. As previously described with reference to step 235 in FIG. 2, the corresponding event handler may be implemented to poll the EM and TS indications. If the EM indication is equal to 1, then the event handler emulates the floating point unit to execute the instruction and causes the processor to resume execution at the next instruction (the instruction which logically follows the instruction received in step 402). If the TS indication is equal to 1, then the event handler causes the processor to function as previously described with reference to partial context switches (stores the contents of the floating point unit and restores the correct floating point state if required) and causes the processor to resume execution by restarting execution of the instruction received in step 402. Of course, alternative embodiments may implement this event handler can be implemented any number of ways. For example, the EM indication may be used for implementing multitasking.

Since the packed data state is aliased on the floating point state and since the EM and TS indications cause the floating point state to change, the processor must also respond to the EM and TS indications when executing the packed data instructions in order to remain fully software compatible.

At step 414, it is determined if the EM indication is equal to 1. As previously described, the event handler executed to service the device not available exception may be implemented to poll the EM indication and attempts to emulate the floating point unit if the EM indication is equal to 1. Since existing event handlers are not written to emulate packed data instructions, the attempted execution of a packed data instruction while the EM indication is equal to 1 cannot be serviced by this event handler. Furthermore, in order to remain operating system invisible, alteration of this event handler cannot be required by the processor. As a result, if it is determined in step 414 that the EM indication is equal to 1, flow passes to step 406 rather than step 416. Otherwise, flow passes to step 418.

As previously described, at step 406 the invalid opcode exception is generated and the corresponding event handler is executed. By diverting the attempted execution of a packed data instruction while EM=1 to the invalid opcode exception, the embodiment remains operating system invisible.

While one embodiment has been described for handling the EM indication in a manner which is operating system invisible, alternative embodiments could use other techniques. For example, an alternative embodiment could either generate the device not available exception, a different existing event, or a new event in response to the attempted execution of a packed data instruction while the EM indication is equal to 1. Furthermore, if a slight modification to the operating system is acceptable, the selected event handler could be altered to take any action deemed appropriate in response to this situation. For example, the event handler could be written to emulate the packed data instructions. Another alternative embodiment could just ignore the EM indication when executing packed data instructions.

As shown in step 418, it is determined if the TS indication is equal to 1 (according to the existing software convention, if a partial context switch was performed). If the TS indication is equal to 1, flow passes to step 416. Otherwise, flow passes to step 422.

As previously described, at step 416 the device not available exception is generated and the corresponding event handler is executed. Thus, in response to this event, the corresponding event handler may be implemented to poll the EM and TS indications. Since step 414 diverted situations where the EM indication is equal to 1 to the invalid opcode exception, the EM indication must be equal to 0 and the TS indication must be equal to 1. Since the TS indication is equal to 1, the event handler functions as previously described with reference to partial context switches (stores the contents of the floating point unit and restores the correct floating point state if required) and causes the processor to resume execution by restarting execution of the instruction received in step 402. Since the packed data state is aliased on the floating point state, this event handler works for both the floating point and the packed data state. As a result, this method remains operating system invisible. Of course, alternative embodiments may implement this event handler in any number of ways. For example, an alternative embodiment in which the packed data state is not aliased on the floating point state could use a new event handler that stores both the floating point and packed data states.

While one embodiment has been described for handling the TS indication in a manner which is operating system invisible, alternative embodiments could use other techniques. For an example, an alternative embodiment may not implement the TS indication. Such an alternative embodiment would not be compatible with operating systems that use the TS indication to implement partial context switching. However, such an alternative embodiment would be compatible with existing operating systems that do not support partial context switching using the TS indication. As another example, the attempted execution of a packed data instruction while the TS indication is equal to one could be diverted to a new event handler or to an existing event handler which has been modified. This event handler could be implemented to take any action deemed appropriate in response to this situation. For example, in an embodiment in which the packed data state is not aliased on the floating point state, this event handler could store the packed data state and/or the floating point state.

Figure 2:
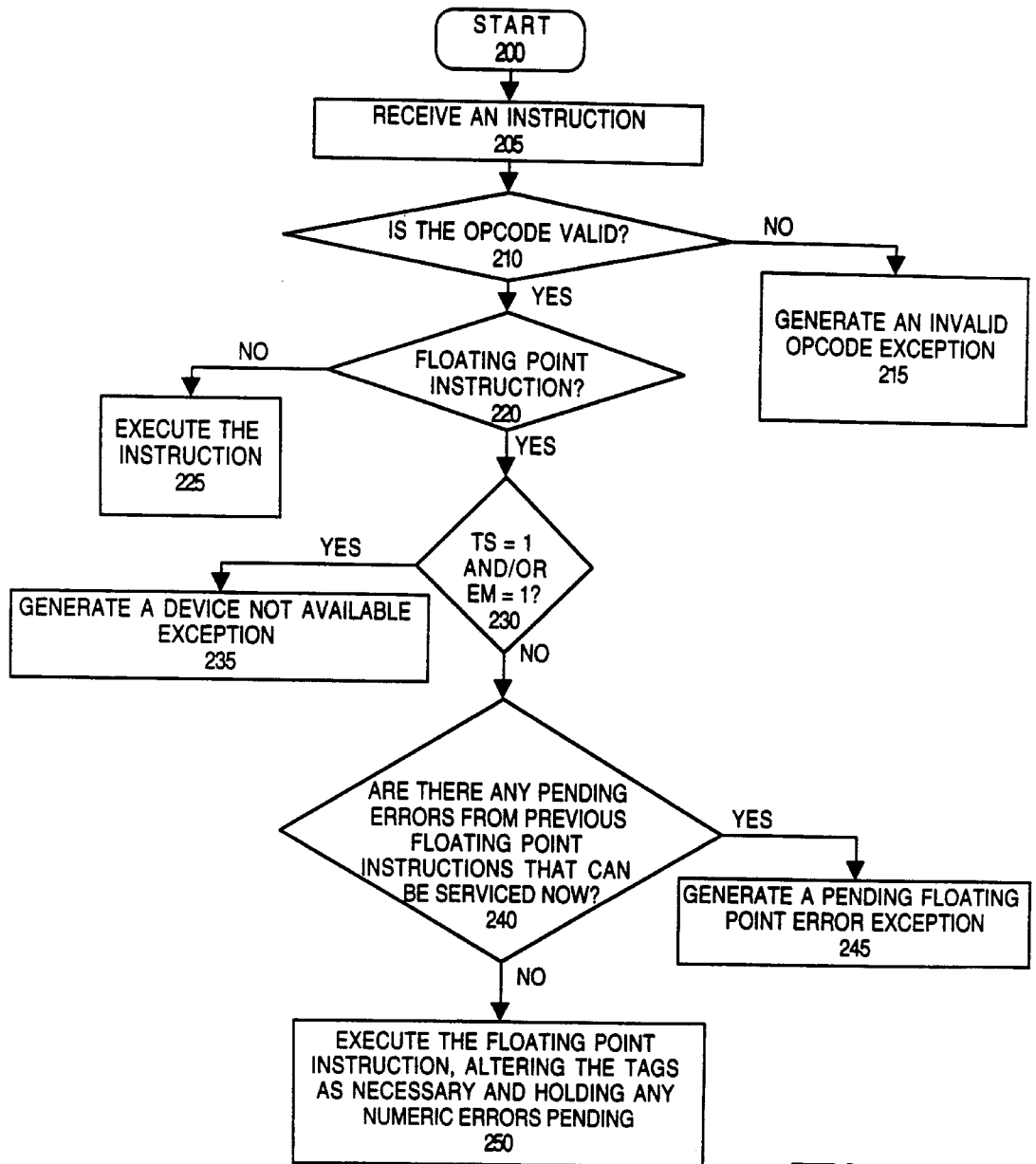
FIG. 2 is a flow diagram illustrating the execution of an instruction by the Pentium processor.

As previously described with reference to FIG. 2, if certain numeric errors are generated during the execution of a floating point instruction, those errors are held pending until the attempted execution of the next floating point instruction whose execution can be interrupted to service them. As shown in both steps 420 and 422, it is determined whether there are any such pending errors that can be serviced now. Thus, these steps are similar to step 240 from FIG. 2. If there are any such pending errors, flow passes from both steps 420 and 422 to step 424. However, if it is determined in step 420 that there are no such pending errors, flow passes to step 426. In contrast, if it is determined in step 422 that there are no such pending errors, flow passes to step 430. In an alternative embodiment, such errors are left pending during the execution of packed data instructions.

At step 424, a pending floating point error exception is generated. As previously described with reference to step 245 from FIG. 2, in response to this event the processor determines if the floating point error is masked. If so, the processor attempts to handle the event internally and the floating point instruction is micro restarted. If the floating point error is not masked, the event is an external event and the corresponding event handler is executed. This event handler may be implemented to service the error and cause the processor to resume execution by restarting execution of the instruction received in step 402. Of course, alternative embodiments may implement this event handler in any number of ways.

As shown in step 426, the floating point instruction is executed. To remain operating system invisible, one embodiment also alters the tags as necessary, reports any numeric errors that can be serviced now, and holds any other numeric errors pending. Since there are many operating system techniques for storing the contents of the floating point unit, it is desirable to execute the packed data and floating point instructions in a manner which is invisible to all such operating system techniques. By maintaining the tags, this embodiment remains operating system invisible to any such operating system techniques that store the contents of only those floating point registers whose corresponding tag indicates the non-empty state. However, alternative embodiments could be implemented to be compatible with less of these operating system techniques. For example, if an existing operating system does not utilize the tags, a processor that does not implement the tags would still be compatible with that operating system. Furthermore, it is not necessary to the invention that numeric floating point exceptions be held pending, and thus, alternative embodiment which do riot do so are still within the scope of the invention.

As shown in step 430, it is determined whether the packed data instruction is the EMMS instruction (also termed as the transition instruction). If the packed data instruction is the EMMS instruction, flow passes to step 432. Otherwise, flow passes to step 434. The EMMS instruction is used for altering the floating point tags to an initialization state. Thus, if the packed data state is aliased on the floating point state, this instruction should be executed when transitioning from executing packed data instructions to floating point instructions. In this manner, the floating point unit is initialized for the execution of floating point instructions. Alternative embodiments which do not alias the packed data state on the floating point state may not need to perform steps 430 and 432. In addition, the steps 430 and 432 are not required if the EMMS instruction is emulated.

As shown in step 432, all tags are altered to the empty state and the top of stack indication is altered to an initialization value. By altering the tags to the empty state, the floating point unit has been initialized and is prepared for the execution of floating point instructions. Altering the top of stack indication to the initialization value (which in one embodiment is zero to identify register R0) encourages separately grouping floating point and packed data instructions, and thus, encourages good programming techniques. Alternate embodiments do not need to initialize the top of stack indication. Upon completion of step 432, the system is free to execute the next instruction (the instruction logically following the instruction received in step 402).

As shown in step 434, the packed data instruction is executed (without generating any numeric exceptions) and the top of stack indication is altered to the initialization value. To avoid generating any numeric exceptions, one embodiment implements the packed data instructions such that data values are saturated and/or clamped to a maximum or minimum value. By not generating any numeric exceptions, event handlers are not required to service the exceptions. As a result, this embodiment of the invention is operating system invisible. Alternatively, an embodiment could be implemented to execute microcode event handlers in response to such numeric exceptions. Alternative embodiments which are not completely operating system invisible could be implemented such that either additional event handlers are incorporated into the operating system or existing event handlers are altered to service the error. The top of stack is altered for the same reasons as stated above. Alternative embodiments could be implemented to alter the top of stack any number of different times. For example, alternative embodiments could be implemented to alter the top of stack indication upon the execution of all packed data instructions except for EMMS. Other alternative embodiments could be implemented to alter the top of stack indication upon the execution of no other packed data instructions except EMMS. If any memory events are generated as a result of attempting to execute the packed data instruction, execution is interrupted, the top of stack indication is not altered, and the event is serviced. Upon completing the servicing of the event, the instruction received in step 402 is restarted. From step 434, flow passes to step 436.

As shown in step 436, it is determined whether the packed data instruction causes the processor to write to an aliased register. If so, flow passes to step 438. Otherwise, flow passes to step 440.

At step 438, 1's are stored in the sign and exponent fields of each aliased register that the packed data instruction causes the processor to write to. From step 438, flow passes to step 440. Performing this step promotes good programming techniques in that it encourages the separate grouping of floating point and packed data instructions. Of course, alternative embodiments which are not concerned with this issue could avoid implementing this step. While in one embodiment 1's are written into the sign and exponent fields, alternative embodiments could use any value representing NAN (not a number) or infinity.

As shown in step 440, all tags are altered to a non-empty state. Altering all the tags to a non-empty state promotes good programming techniques in that it encourages the separate grouping of floating point and packed data instructions. In addition, from an operating system compatibility perspective, certain operating system techniques store the contents of only those floating point registers whose corresponding tags indicate a non-empty state (minimal context switching). Thus, in an embodiment in which the packed data state is aliased on the floating point state, altering all tags equal to a non-empty state causes such operating systems to preserve the packed data state as if it were the floating point state. Alternative embodiments could alter only those tags whose corresponding registers contained valid packed data items. Furthermore, alternative embodiments could be implemented to be compatible with less of these operating system techniques. For example, if an existing operating system does not utilize the tags (e.g., an operating system that stores and restores the entire register state), an embodiment that does not implement the tags would still be compatible with that operating system. Upon completion of step 440, the system is free to execute the next instruction (the instruction logically following the instruction received in step 402).

Thus, in this embodiment, the contents of the tags in memory after a floating point state save (FSAVE) or floating point environment store (FSTENV) instruction is shown with reference to Table I below:

TABLE 1

Effect of packed data/FP instruction on the Tag word

| Instruction type | Instruction | Tag bits | Calculated Tag word in Memory after FSAVE/FSTENV |
|---|---|---|---|
| Packed data | Any (except EMMS) | Non-Empty (00, 01, or 10) | Non-Empty (00, 01, or 10) |
| Packed data | EMMS | Empty (11) | Empty (11) |
| Floating point | Any | 00, 01 | 00, 11, 01, or 10 |
| Floating point | FRSTOR, FLDENV | 00, 11, 01, or 10 | 00, 11, 01, or 10 |

As shown, any of the packed data instructions except EMMS cause the tags 320 to be set to a non-empty state (00). EMMS causes the floating point tag register to be set to empty (11). In addition, any packed data instruction including EMMS also causes the top of stack indication stored in top of stack field 350 to be reset to 0.

The remaining environment registers, such as the control and status words (except TOS) in the Intel Architecture processor, remain unchanged. Any packed data reads or EMMS leaves the mantissa and exponent portions of the floating point registers 300 in an unchanged state. However, in one embodiment, any packed data writes to a packed data register, because of the aliasing mechanism, causes the mantissa portion of the corresponding floating point register to be modified according to the operation being performed. Moreover, in this embodiment, the write of data in the mantissa portion of the floating point registers by modification of the packed data registers 310 causes the setting of all the bits in the sign and exponent portions of the floating point registers 300 to 1's. Because the packed data instructions do not use the sign and exponent portions of the floating point registers (there is no aliasing of the packed data registers in the sign and exponent portions of the floating point registers), this does not have any effect on packed data instructions. As previously described, alternative embodiments may alias the packed data state on any portion of the floating point state. In addition, alternative embodiments may chose to write any other value or not alter the sign and/or exponent portions of the registers.

TABLE 2

Effects of packed data instructions on the FPU

| Instruction type | Tag word | TOS (SW 13 ... 11) | Other FPU environment (CW Data ptr, Code ptr, other SW fields) | Exponent bits + Sign bit of packed data register (packed data) | Mantissa part of packed data register (packed data) |
|---|---|---|---|---|---|
| packed data read from packed data register | All fields set to 00 (non-empty) | 0 | Unchanged | Unchanged | Unchanged |
| packed data write to packed data register | All fields set to 00 (non-empty) | 0 | Unchanged | set to 1's | Affected |
| EMMS | All fields set to 11 (Empty) | 0 | Unchanged | Unchanged | Unchanged |

To further indicate execution of packed data instructions, the sign and exponent portions of the floating point registers written to are set to all 1's. This is done because the floating point registers use the exponent portion of the floating point registers, and it is desired that this portion of the registers be left in a determinant state after the execution of packed data instructions. In the Intel architecture microprocessor, an exponent portion of a floating point register being set to all 1's is interpreted as not being a number (NAN). Thus, in addition to the setting of the packed data tags 330 to a non-empty state, the exponent portion of the floating point registers are set to all 1's which may be used to indicate that packed data instructions were previously being executed. This further discourages intermixing of data from packed data instructions and floating point instructions which would modify that data, yielding improper results. Thus, floating point code has an additional way to discriminate between when the floating point registers contain floating point data and when they contain packed data.

Thus, a method for executing packed data instructions that is compatible with existing operating systems (such as MS Windows® brand operating environments available from Microsoft> Corporation of Redmond, Wash.) and that promotes good programming techniques is described. Since the packed data state is aliased on the floating point state, the packed data state will be preserved and restored by existing operating systems as if it was the floating point state. Furthermore, since events that are generated by the execution of the packed data instructions are serviceable by existing operating system event handlers, these event handlers need not be modified and new event handlers need not be added. As a result, the processor is backwards compatible and upgrading does not require the cost and time required to develop or modify an operating system.

Different embodiments of this method that are also compatible with existing operating systems are described with reference to FIGS. 7A–C, 8 and 9 and with reference to FIGS. 11A–C. Although these embodiments differ, the following are common to all of these embodiments (the embodiment shown in FIGS. 4A–B; the embodiment shown in FIGS. 7A–C, 8, and 9; and the embodiment shown in FIGS. 11A–C): 1) the floating point and the packed data state at least appear to the software to be stored in a single logical register file; 2) the execution of a packed data instruction when the EM bit indicates "floating point instructions should be emulated" results in an invalid opcode exception rather than a device not available exception; 3) the execution of a packed data instruction when the TS bit indicates "a partial context switch was performed" results in a device not available exception; 4) pending floating point events are serviced by the attempted execution of any of the packed data instructions; 5) the execution of any of the packed data instructions will result in the top of stack indication being altered to 0 sometime prior to the execution of the next floating point instruction; 6) if the execution of the EMMS instruction is not followed by the execution of any other packed data instructions, the execution of the EMMS instruction will result in all the tags being altered to the empty state sometime prior to the execution of the next floating point instruction; 7) if the execution of any of the packed data instructions is not followed by the execution of the EMMS instruction, the tags will be altered to the non-empty state sometime prior to the execution of the next floating point instruction; 8) some value representing NAN (not a number) or infinity is stored in the sign and exponent fields of any FP/PD register written to by the processor in response to the execution a packed data instruction; and 9) no new non-microcode event handlers are required.

Variations of the embodiment shown in FIG. 4A–B, some of which were described, may be fully or partially compatible with such operating systems and/or promote good programming techniques. For example, an alternative embodiment of the invention may move certain steps to different locations in the flow diagram shown in FIGS. 4A–B. Other embodiments of the invention may alter or remove one or more steps For example, an alternative embodiment may not support the EM bit. Of course, the invention could be useful for any number of system architectures and is not limited to the architecture described herein.

Using the above methods for the execution of floating point and packed data instructions, it is recommended that programmers who use embodiments of the present invention partition their code into sections which comprise separate blocks of floating point and packed data instructions as shown in FIG. 3D. This is to allow state saving and clearing of the packed data state prior to a transition from a sequence of floating point operations to a sequence of packed data operations and vice versa. This also permits compatibility with prior art task switching mechanisms including those which save the context during a task switch.

Because the packed data instructions affect the floating point registers 300 (FIG. 3A), and any single packed data instruction sets all the floating point tag to the non-empty state, partitioning code into blocks of code type is therefore recommended for proper bookkeeping. An example of an execution of mixed floating point and packed data instructions in blocks is illustrated in FIG. 3D. This may include the operation within a cooperative multitasking operating system, or, mixed floating point and packed instruction application code in a single application. In either case, proper bookkeeping of the floating point registers 300, the corresponding tags, and the top of stack indication is insured by partitioning functionality into separate blocks of floating point and packed data code.

For example, as illustrated in FIG. 3D, an execution stream may include the first set of floating point instructions 380. After the termination of the block of floating point instructions 380, the floating point state can be saved if desired by the application. This may be performed using any the number of known prior art techniques, including popping the floating point stack or using the FSAVE/FNSAVE instructions in the Intel Architecture processor. It may also be performed during minimal context switches which save the floating point environment, and check individual tags for the indication that the corresponding floating point register contains valid data. For each tag that indicates that the corresponding floating point data contains valid data, the corresponding floating point register will be saved. In addition, in this circumstance, an indication of the number of floating point registers may also need to be saved.

Subsequent to the execution of the first set of floating point instructions 380, the second set of packed data instructions 382 is executed in the execution stream. Recall that the execution of each packed data instruction will result in all of the packed data tags 330 being set to a non-empty state sometime in the interval 386 if the set of transition instructions 390 is not executed.

If no task switches occurs, subsequent to the execution of the set of packed data instructions 382, the set of transition instructions 390 is executed. This set of transition instructions 390 may be implemented to save the packed data state. This can be performed using any mechanism including the prior art floating point save instructions as discussed above, or a dedicated instruction to save the packed data state only. The packed data state may be saved in any prior art manner, including partial and minimal context switching mechanisms. Whether or not the packed data state is saved, the set of transition instructions 390 empties the packed data state. In this event, the packed data state affects the packed data tags 330 and the corresponding aliased floating point tags 320. As previously described, emptying of the packed data state is performed by execution of the single instruction EMMS or a series of floating point operations as will be discussed with reference to FIG. 14 below. As a result, the processor empties the packed data state sometime in interval 388 and is initialized for the execution of floating point instructions.

Subsequent to the execution of the set of transition instructions 390, the second set of floating point instructions 384 is executed. Since the tags were emptied and the top of stack indication altered to point to the first physical register 0 during the second interval 388, all of the floating point registers are available for use. This prevents the generation of a floating point stack overflow exception which may otherwise have occurred upon executing a floating point instruction. In some software implementations, the stack overflow condition may cause the interrupt handler to save and empty the packed data state. Thus, in implemented embodiments of the present invention, blocks of intermixed packed data end floating point instructions are permissible. However, appropriate bookkeeping must be performed by the application programmer or cooperative multitasking code to save any desired floating point or packed data state during transitions between packed data and floating point instructions, in order that the task's state not be corrupted during transitions. In addition, this method avoids unnecessary exceptions which would otherwise occur given the use of unrecommended programming techniques using implemented embodiments of the present invention.

Figure 14:
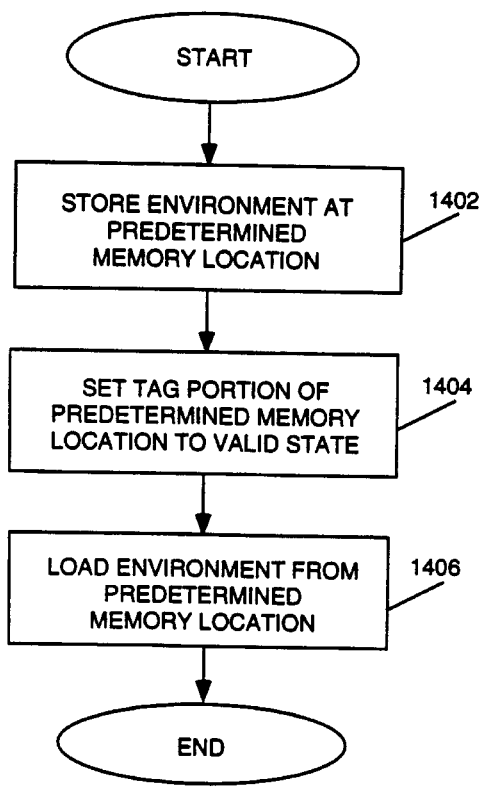
FIG. 14 is a flow diagram illustrating a method for clearing the tags according to one embodiment of the invention.

The EMMS instruction allows the smooth transition between a packed data instruction stream and floating point instruction stream. As previously set forth, it clears the floating point tags to avoid any floating point overflow condition which may occur, and moreover, resets the top of stack indication stored in top of stack field 350. Although a dedicated instruction which performs these operations may be implemented, it is also anticipated and within the scope of this disclosure that the operation of such may be implemented using a combination of existing floating point instructions. An example of this is shown in FIG. 14. Furthermore, this functionally may be folded into the execution of the first floating point instruction following the execution of a packed data instruction. In this embodiment, the execution of the first floating point instruction (other than one which stores out the environment of the floating point/packed data state) following the execution of a packed data instruction would cause the processor to perform an implicit EMMS operation (set all of the tags to the empty state).

Figure 5:
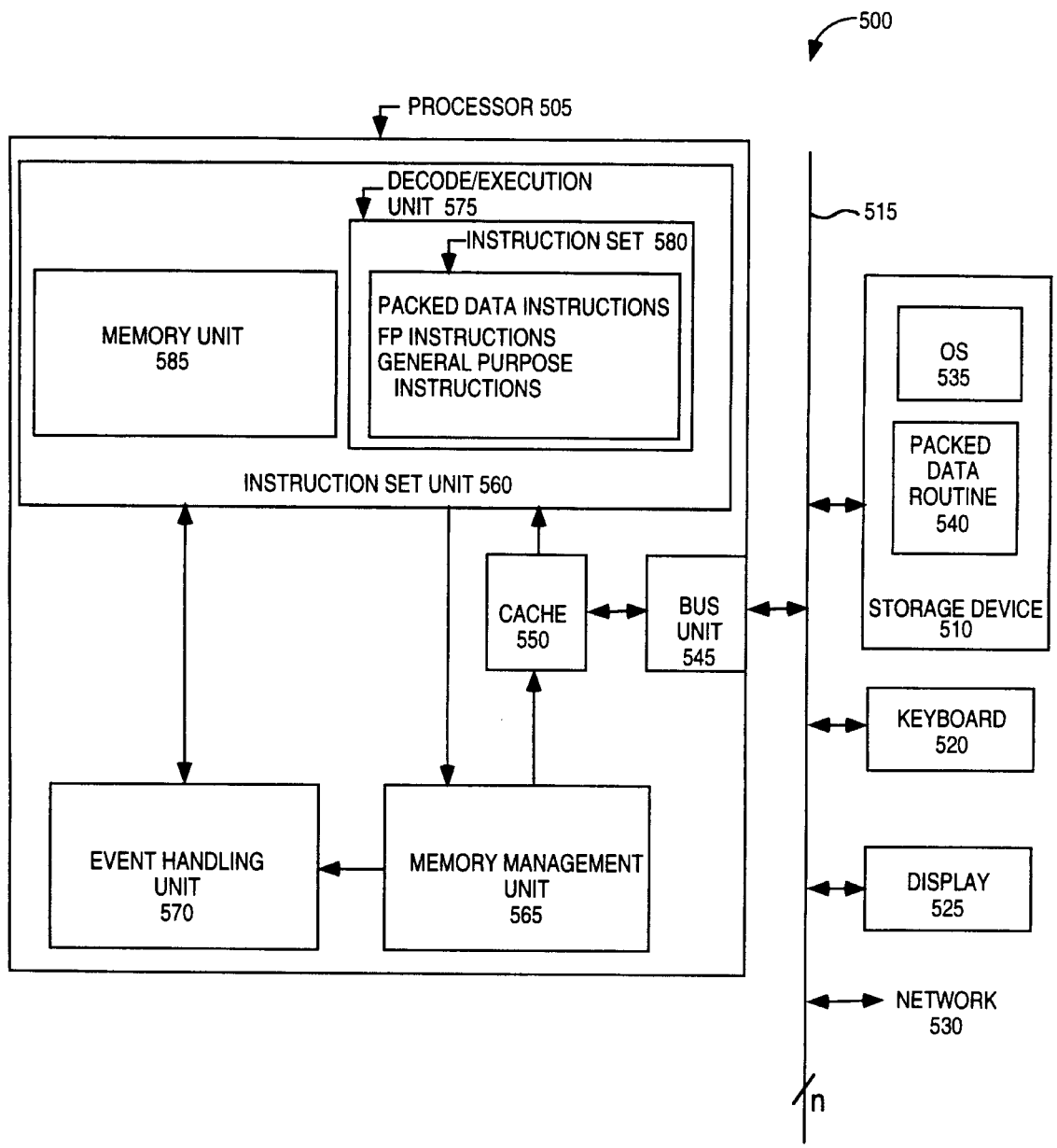
FIG. 5 shows a block diagram illustrating an exemplary computer system according to one embodiment of the invention.

FIG. 5 shows a block diagram illustrating an exemplary computer system 500 according to one embodiment of the invention. The exemplary computer system 500 includes a processor 505, a storage device 510, and a bus 515. The processor 505 is coupled to the storage device 510 by the bus 515. In addition, a number of user input/output devices, such as a keyboard 520 and a display 525, are also coupled to the bus 515. A network 530 may also be coupled to bus 515. The processor 505 represents a central processing unit of any type of architecture, such as a CISC, RISC, VLIW, or hybrid architecture. In addition, the processor 505 could be implemented on one or more chips. The storage device 510 represents one or more mechanisms for storing data. For example, the storage device 510 may include read only memory (ROM), random access memory (RAM), magnetic disk storage mediums, optical storage mediums, flash memory devices, and/or other machine-readable mediums. The bus 515 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system. In addition, while this embodiment is described in relation to a 32-bit and a 64-bit computer system, the implementation of the invention is not limited to such computer systems.

FIG. 5 additionally illustrates that the processor 505 includes a bus unit 545, a cache 550, an instruction set unit 560, a memory management unit 565 and an event handling unit 570. Of course, processor 505 contains additional circuitry, which is not necessary to understanding the implementation of the invention.

The bus unit 545 is coupled to the cache 550. The bus unit 545 is used for monitoring and evaluating signals generated external to the processor 505, as well as coordinating the output signals in response to input signals and internal requests from the other units and mechanisms in the processor 505.

The cache 550 represents one or more storage areas for use by the processor 505 as an instruction cache and a data cache. For example, in one embodiment the cache 550 is implemented as two separate caches—one for instructions and one for data. The cache 550 is coupled to the instruction set unit 560 and the memory management unit 565.

The instruction set unit 560 includes the hardware and/or firmware to decode and execute at least one instruction set. As shown in FIG. 5, the instruction set unit 560 includes a decode/execution unit 575. The decode unit is used for decoding instructions received by processor 505 into control signals and/or microcode entry points. In response to these control signals and/or microcode entry points, the execution unit performs the appropriate operations. The decode unit may be implemented using any number of different mechanisms (e.g., a look-up table, a hardware implementation, a PLA, etc.). While the execution of the various instructions by the decode and execution units is represented herein by a series of if/then statements, it is understood that the execution of an instruction does not require a serial processing of these if/then statements. Rather, any mechanism for logically performing this if/then processing is considered to be within the scope of the implementation of the invention.

The decode/execution unit 575 is shown containing an instruction set 580 that includes packed data instructions. While these packed data instructions can be implemented to perform any number of different operations. For example, these packed data instructions, when executed, could cause the processor to perform packed floating point operations and/or packed integer operations. In one embodiment these packed data instructions are those described in "A Set of Instructions for Operating on Packed Data," filed on Aug. 31, 1995, U.S. Ser. No. 08/521,360. In addition to the packed data instructions, the instruction set 580 can include new instructions and/or instructions similar to or the same as those found in existing general purpose processors. For example, in one embodiment the processor 505 supports an instruction set which is compatible with the Intel processor architecture instruction set used by existing processors, such as the Pentium processor.

FIG. 5 also shows the instruction set unit 560 including a memory unit 585. The memory unit 585 represents one or more sets of registers on processor 505 for storing information, including floating point data, packed data, integer data and control data (e.g., an EM indication, a TS indication, a top of stack indication, etc.) In certain embodiments, some of which are further described herein, the memory unit 585 aliases the packed data state on the floating point state.

The memory management unit 565 represents the hardware and firmware to implement one or more memory management schemes, such as paging and/or segmentation. While any number of memory management schemes can be used, in one embodiment a memory management scheme compatible with the Intel processor architecture is implemented. The event handling unit 570 is coupled to the memory management unit 565 and the instruction set unit 560. The event handling unit 570 represents the hardware and firmware to implement one or more event handling schemes. While any number of event handling schemes can be used, in one embodiment an event handling scheme compatible with the Intel processor architecture is implemented.

FIG. 5 also illustrates that the storage device 510 has stored therein an operating system 535 and a packed data routine 540 for execution by the computer system 500. The packed data routine 540 is a sequence of instructions that includes one or more of the packed data instructions. Of course, the storage device 510 preferably contains additional software (not shown), which is not necessary to understanding the invention.

While in one embodiment various indications (e.g., the EM indication, the TS indication, etc.) are implemented using bits in registers on the processor 505, alternative embodiments could use any number of techniques. For example, alternative embodiments could store these indications off chip (e.g., in the storage device 510) and/or could use multiple bits for each indication. The term storage area is used herein to refer to any mechanism for storing data, including locations in the storage device 510, one or more registers in the processor 505, etc.

Figure 6A:
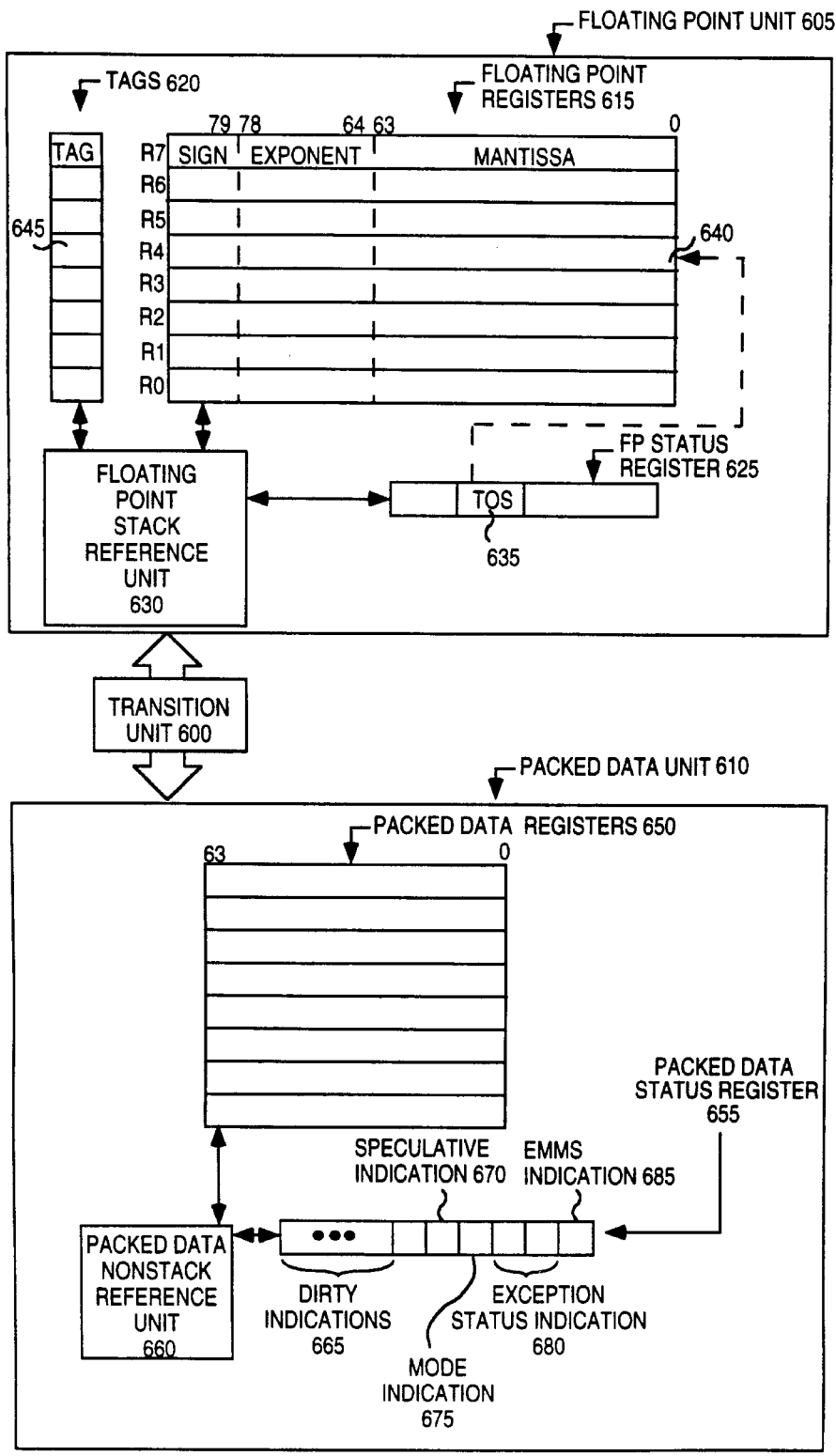
FIG. 6A is a block diagram illustrating an apparatus for aliasing the packed data register state on the floating point state using two physical register files according to one embodiment of the invention.

FIG. 6A is a block diagram illustrating an apparatus for aliasing the packed data register state on the floating point state using two separate physical register file according to one embodiment of the invention. Since these two physical register files are aliased, they logically appear to software executing on the processor as a single logical register file. FIG. 6A shows a transition unit 600, a floating point unit 605, and packed data unit 610. Floating point unit 605 is similar to floating point unit 135 of FIG. 1. Floating point unit 605 includes a set of floating point registers 615, a set of tags 620, a floating point status register 625 and a floating point stack reference unit 630. In one embodiment, the floating point unit 605 includes eight registers (labeled R0 to R7). Each of these eight registers is 80 bits wide and contains a sign field, an exponent field and an mantissa field. The floating point stack reference unit 630 operates the set of floating point registers 615 as a stack. The floating point status register 155 includes a top of stack field 635 for storing the top of stack indication. As previously described, the top of stack indication identifies which register in the set of floating point registers 615 is currently the top of the floating point stack. In FIG. 6A, the top of stack indication identifies a register 640 at physical location R4 as ST(0)— the top of the stack.

In one embodiment, the set of tags 620 includes eight tags and is stored in a single register. Each tag corresponds to a different floating point register and comprises two bits. Alternatively, each of the tags can be thought of as corresponding to a different register in the logical register file resulting form the aliasing. As shown in FIG. 6A, the tag 645 corresponds to register 640. As previously described, these tags are used by the floating point unit 605 to distinguish between empty and non-empty register locations. As previously described, an embodiment can use one bit tags identifying either the empty or the non-empty state, but make these one bit tags appear to software as comprising two bits by determining the appropriate two bit tag values when the tag values are needed. Of course, alternative embodiment could implement two bit tags. Either way, the tags can be thought of as identifying two states: empty which is indicated by 11 and non-empty indicated by any one of 00, 01, or 10.

The packed data unit 610 is used for storing packed data and includes a set of packed data registers (also termed as a packed data register file) 650, a packed data status register 655 and a packed data non-stack reference unit 660. In one embodiment, the set of packed data registers 650 includes eight registers. Each of these eight registers corresponds to a different register in the set of floating point registers 615. Each of the eight packed data registers is 64 bits wide and is mapped on the 64 bit mantissa field of the floating point register to which it corresponds. The packed data non-stack reference unit 660 operates the packed data registers 650 as a fixed register file. Thus, the packed data instructions explicitly designate which registers in the set of packed data registers 650 are to be utilized.

The transition unit 600 aliases the packed data registers 650 onto the floating point registers 615 by copying data between those two physical register files. Thus, the transition unit 600 causes the physical floating point registers 615 and the physical packed data registers 650 to logically appear as a single logical register file to the user/ programmer. In this manner, it appears to the software as if only a single logical register file is available for executing floating point and packed data instructions. The transition unit 600 could be implemented using any number of techniques, including hardware and/or microcode. Of course, in alternative embodiments, the transition unit 600 could be located anywhere on the processor. Furthermore, in alternative embodiments, the transition unit 600 could be a non-microcode event handler stored outside of the processor.

The transition unit 600 could be implemented to provide for full or partial aliasing. If the contents of all the physical floating point registers are copied to the packed data register file during transitions to the packed data mode, the physical floating point register file is fully aliased on the packed data register file. Likewise, if the contents of all the physical packed data registers are copied to the floating point register file during transitions to the floating point mode, the physical packed data register file is fully aliased on the physical floating point register file. In contrast, in partial aliasing, the contents of only those registers that contain "useful" data are copied. Which registers contain useful data can be determined based on any number of criteria. For example, partial aliasing can be implemented by copying into the physical packed data registers the data stored in only those physical floating point registers whose corresponding tags indicate the non-empty state. Of course, an embodiment could use the floating point tags when executing packed data instructions or include separate packed data tags for partially aliasing the physical packed data registers on the physical floating point registers. Alternatively, those packed data registers and/or the floating point registers that were touched (read from and/or written to) may be considered to contain useful data are. The floating point tags could be used for this purpose, rather than or in addition to indicating empty or non-empty. Alternatively, additional indications could be included for the floating point and/or packed data registers for recording which registers were touched. When implementing partial aliasing, a good programming technique is to assume those registers into which data was not copied during a transition must be considered to contain undefined values.

The packed data status register 655 includes a set of packed data dirty fields 665, a speculative field 670, a mode field 675, an exception status field 680, and an EMMS field 685. Each of the packed data dirty fields 665 corresponds to a different one of the packed data registers 650 and is used for storing a dirty indication. Since there is a corresponding relationship between the packed data registers 650 and the floating point registers 615, each of the dirty indications has a corresponding relationship with a different one of the floating point registers 615. When a value is written to one of the packed data registers 650, that registers corresponding dirty indication is altered to indicate a dirty state. When the transition unit 600 causes a transition from the packed data unit 610 to the floating point unit 605, 1's are written into the sign and exponent fields of those floating point registers 615 whose corresponding dirty indication indicates the dirty state. In this manner, step 430 from FIG. 4B can be implemented.

The mode field 675 is used for storing a mode indication that identifies which mode the processor is currently operating in — a floating point mode in which the floating point unit 605 is currently being used, or a packed data mode in which the packed data unit 610 is being used. If the processor is in the floating point mode and a packed data instruction is received, a transition from the floating point mode to the packed data mode must be performed. In contrast, if the processor is in the packed data mode and a floating point instruction is received, a transition from the packed data mode to the floating point mode must be performed. Thus, upon receiving either a packed data or a floating point instruction, the mode indication can be polled to determine whether a transition is necessary. If a transition is necessary, the transition is performed and the mode indication is altered accordingly. The operation of the mode indication will be further described herein with reference to FIGS. 7A–9.

The exception status field 680 is used for storing an exception status indication. The exception status indication is used during the execution of packed data instructions for identifying whether there are any pending exceptions from the execution of previous floating point instructions. In one embodiment, if the exception status indication indicates such exceptions are pending, those exceptions are serviced prior to transitioning to the packed data mode. In one embodiment, the indications used by the floating point unit 605 for this purpose are either encoded or directly copied into the exception status field as the exception status indication.

The EMMS field 685 is used for storing an EMMS indication that identifies whether the last packed data instruction executed was the EMMS instruction. In one embodiment., when the EMMS instruction is executed, the EMMS indication is altered to 1 to indicate the last packed data instruction executed was the EMMS instructions. In contrast, when all other packed data instructions are executed, the EMMS indication is altered to zero. The transition unit 600 polls the EMMS indication when transitioning from the packed data mode to the floating point mode to determine if the last packed data instruction was the EMMS instruction. If the last executed packed data instruction was the EMMS instruction, the transition unit 600 alters all of the tags 620 to the empty state. However, if the EMMS indicates the last executed packed data instruction was not EMMS, the transition unit 600 alters all of the tags 620 to the non-empty state. In this manner, the tags are altered in a similar fashion to steps 432 and 440 from FIG. 4B.

The speculative field 670 is used for storing a speculative indication that identifies whether a transition from the floating point mode to the packed data mode is speculative. If the transition is speculative, time can be saved if a transition back to the floating point unit 605 is required. The operation of the mode indication will be further described herein with reference to FIGS. 7A–9.

Figure 6B:
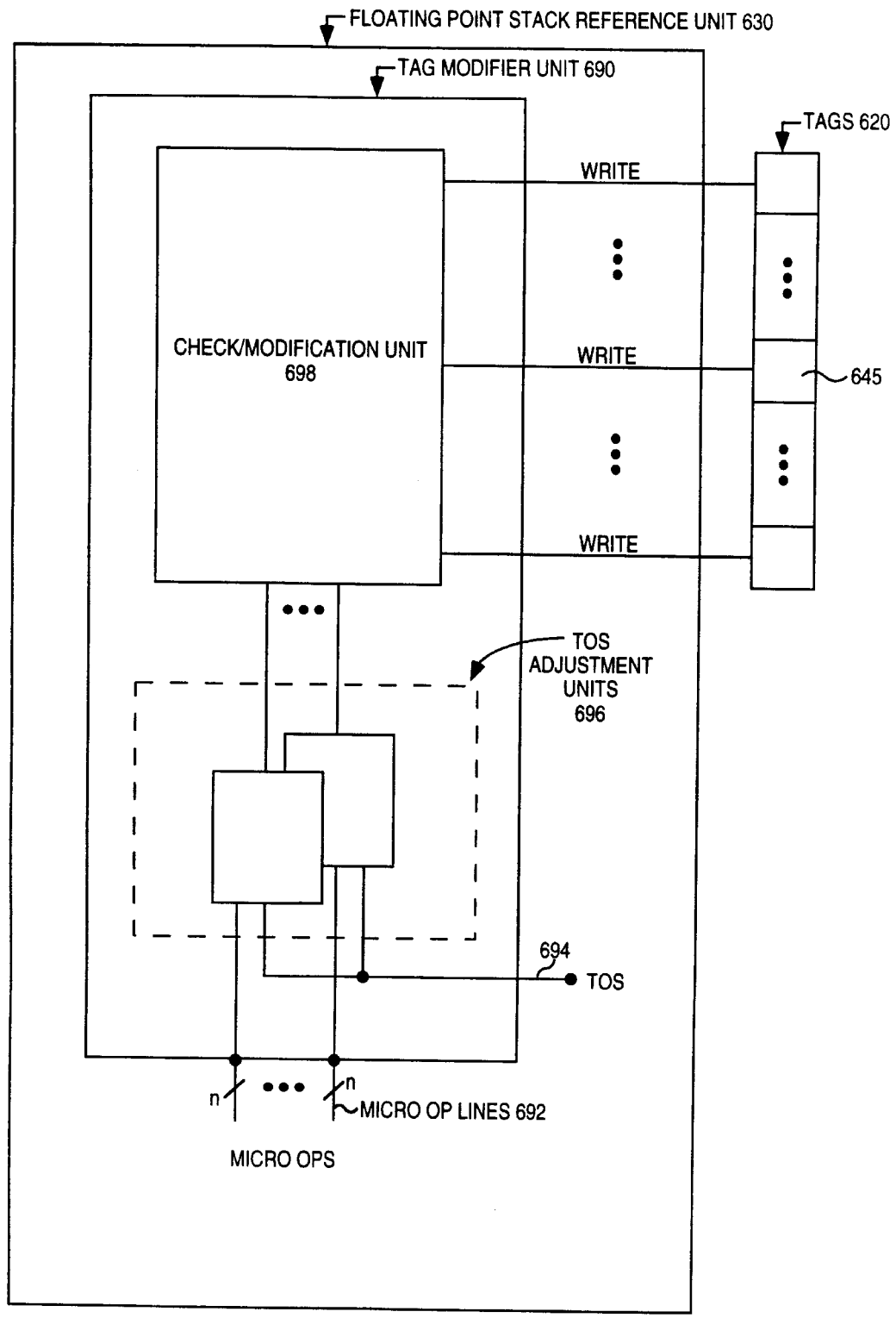
FIG. 6B is a block diagram illustrating an expanded view of a portion of the floating point stack reference file from FIG. 6A according to embodiments of the invention.

FIG. 6B is a block diagram illustrating an expanded view of a portion of the floating point stack reference file from FIG. 6A according to embodiments of the invention. FIG. 6B shows floating point stack reference unit 630 containing a tag modifier unit 690 for selectively altering tags in the set of tags 620. In the embodiment shown in FIG. 6B, each of the set of tags 620 contains only 1 bit for indicating either empty or non-empty. The tag modifier unit 690 includes a set of TOS adjustment units 696 and a check/modification unit 698. Each of the TOS adjustment units 696 is coupled to micro op lines 692 for receiving one or more micro ops depending on the implementation (e.g., there could be only one TOS adjustment unit that receives only one micro op). At least the micro ops for the floating point instructions that require the tags to be altered are received by the TOS adjustment units 696. Of course, the floating point stack reference unit 630 may be implemented such that all or only the relevant part of each micro op is received by the TOS adjustment units 696.

In response to receiving a micro op, a TOS adjustment unit transmits to the check/modification unit 698 at least: 1) the address(es) of the tag(s) in the set of tags 620 identified by the micro op; and 2) signal(s) indicating the action to be performed on those tag(s) (e.g., altered to 0 or 1, polled). Since the polling of tags is not necessary to understanding the invention, it is not further described here. Each of the TOS adjustment units 696 is also coupled to lines 694 for receiving the current TOS value and adjusting the tag address(es) accordingly. The check/modification unit 698 is coupled to each of the tags 620 by at least a write line. For example, check/modification unit 698 is coupled to tag 645 by a write line. In response to receiving tag address(es) and corresponding signals, the check/modification unit 698 performs the required checks and/or modifications. In an implementation in which multiple micro ops may be received at one time, the check/modification unit 698 also performs comparisons between the micro ops to determine if they are modifying the same tags (e.g., assume micro op one requires tag one be altered to 1, while micro op two, which was received at the same time as micro op one, requires tag one be altered to 0). If the same tag is being modified, the check/modification unit 698 determines which micro op is to be executed last and alters the tag according to that micro op. In the above example, assuming micro op two is to be executed after micro op one, the check/modification unit 698 would alter tag one to indicate 0.

For example, if a floating point operation was performed that required a tag (e.g., tag 645) be altered to the empty state, a TOS adjustment unit would receive the current TOS value and a micro op on the micro op lines 692 identifying a tag. The TOS adjustment unit would determine the address of the tag (e.g., tag 645) and transmit that address, as well as signals indicating that tag should be altered to the empty state, to the check/modification unit 698. In response, the check/modification unit 698 would alter the tag 645 to the empty state by transmitting a 0 on the write line coupled to the tag 645.

In one embodiment, since the floating point instructions may be implemented such that not all of the tags need to be modified at one time, the tag modifier unit 690 is implemented such that it can not modify all the tags at one time. In order to avoid circuit complexity, the global altering of the tags in response to a transition to the floating point mode may be implemented using this existing mechanism. In this regard, if the transition unit 600 is implemented in microcode, the set of microcode instructions would cause the decode unit to issue several existing micro ops for altering the eight tags. Thus, in response to performing a transition to the packed data mode while the EMMS indication indicates the EMMS instruction was the last packed data instruction executed, the decode unit would access the transition unit 600 and issue several existing micro ops. In response to these micro ops, the tag modifier unit 690 would modify the corresponding tags to the empty state. In contrast, in response to performing a transition to the packed data mode while the EMMS indication indicates the EMMS instruction was not the last packed data instruction executed, the decode unit would access the transition unit 00 and issue several existing micro ops that would cause the tag modifier unit 690 to alter each of the tags to the non-empty state. In such an embodiment, the global altering of the tags may require approximately 4–8 clock cycles.

While one embodiment has been described for altering all the tags in response to a transition to the packed data mode, alternative embodiments may use any number of mechanisms. For example, the altering of all the tags to the empty or non-empty state may be completed in a single clock cycle by including a new micro op and implementing the tag modifier unit 690 such that it can globally alter the tags responsive to the new micro op. In this embodiment, the transition unit 600 may be implemented to causes the decode unit to issue this single micro op (rather than several separate micro ops) to alter all of the tags to the empty state or non-empty state. As another example, the decode unit could be coupled to tags 620 and include additional hardware for altering all of the tags 620 in response to receiving the EMMS instruction.

As previously described, although the set of tags 620 are described as having one bit tags, the set of tags 620 can be made to appear as if there are two bits for each tag. An alternative embodiment could implement the two bits for each tag by including additional encoded or non-encoded lines for indicating the various states (e.g., 00, 01, 10, 11) that the tags are to be altered to.

FIGS. 7A, 7B, 7C, 8 and 9 illustrate a method, in accordance with one embodiment of the invention, for executing packed data instructions on a set of registers that are aliased on a set of floating point registers in a manner that is operating system invisible, that promotes good programming practices, and that may be practiced using the hardware arrangement of FIG. 6A. This flow diagram is similar to the flow diagram described with reference to FIGS. 4A and 4B. With references to FIGS. 4A and B, many alternative embodiments were described in which steps were altered, moved, and/or removed. It is to be understood that steps described with reference to FIGS. 7A, 7B, 7C, 8 and 9 that are similar to the steps performed in FIGS. 4A and 4B could at least be performed using such alternatives embodiments. The flow diagram starts at step 700. From step 700, flow passes to step 702.

As shown in step 702 a set of bits is accessed as an instruction and flow passes to step 704. This set of bits includes an opcode that identifies the operation(s) to be performed by the instruction. Thus, step 702 is similar to step 402 from FIG. 4A.

At step 704, it is determined whether the opcode is valid. If the opcode is not valid, flow passes to step 706. Otherwise, flow passes to step 708. Step 704 is similar to step 404 in FIG. 4A.

As shown in step 706, the invalid opcode exception is generated and the appropriate event handler is executed. Thus, step 706 is similar to step 406 from FIG. 4A.

At step 708, it is determined what type of instruction has been received. If the instruction is neither a floating point instruction nor a packed data instruction, flow passes to step 710. However, if the instruction is a floating point instruction, flow passes to step 712. In contrast, if the instruction is a packed data instruction, flow passes to step 714. Thus, step 708 is similar to step 408 from FIG. 4A.

As shown in step 710, the processor executes the instruction. Since this step is not necessary to understanding the invention, it is not further described here. Step 710 is similar to step 410 from FIG. 4A.

As shown in step 712, it is determined whether the EM indication is equal to 1 (according to the described software convention, if the floating point unit should be emulated) and whether the TS indication is equal to 1 (according to the described software convention, if a partial context switch was performed). If the EM indication and/or the TS indication are equal to 1, flow passes to step 716. Otherwise, flow passes to step 720. Thus, step 712 is similar to step 412 from FIG. 4A.

At step 716, the device not available exception is generated and the corresponding event handler is executed. Thus, step 716 is similar to step 416 from FIG. 4A. As previously described, this event handler may be implemented to use the EM and TS indication to determine whether to emulate the floating instruction and/or whether a partial context switch was performed.

At step 714, it is determined if the EM indication is equal to 1. Thus, step 714 is similar to step 414 from FIG. 4A. As a result, if it is determined in step 714 that the EM indication is equal to 1, flow passes to step 706 rather than step 716. Otherwise, flow passes to step 718.

As previously described, at step 706 the invalid opcode exception is generated and the corresponding event handler is executed. By diverting the attempted execution of a packed data instruction while EM=1 to the invalid opcode exception, the embodiment is operating system invisible as previously described with reference to step 406 of FIG. 4A.

While one embodiment has been described for handling the EM indication in a manner which is operating system invisible, alternative embodiments could use other techniques. For example, an alternative embodiment could either generate the device not available exception, a different existing event, or a new event in response to the attempted execution of a packed data instruction while the EM indication is equal to 1. As another example, an alternative embodiment could ignore the EM indication when executing packed data instructions.

As shown in step 718, it is determined if the TS indication is equal to 1 (according to the described software convention, if a partial context switch was performed). If the TS indication is equal to 1, flow passes to step 716. Otherwise, flow passes to step 722. Thus, step 718 is similar to step 418 of FIG. 4A.

As previously described, at step 716 the device not available exception is generated and the corresponding event handler is executed. Step 716 is similar to step 418 from FIG. 4A. Since step 714 diverted situations where the EM indication is equal to 1 to the invalid opcode exception, the EM indication must be equal to 0 and the TS indication must be equal to 1. Since TS is equal to 1, the event handler causes the processor to function as previously described with reference to partial context switches (stores the contents of the floating point unit and restores the correct floating point state if required) and causes the processor to resume execution by restarting execution of the instruction received in step 702. Since the packed data state is aliased on the floating point state, this event handler works for both the floating point and the packed data state. As a result, this method remains operating system invisible. Of course, alternative embodiments may implement this event handler in any number of ways.

While one embodiment has been described for handling the TS indication in a manner which is operating system invisible, alternative embodiments could use other techniques. For an example, an alternative embodiment may not implement the TS indication. Such an alternative embodiment would not be compatible with operating systems that use the TS indication to implement partial context switching. However, such an alternative embodiment would be compatible with existing operating systems that do not support partial context switching using the TS indication. As another example, the attempted execution of a packed data instruction while the TS indication is equal to one could be diverted to a new event handler or to an existing event handler which has been modified. This event handler could be implemented to take any action deemed appropriate in response to this situation. For example, in an embodiment in which the packed data state is not aliased on the floating point state, this event handler could store the packed data state and/or the floating point state.

As previously described, if certain numeric error are generated during the execution of a floating point instruction, those errors are held pending until the attempted execution of the next floating point instruction whose execution can be interrupted to service them. As previously described, it is determined in both steps 420 and 422 from FIG. 4 whether there are any such pending errors that can be serviced. Similar to step 420 in FIG. 4A, it is determined in step 720 whether there are any such pending errors that can be serviced. If there are any such pending errors, flow passes from step 720 to step 724. However, if it is determined in step 720 that there are no such pending errors, flow passes to step 726. In contrast, the determination of whether there are any pending errors from the previous floating point instructions during the attempted execution of a packed data instruction is performed in another step which will be further described later. As a result, step 722 differs from step 422.

At step 724, a pending floating point error event is generated. Thus, step 724 is similar to step 424 from FIG. 4A. As previously described with reference to step 424 from FIG. 4A, this event may be treated as an internal or external event and serviced accordingly.

As shown in step 726, it is determined if the mode indication indicates the processor is operating in the floating point mode. Thus, step 726 differs from step 426 in FIG. 4B. If the processor is not in the floating point mode, the processor will have to be transitioned from the packed data mode to the floating point mode in order to execute the floating point instruction. Thus, if the processor is not in the floating point mode, flow passes to step 728. Otherwise, flow passes to step 732.

At step 728, the processor is transitioned from the packed data mode to the floating point mode and flow passes to step 730. Step 728 is performed by the transition unit 600 from FIG. 6A and will be further described with reference to FIG. 9.

As shown in step 730, the instruction received in step 702 is restarted by performing a "micro restart." Since in one embodiment step 728 is performed using microcode and the instruction is micro restarted, no operating system event handlers need be executed. As a result, execution of the current task can be resumed without any action being taken external to the processor—no non-microcode event handlers, such as operating system event handlers, need be executed. Thus, the processor can transition from the packed data mode to the floating point mode in a manner that is invisible to software, including the operating system. In this manner, this embodiment is compatible with existing operating systems. Alternative embodiments could be implemented to be less compatible. For example, an additional event could be incorporated into the processor and an additional event handler could be added to the operating system to perform this transition.

As shown in step 732, the floating point instruction is executed. Step 732 is similar to step 426 from FIG. 4B. To remain operating system invisible, one embodiment also alters the tags as necessary, reports any numeric errors that can be serviced now, and holds any other numeric errors pending. As previously described, altering the tags allows this embodiment to remain operating system invisible to any such operating system techniques that store the contents of only those floating point registers whose corresponding tag indicates a non-empty state. However, as previously described, alternative embodiments could be implemented to be compatible with less of certain operating system techniques. For example, if an existing operating system does not utilize the tags, a processor that does not implement the tags would still be compatible with that operating system. Furthermore, it is not necessary to the invention that numeric floating point exceptions be held pending, and thus, alternative embodiments which do not do so are still within the scope of the invention.

As shown in step 722, it is determined if is mode indication indicates the processor is in the packed data mode. Thus, step 722 differs from step 422 from FIG. 4A. Step 722 is performed to determine whether the processor is in the proper mode to execute the packed data instruction. If the processor is not in the packed data mode, the processor will have to be transitioned from the floating point mode to the packed data mode to execute the packed data instruction. Thus, if the processor is not in the packed data mode, flow passes to step 734. Otherwise, flow passes to step 738.

At step 734, the processor is transitioned from the floating point mode to the packed data mode and flow passes to step 736. Step 734 is performed by the transition unit 600 from FIG. 6A and will be further described with reference to FIG. 8.

As shown in step 736, the instruction received in step 702 is restarted by performing a micro restart. Thus, step 736 is similar to step 730.

At step 740, it is determined whether the packed data instruction is the EMMS instruction. If the packed data instruction is the EMMS instruction, flow passes to step 742. Otherwise, flow passes to step 744. Since the packed data instructions are executed on a separate unit (i.e., the packed data unit), it is more efficient to store indications (e.g., the EMMS indication) that identify what must be done in step 728 when transitioning back to the floating point mode than to actually perform certain operations (e.g., alter the tags to the empty state in response to executing the EMMS instruction, and alter the tags to a non-empty state in response to executing any other packed data instructions). The use of EMMS indication, as well as other indications, will be described with reference to the step of transitioning from the packed data mode to the floating point mode that is further described in FIG. 9.

As shown in step 742, the EMMS indication is altered to indicate the last packed data instruction was the EMMS instruction. Upon completion of step 742, the processor is free to execute the next instruction (the instruction logically following the instruction received in step 702). As shown in step 744, the EMMS indication is altered to indicate the last packed data instruction was not the EMMS instruction. From step 744, flow passes to step 746. As shown in step 738, the speculative indication is altered to indicate the transition from the floating point mode to the packed data mode is no longer speculative. From step 738, flow passes to step 740. The operation of the speculative indication will be further described with reference to FIG. 8.

As shown in step 746, it is determined whether the packed data instruction causes the processor to write to any aliased registers. If so, flow passes to step 748.

Otherwise, flow passes to step 750. Thus, step 746 is similar to step 436 of FIG. 4B.

At step 748, the aliased registers' corresponding dirty indications are altered to the dirty state and flow passes to step 750. These dirty indications are used in step 728 when transitioning from the packed data mode to the floating point mode. As previously described, these dirty indications are used to identify those floating point registers whose sign and exponent fields should be written to 1's. While in one embodiment 1's are written into the sign and exponent fields, alternative embodiments could use any value representing NAN (not a number) or infinity. Steps 746 and 748 would not be required in an alternative embodiment in which the sign and exponent fields were not altered. As shown in step 750, the packed data instruction is executed without generating any numeric exceptions. Thus, step 750 is similar to step 440 of FIG. 4B, except the top of stack indication is not altered. As previously described, alternative embodiments which are not completely operating system invisible could be implemented such that either additional event handlers are incorporated into the operating system or existing event handlers are altered to service the errors. If any memory events are generated as a result of attempting to execute the packed data instruction, execution is interrupted and the event is serviced. Of course, an embodiment which did not utilize the EMMS instruction would not require steps 740, 742 and 744.

Thus, a method and apparatus for executing packed data instructions that is compatible with existing operating systems (such as MS-DOS Windows brand operating environments available from Microsoft Corporation of Redmond, Washington) and that promotes good programming techniques is described. Since the packed data state is aliased on the floating point state, the packed data state will be preserved and restored by existing operating systems as if it was the floating point state. Furthermore, since events generated by the execution of the packed data instructions are serviceable by existing operating system event handlers, these event handlers need not be modified and new event handlers need not be added. As a result, the processor is backwards compatible and upgrading does require the cost and time required to develop or modify an operating system.

Variations of this embodiment, some of which were described, may be fully or partially compatible such operating systems and/or promote good programming techniques. For example, an alternative embodiment of the invention may move certain steps to different locations in the flow diagram. Other embodiments of the invention may alter or remove one or more steps. If certain steps are removed from FIGS. 7A, 7B and/or 7C, certain hardware would not be required in FIG. 6A. For example, if the EMMS instruction is not utilized, the EMMS indication is not required. Of course, the invention could be useful for any number of system architectures and is not limited to the architecture described herein.

Furthermore, while a method and apparatus has been described for aliasing two physical register files, alternative embodiments could alias any number of physical register files to execute any number of different types of instructions. In addition, while this embodiment has been described with reference to a physical stack register file for executing floating point instructions and a physical flat register file for executing packed data instructions, the teachings herein can be used for aliasing at least one physical stack register file and at least one physical flat register file, regardless of the type of instructions that are to be executed on these register files.

In addition, while a method and apparatus has been described for executing floating point and packed data instructions, alternative embodiment could be implemented to execute any number of different types of instructions. For example, as previously described, the packed data instructions could be implemented to cause the processor to perform packed integer operations and/or packed floating point operations. As another example, alternative embodiment could alias physical register files for the execution of scalar floating point and scalar integer instructions, rather than or in addition to packed data instructions. As another example, rather than aliasing the packed data instructions on the floating point registers, alternative embodiments could alias the packed data instructions on the integer registers. As another example, alternative embodiment could alias the execution of scalar floating point, scalar integer, and packed instructions (integer and/or floating point) on a single logical register file. Thus, the teaching herein can be used for causing it to logically appear to software that a single logical register file is available for the execution of instructions that operate on different data types.

Figure 7A:
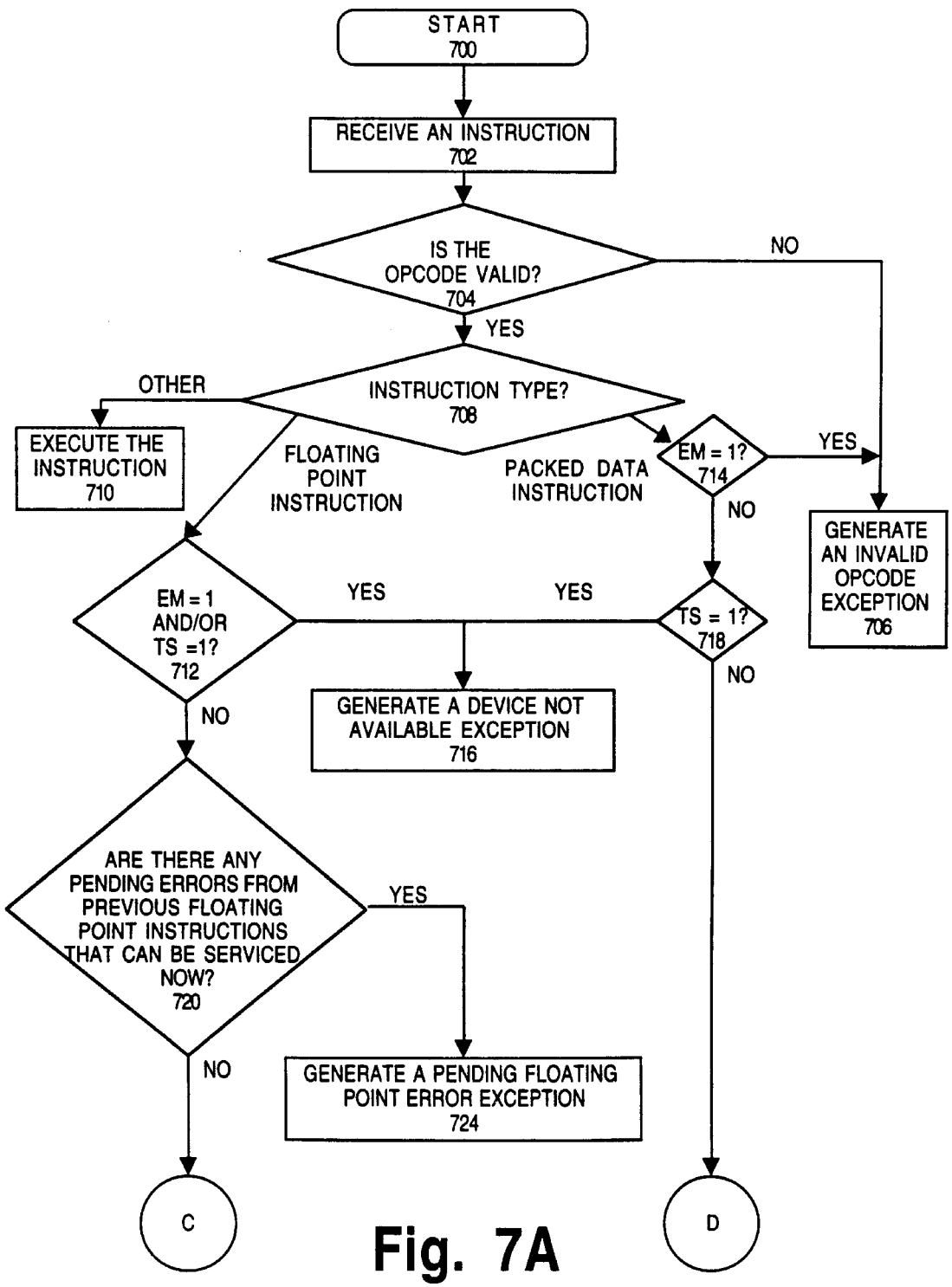
FIGS. 7A is a flow diagram illustrating a portion of a method, in accordance with one embodiment of the invention, for executing packed data instructions on a set of registers that are aliased on a set of floating point registers in a manner that is compatible with existing software, that is invisible to various operating system techniques, that promotes good programming practices, and that may be practiced using the hardware arrangement of FIG. 6A.
Figure 7B:
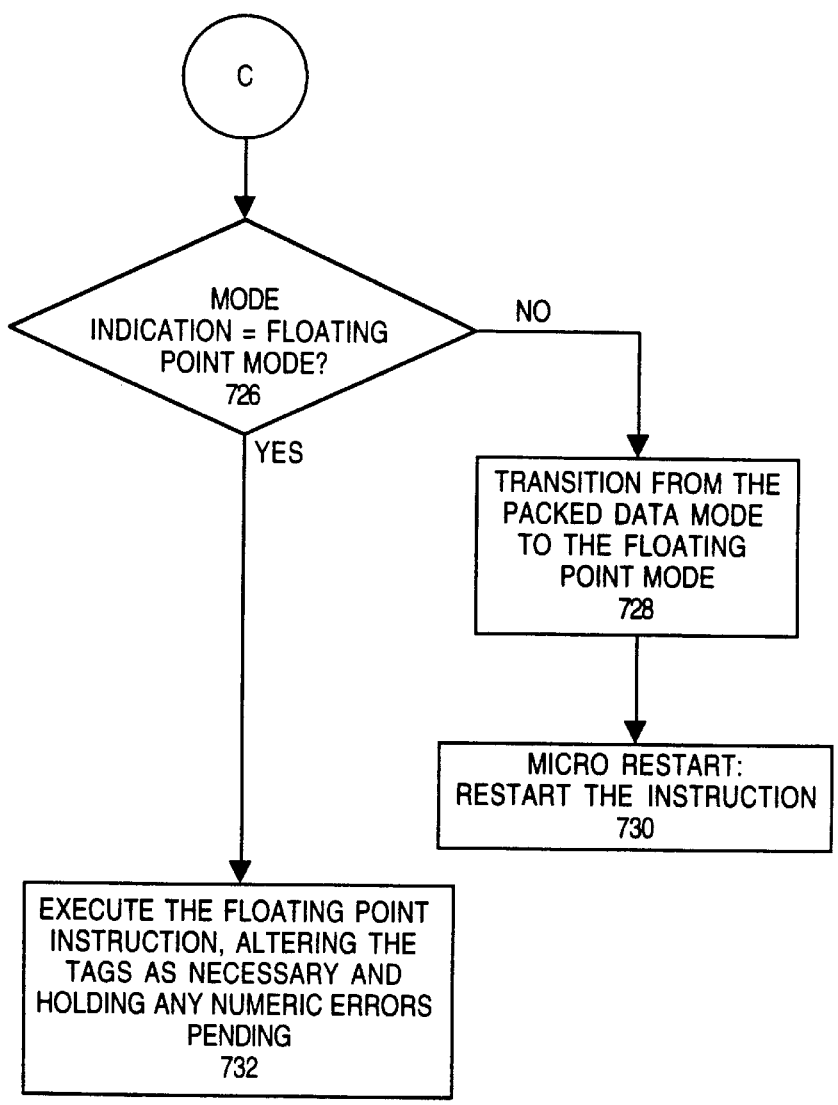
FIG. 7B is a flow diagram illustrating another portion of the method partially illustrated in FIG. 7A.
Figure 7C:
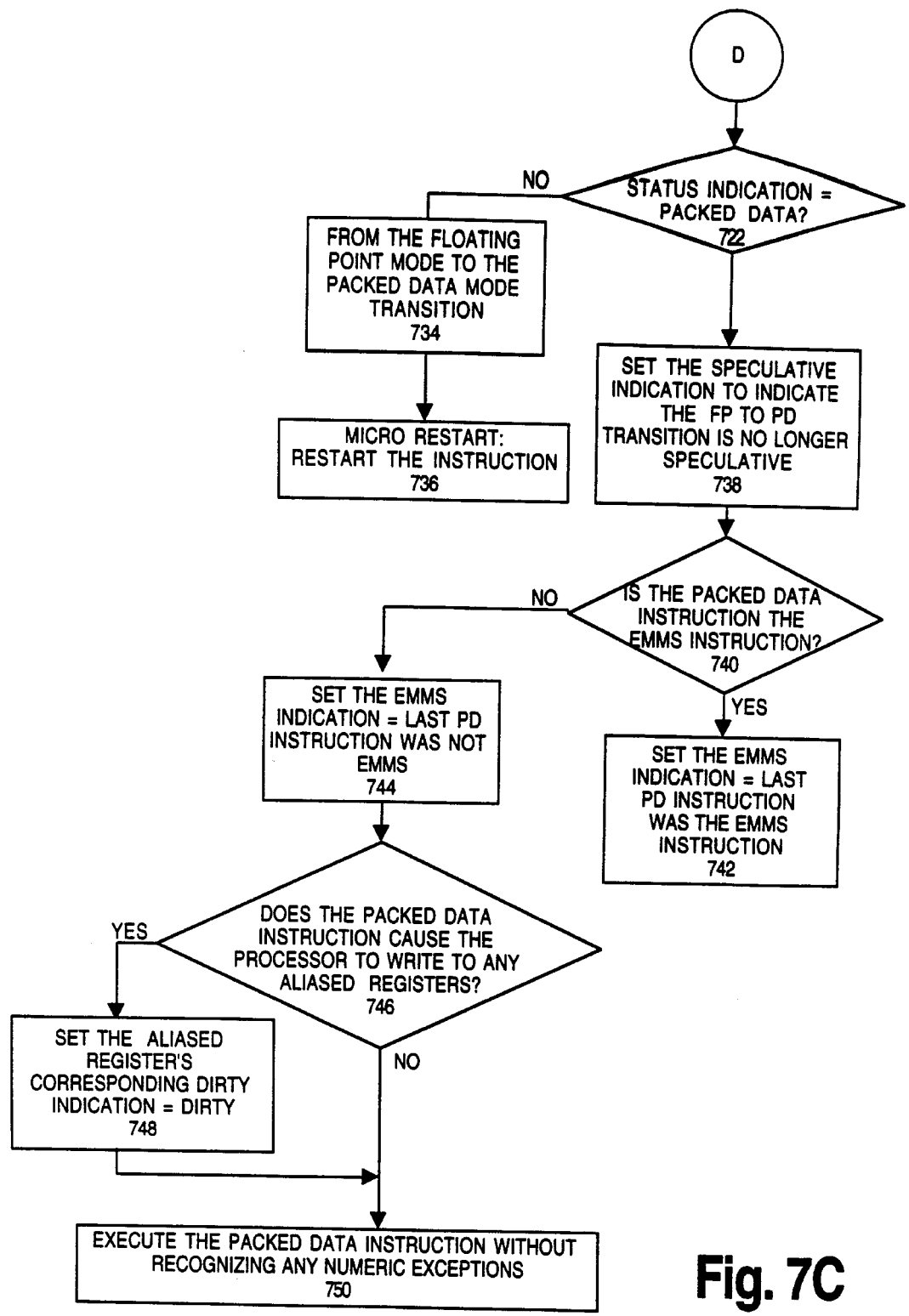
FIG. 7C is a flow diagram illustrating the remainder of the method partially illustrated in FIGS. 7A and 7B.
Figure 8:
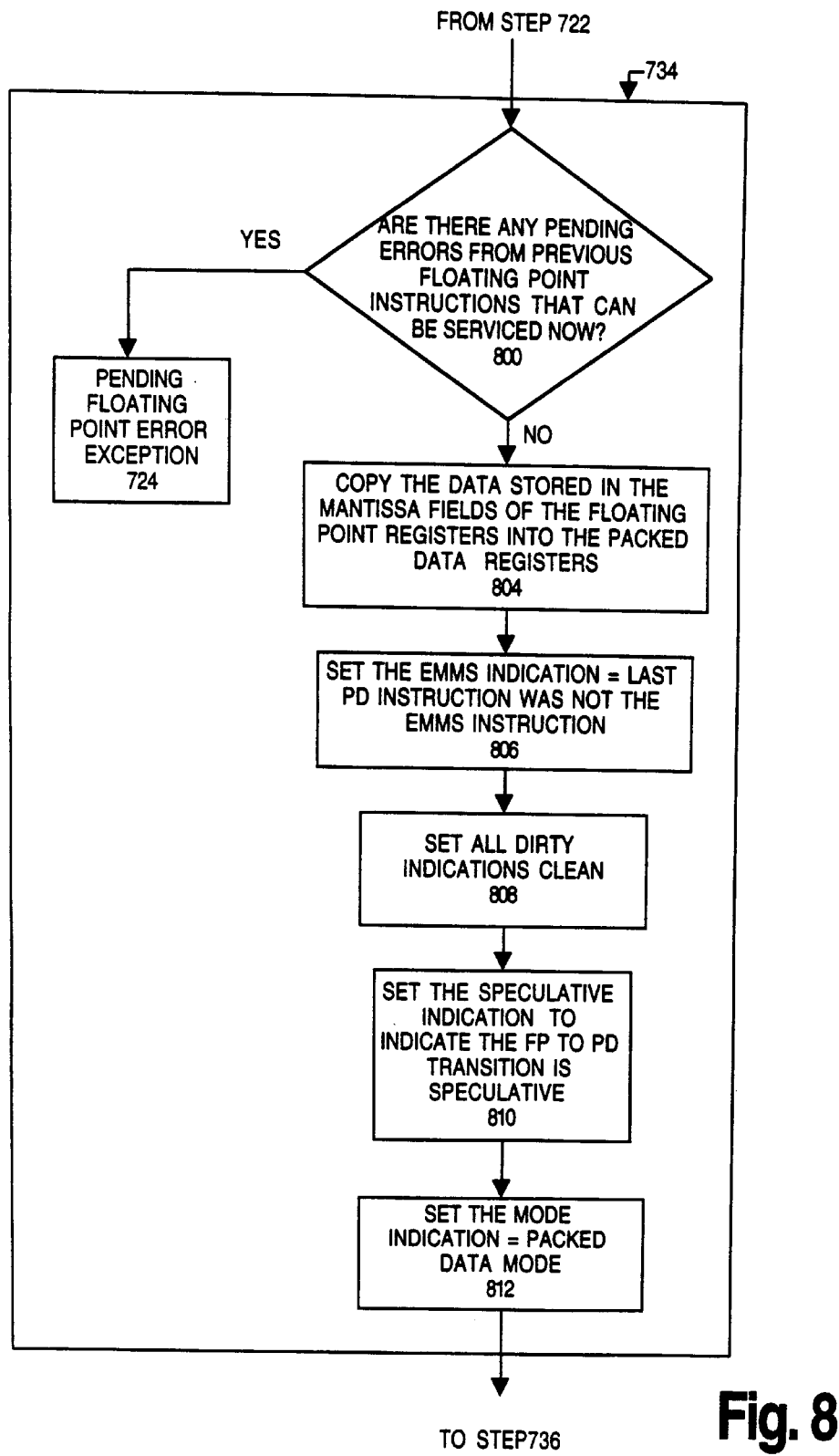
FIG. 8 is a flow diagram illustrating a method for performing step 734 from FIG. 7C according to one embodiment of the invention

FIG. 8 is a flow diagram illustrating a method for performing step 734 from FIG. 7C according to one embodiment of the invention. As previously described, at step 754 the processor is transitioned from the floating point mode to the packed data mode. From step 722, flow passes to step 800.

As shown in step 800, it is determined whether there are any pending errors from previous floating point instructions. If so, flow passes to step 724. Otherwise, flow passes to step 804. Thus, step 800 is similar to step 720 from FIG. 7 and step 422 from FIG. 4A.

As previously described, at step 724 the pending floating point error exception is generated and the appropriate event handler is executed. As previously described with reference to step 424 from FIG. 4A, this event may be treated as an internal or external event and serviced accordingly. In an alternative embodiment, such errors are left pending during the execution of packed data instructions.

As shown in step 804, the data stored in the mantissa fields of the floating point registers is copied into the packed data registers. In so doing, data which was stored in the floating point registers can be operated on as packed data. If full aliasing is implemented, the data stored in the mantissa fields of all the floating point registers is copied into the corresponding packed data registers. In contrast, if partial aliasing is implemented, an embodiment may be implemented such that data stored in the mantissa fields of only those floating point registers whose corresponding tag indicates the non-empty state are copied into the appropriate corresponding packed data registers. Alternative embodiments which will not allow data stored in the floating point registers to be operated on as packed data need not perform step 804. From step 804, flow passes to step 806.

At step 806, the EMMS indication is altered to indicate the last packed data instruction was not the EMMS instruction and flow passes to step 808. This step is performed to initialize the packed data mode.

As shown in step 808, each of the dirty indications is altered to indicate the clean state and flow passes to step 810. Steps 806 and 808 are performed to initialize the packed data mode.

As shown in step 810, the speculative indication is altered to indicate the floating point to packed data transition is speculative. Although the data stored in the floating point registers was copied into the packed data registers in step 804, the state of the floating point unit was not altered. Thus, the floating point state is still current (e.g., the data stored in the mantissa fields of the floating point registers is equivalent to that stored in the packed data registers; the tags have not be altered; and the top of stack indication has not been altered). If a packed data instruction is subsequently executed, the data stored in the packed data registers will be altered and the floating point state will no longer be current. As a result, a transition from the packed data mode to the floating point mode will require that the floating point state be updated (e.g., the data stored in the packed data registers will have to be copied into the mantissa fields of the floating point registers; the top of stack indication will have to be altered to 0, and the tags will have to be altered to the empty state). However, if execution of a floating point instruction is attempted prior to the execution of any packed data instructions (this can result if an event is generated prior to the execution of the packed data instruction that caused the floating point mode to packed data mode transition—e.g., if a memory fault occurred during the attempted execution of the packed data instruction), the floating point state need not be updated as it is still current. By avoiding this updating, the overhead for transitioning from the packed data mode back to the floating point is significantly reduced. To take advantage of this fact, the speculative indication is altered in this step to indicate the transition from the floating point unit to the packed data unit is speculative —the floating point state is still current. If a packed data instruction is subsequently executed, the speculative indication is altered to indicate the transition is no longer speculative as previously described with reference to step 744 from FIG. 7. The use of the speculative indication is further described with reference to FIG. 9. While one embodiment has been described in which the speculative indication is used, alternative embodiments could avoid implementing such a speculative indication.

At step 812, the mode indication is altered to indicate the processor is now in the packed data mode. From step 812, flow passes to step 736.

Figure 9:
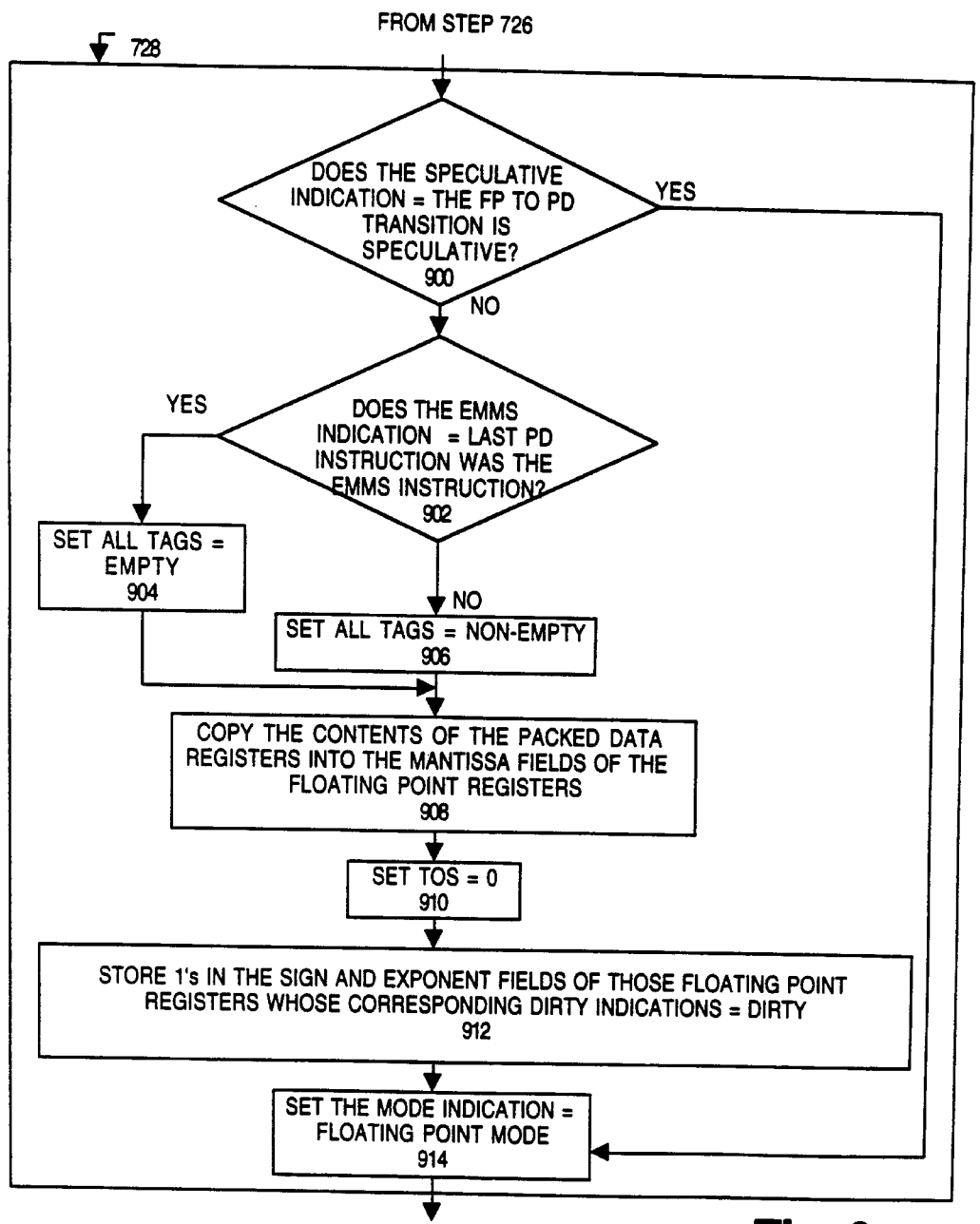
FIG. 9 is a flow diagram illustrating a method for performing step 728 from FIG. 7B according to one embodiment of the invention.

FIG. 9 is a flow diagram illustrating a method for performing step 728 from FIG. 7 according to one embodiment of the invention. As previously described, the processor is transitioned from the packed data mode to the floating point mode in step 728. From step 726, flow passes to step 900.

At step 900, it is determined if the speculative indication indicates the transition to the packed data mode is still speculative. As previously described, the speculative indication can be used to reduce the overhead for transitioning from the packed data mode to the floating point mode. If it is determined in step 900 that the floating point to packed data transition is speculative, then steps 902 through step 912 are avoided, flow passes directly to step 914, and the transitioning overhead is reduced. Otherwise, flow passes to step 902.

As shown in step 902, it is determined whether the EMMS indication indicates the last packed data instruction was the EMMS instruction. If so, flow passes to step 904. Otherwise, flow passes to step 906. As previously described, the fact that the packed data instructions are executed on a separate unit (i.e., the packed data unit) makes it more efficient to store indications (e.g., the EMMS indication) that identify what must be done when transitioning back to the floating point mode than to perform certain operations (e.g., alter the tags). Thus, rather than altering the tags in response to the EMMS instruction, the EMMS indication was altered. Then, when performing the transition back to the floating point mode, the tags are altered accordingly as shown here.

At step 904, all the tags are altered to the empty state and flow passes to step 908. In this manner, the tags are altered in a similar manner as in step 432 from FIG. 4B.

At step 906, all the tags are altered to a non-empty state and flow passes to step 908. In this manner, the tags are altered in a similar manner as in step 440 from FIG. 4B.

As shown in step 908, the contents of the packed data registers are copied into the mantissa fields of the floating point registers and flow passes to step 910. In this manner, the data stored in the packed data registers can be operated on as floating point data. Furthermore, since existing operating systems already store the floating point state when performing multi-tasking, the packed data state is stored and restored from the various context structures as if it is the floating point state. In this manner, the physical packed data registers are aliased on the physical floating point registers and the processor logically appears to have a single logical register file. As a result, the embodiment is invisible to the software, including the operating system. If full aliasing is implemented, the data stored in the all the packed data registers is copied into the mantissa fields of the corresponding floating point registers. In contrast, if partial aliasing is implemented, an embodiment may be implemented such that the data stored in the only those packed data registers that were touched is copied into the mantissa fields of the appropriate corresponding floating point registers.

As shown in step 910, the top of stack is altered to an initialization value. In one embodiment, this value is zero. In an alternative embodiment, the execution of any packed data instruction set the top of stack indication to the initialization value. From step 910, flow passes to 912.

As shown in step 912, 1's are stored in the sign and exponent fields of those floating point registers whose corresponding dirty indications are in the dirty state. In this manner, step 438 from FIG. 4B is performed. From step 912, flow passes to step 914.

At step 914, the mode indication is altered to indicate the processor is operating in the floating point mode and flow passes to step 736. In this manner, the packed data mode to floating point mode transition is performed.

Figure 10:
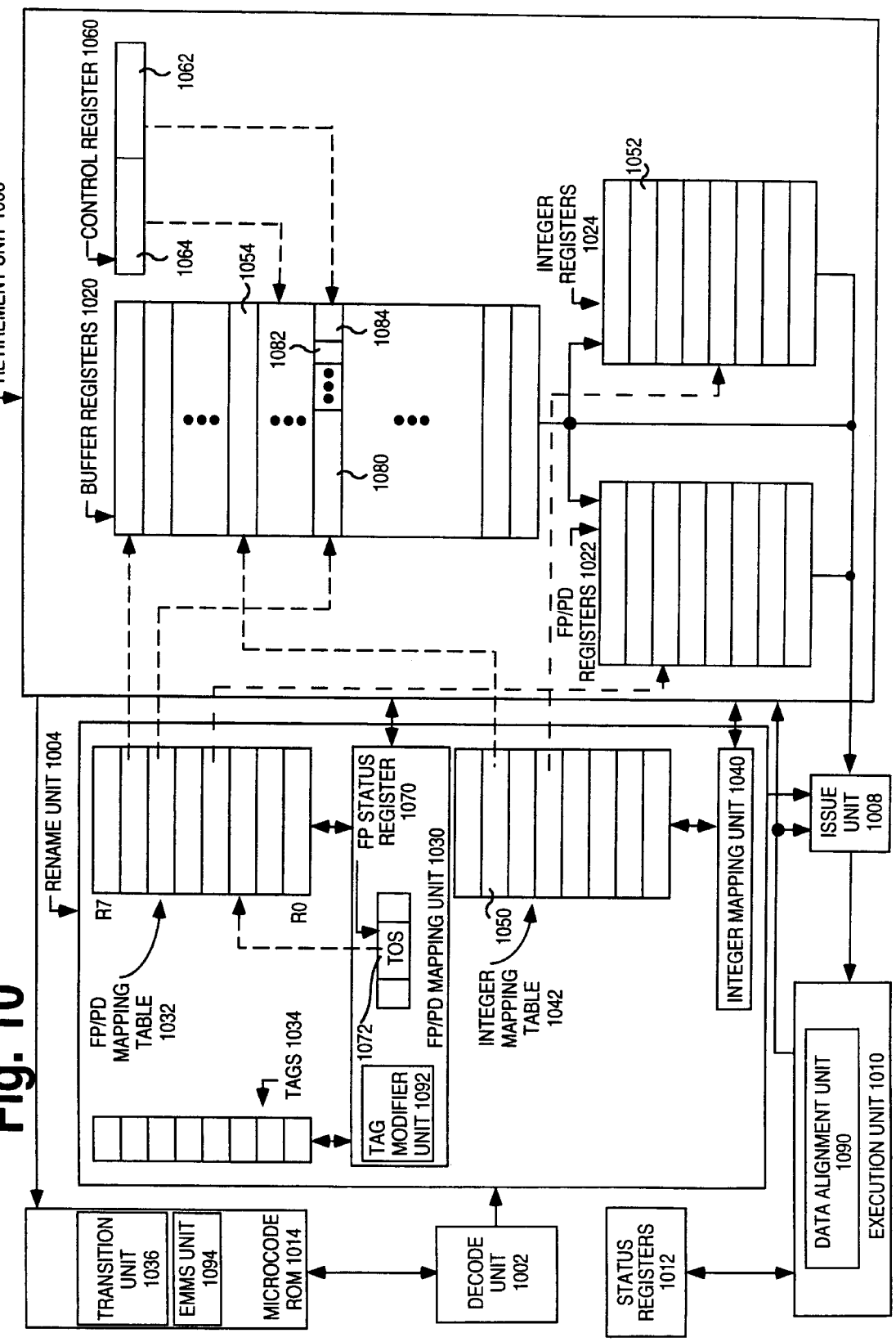
FIG. 10 is a blocked diagram illustrating the data flow through an apparatus for aliasing the packed data state on the floating point state using a single register file according to another embodiment of the invention.

FIG. 10 is a blocked diagram illustrating the data flow through an apparatus for aliasing the packed data state on the floating point state using a single physical register file according to another embodiment of the invention. The apparatus shown in FIG. 10 could be used as instruction set unit 560 from FIG. 5. In one embodiment, the apparatus in FIG. 10 is at least capable of executing instruction set 580. FIG. 10 shows a decode unit 1002, a rename unit 1004, a retirement unit 1006, an issue unit 1008, an execution unit 1010, a set of status registers 1012, and a microcode ROM 1014.

The decode unit 1002 is used for decoding instructions received by the processor into control signals and/or microcode entry points. These microcode entry points identify sequences of micro ops (also termed as "uops") that are transmitted by the decode unit 1002 to the various units in the processor. While certain micro ops may be stored in the decode unit 1002, in one embodiment the majority of the micro ops are stored in the microcode ROM 1014. In this embodiment, the decode unit 1002 transmits the microcode entry points to the microcode ROM 1014 and it responds by transmitting back to the decode unit 1002 the required micro op(s).

Most of the instructions received by the decode unit 1002 contain one or more operands (either data, a register location, or a location in memory) on which the operation(s) of the instructions are to be performed. Those operands that identify registers are transmitted to the rename unit 1004.

The rename unit 1004 and the retirement unit 1006 are used to implement register renaming. The technique of register renaming is well known and is performed to avoid storage conflicts resulting from different instructions attempting to use a limited number of storage locations, such as registers. A storage conflict is said to have occurred when such instructions interfere with one another even though the conflicting instructions are otherwise independent. Storage conflicts can be removed by providing additional registers (referred to herein as buffer registers) that are used to reestablish the correspondence between registers and values. To implement register renaming, the processor typically allocates a different one of the buffer registers for every new value produced: that is, for every instruction that writes a register. An instruction identifying the original register —for the purpose of reading its value —obtains instead the value in the allocated buffer register. Thus, the hardware renames the original register identifying the instructions to identify the buffer register and the correct value. The same register identifier in several different instructions may access different hardware registers, depending on the locations of register references with respect to register assignments. For a further description of register renaming, see Johnson, Mike *Superscalar Micro Processor Design*, 1991 by PTR Prentice-Hall, Inc., New Jersey; "Flag Renaming and Flag Mask Within Register Alias Table," U.S. Ser. No. 08/204,521, by Colwell, et al.; "Integer and Floating Point Register Alias Table Within Processor Device," U.S. Ser. No. 08/129,678, by Clift, et al.; and "Partial Width Stalls Within Register Alias Table," U.S. Ser. No. 08/174,841, by Colwell, et al. When an instruction has successfully completed execution (without causing any events that are not held pending), the instructions allocated buffer registers are "retired"—the values are transferred from the buffer registers to the original registers identified in the instruction. Alternative embodiments could implement any number of techniques for removing storage conflicts, such as interlocks, partial renaming, etc.

The retirement unit 1006 includes a set of buffer registers 1020, as set of FP/PD registers 1022, and a set of integer registers 1024. The set of buffer registers 1020 provide the additional registers used for register renaming. While in one embodiment, the set of buffer registers 1020 includes forty registers, alternative embodiments could implement any number of registers. In this embodiment, the set of buffer registers 1020 is operated as a reorder buffer.

In one embodiment, the FP/PD registers 1022 and integer registers 1024 are visible to the software: that is, these are the registers that are identified in the instructions, and thus it appears to the software that these are the only registers for executing floating point data, packed data, and integer data. In contrast, the buffer registers 1020 are invisible to the software. Thus, the FP/PD registers 1022 is a single physical register file that appears to software as a single logical register file. In one embodiment, the set of FP/PD registers 1022 and the set of integer registers 1024 each contain eight registers to remain compatible with existing Intel Architecture software. However, alternative embodiments could implement any number of registers.

The rename unit 1004 includes a FP/PD mapping unit 1030, a FP/PD mapping table 1032, a set of tags 1034, an integer mapping unit 1040, and an integer mapping table 1042. When an operand is received by the rename unit 1004, it is determined whether the operand is a floating point operand, a packed data operand, or an integer operand.

Integer operands are received by the integer mapping unit 1040. The integer mapping unit 1040 controls the integer mapping table 1042. In one embodiment, the integer mapping table 1042 contains the same number of entries as there are registers in the integer registers 1024. Each of the entries in the integer mapping table 1042 corresponds to a different one of the integer registers 1024; in FIG. 10, the entry 1050 corresponds to integer register 1052. When an instruction is received that will cause the processor to write to an integer register (e.g., integer register 1052), the integer mapping unit 1040 allocates one the buffer registers 1020 by storing a pointer in the integer register's corresponding entry in the integer mapping table 1042 (e.g., entry 1050) identifying an available register in the set of buffer registers 1020 (e.g., buffer register 1054). The data is written to the selected buffer register (e.g., buffer register 1054). When execution of the instruction which generated the operand has been completed without any interrupts (without any events being taken), the retirement unit 1006 "commits" the data by copying it from the selected buffer register (e.g., buffer register 1054) into the appropriate integer register (e.g., integer register 1052) and causes the integer mapping unit 1040 to update the contents of the entry (e.g., entry 1050) to indicate the data is stored in the entry's corresponding integer register.

When an instruction is received that will cause the processor to read an integer register, the processor accesses the contents of the integer register's corresponding entry in the integer mapping table 1042 (e.g., entry 1050) using FP/PD mapping unit 1030. If the entry contains a pointer to a buffer register (e.g., buffer register 1054), the processor reads the contents of that buffer register. However, if the contents of that entry indicate the data is stored in the entry's corresponding integer register (e.g., integer register 1052), the processor reads the contents of the entry's corresponding integer register. Thus, the integer registers 1024 are implemented as a fixed register file in this embodiment of the invention.

The FP/PD mapping unit 1030 controls the FP/PD mapping table 1032 and the tags 1034. As previously described, each of these tags may be implemented using any number of bits. Similar to the integer mapping unit 1040, the FP/PD mapping table 1032 contains the same number of entries as there are registers in the FP/PD registers 1022. Each of the entries in the FP/PD mapping table 1032 corresponds to a different one of the FP/PD registers 1022. Floating point and packed data operands are received by the FP/PD mapping unit 1030, mapped to the buffer registers 1020 and retired to the FP/PD registers 1022. Thus, the floating point state and the packed data state are aliased on a single user visible register file. Since existing operating systems are implemented to cause the processor to store the floating point state when multi-tasking, these same operating systems will cause the processor to store any packed data state that is aliased on the floating point registers.

In one embodiment, the packed data operands are handled in a similar manner to the integer operands—the packed data registers are implemented as a fixed register file. Thus, when an packed data instruction is received that will cause the processor to write to a FP/PD register, the FP/PD mapping unit 1030 allocates one the buffer registers 1020 by storing a pointer in the FP/PD register's corresponding entry in the FP/PD mapping table 1032 identifying an available register in the set of buffer registers 1020. The data is written to the selected buffer register. When execution of the instruction which generated the operand has been completed without any interrupts (without any events being taken), the retirement unit 1006 "commits" the data by copying it from the selected buffer register into the appropriate FP/PD register (the FP/PD registers that corresponds to the entry in the FP/PD mapping table 1032) and causes the FP/PD mapping unit 1030 to update the entry in the FP/PD mapping table 1032 to indicate the data is stored in the entry's corresponding FP/PD register.

While the registers are implemented as a fixed registers file when executing packed data instructions, one embodiment of the invention implements the registers as a stack referenced register file when executing floating point instructions in a manner that is compatible with existing Intel Architecture software (including operating systems). As a result, the FP/PD mapping unit 1030 must be able to operate the FP/PD mapping table 1032 as both a fixed register file for packed data operands and as a stack for floating point operands. To this end, the FP/PD mapping unit 1030 includes a floating point status register 1070 having a top of stack field 1072. The top of stack field 1072 is used for storing a top of stack indication identifying an entry in the FP/PD mapping table 1032 which represents the register currently at the top of the floating point stack. Of course, alternative embodiments could operate the registers as a flat register file when executing floating point instructions.

When a floating point instruction is received that will cause the processor to write to a FP/PD register, the FP/PD mapping unit 1030 alters the top of stack indication and allocates one the buffer registers 1020 by storing in the top of stack register's corresponding entry in the FP/PD mapping table 1032 a pointer identifying an available register in the set of buffer registers 1020. The data is written to the selected buffer register. When execution of the instruction which generated the operand has been completed without any interrupts (without any events being taken), the retirement unit 1006 "commits" the data by copying it from the selected buffer register into the appropriate FP/PD register (the FP/PD registers that corresponds to the entry in the FP/PD mapping table 1032) and causes the FP/PD mapping unit 1030 to update the entry in the FP/PD mapping table 1032 to indicate the data is stored in the entry's corresponding FP/PD register.

When a floating point instruction is received that will cause the processor to read a FP/PD register, the processor accesses the contents of the top of stack register's corresponding entry in the FP/PD mapping table 1032 and alters the stack accordingly. If a pointer to a buffer register is stored in that entry, the processor reads the contents of that buffer register. However, if the contents of that entry indicate the data is stored in the entry's corresponding FP/PD in FP/PD registers 1022, the processor reads the contents of that FP/PD register.

Thus, since the FP/PD mapping unit 1030 maps floating point operands onto a stack referenced register file, the entries in the FP/PD mapping table 1032 must be accessed relative to the top of the stack. In contrast, since the FP/PD mapping unit 1030 maps packed data operands onto a fixed register file, the entries in the FP/PD mapping table 1032 must be accessed relative to register RO. To cause the processor to access the entries in the FP/PD mapping table relative to register RO, the top of stack indication must be altered to indicate register RO. Therefore, the top of stack indication must be altered to indicate register RO while the processor is executing packed data instructions. This may be accomplished by altering the top of stack indication Lo indicate register RO during transitions from the floating point mode to the packed data mode and by not altering the top of stack indication during the execution of packed data instructions. In this manner, the same circuitry used to map the floating point stack can be used to map the fixed packed data register file. As a result, circuit complexity is reduced and die area is saved over the embodiment described with reference to FIG. 6A. While one embodiment has been described in which the same circuitry is used for mapping both packed data and floating point operands, alternative embodiments could utilize separate circuitry.

Regardless of the type of instruction being executed, in one embodiment the allocation and deallocation of the buffer registers is handled in the same manner. The retirement unit 1006 includes a control register 1060 having an allocation field 1062 and a retirement field 1064. The allocation field 1062 stores an allocation pointer identifying the next buffer register to be used. When either the FP/PD mapping unit 1030 or the integer mapping unit 1040 requires a register, the current allocation pointer is stored in the appropriate mapping table (i.e., the FP/PD mapping unit 1030 or the integer mapping table 1042) and the allocation pointer is incremented. In addition, the rename unit 1004 transmits to the retirement unit 1006 signals indicating whether the instruction is a packed data instruction and whether the processor is in the packed data mode.

In the allocated buffer register, the retirement unit 1006 stores a ready indication in a ready field 1082. The ready indication is initially altered to indicate the buffer register is not ready for retirement. However, when the data is written into a data field 1080 of the buffer register, the buffer register's ready indication is altered to indicate the buffer register is ready for retirement.

The retirement field 1064 of control register 1060 stores a retirement pointer identifying the next buffer register to be retired. When that buffer register's ready indication is altered to the ready state, the retirement unit 1006 must determine if the data in that buffer register can be committed. As is further described later, one embodiment of the retirement unit 1006 does not commit the data if any exceptions must be generated (e.g., the device not available exception, the pending floating point error exception, the invalid opcode exception, etc.) or if any transitions between the packed data and floating point modes are required. If the data can be committed, the data is copied into the appropriate FP/PD or integer register and the retirement pointer is incremented to the next buffer register. While the retirement and allocation pointers have been described as being stored in a control register, alternative embodiment could store these pointers, as well as any of the other information (e.g., the EMMS indication, the mode indication, etc.) described herein, in some form of sequential element, such as a set of flip-flops.

While one embodiment has been described in which the retirement unit 1006 includes three separate sets of registers and data is committed from the buffer registers to the FP/PD registers or the integer registers, an alternative embodiment could be implemented to include any number of different sets of registers. For example, one alternative embodiment could include a single set of registers. In this embodiment, each register in this set of registers would include an indication identifying if the data stored therein had been committed.

In one embodiment, the processor is either in a floating point mode or a packed data mode. If the processor is not in the packed data mode, the processor cannot properly execute any packed data instructions, and vice versa. As a result, prior to committing data stored in a buffer register, the retirement unit 1006 determines whether the data is packed data and whether the processor is in the packed data mode. If the data is packed data and the processor is not in the packed data mode, a transition unit 1036 contained in the microcode ROM 1014 is invoked to perform a transition to the packed data mode. In one embodiment, it is determined if the processor is in the packed data mode by determining if the top of stack indication is altered to the initialization value (e.g., to indicate register R0) and all the tags 1034 are in a non-empty state.

There are a number of techniques for causing the processor to poll the top of stack indication and the tags 1034 to determine if the processor is in the packed data mode. For example, as previously described, the decode unit 1002 accesses micro ops from the microcode ROM 1014. These micro ops include an encoded field for identifying the appropriate mapping to be performed by the FP/PD mapping unit 1030 (e.g., increment the top of stack indication, decrement the top of stack indication, etc.) In one embodiment at least one additional encoded bit pattern (referred to herein as the "packed data bit pattern") is included for identifying the mapping for packed data instructions. Thus, when the decode unit 1002 receives a packed data instruction and accesses the microcode ROM 1014, at least one of the micro ops transmitted to the decode unit 1002 includes the packed data bit pattern.

Upon receiving a micro op containing the packed data bit pattern, the FP/PD mapping unit 1030: 1) determines the state of the tags 1034 and the top of stack indication; 2) transmits to retirement unit 1006 signal(s) indicating whether a transition to the packed data mode is required (in one embodiment, the mode of the processor and the type of instruction is transmitted). In response, retirement unit 1006 stores in any buffer registers allocated by the instruction a transition indication in a transition field 1084 (in one embodiment, the transition indication includes a first bit indicating the mode of the processor and a second bit indicating the type of instruction). Thus, if the instruction is a packed data instruction and the processor is not in the packed data mode, the mode indication of the appropriate buffer registers are altered to indicate a transition is required. Otherwise, the mode indication is altered to indicate a transition is not required. When the ready indication of the buffer register identified by the retirement pointer is altered to the ready state, the retirement unit 1006 checks the transition indication. If the transition indication indicates a transition is not required and if the data can otherwise be retired (e.g., there are not events that must be serviced), the data is retired. In contrast, if the transition indication in indicates a transition is required, the retirement unit 1006 transmits the microcode entry point for transition unit 1036 to the microcode ROM 1014. In response, the microcode ROM 1014 transmits the necessary micro ops to transition the processor to the packed data mode.

In this manner, the incorporation of the transition to the packed data mode requires only a slight increase in complexity. Of course, alternative embodiment could implement this functionality any number ways, including: 1) having the decode unit 1002 transmit special signals upon receiving a packed data instruction that cause the rename unit 1004 to poll the tags and top of stack indication; 2) adding bits to all the micro ops to indicate whether the tags and top of stack should be polled; 3) having the FP/PD mapping unit 1030 poll the tags and top of stack indication every time a buffer register is allocated; 4) having the retirement unit 1006 indicate to the FP/PD mapping unit 1030 when a packed data item is ready to be committed, and having the FP/PD mapping unit 1030 invoke the transition unit 1036 if the processor is not in the packed data mode; etc. While in one embodiment, it is determined whether the processor is in the packed data mode based on the top of stack indication and the tags 1034, alternative embodiments could use any number of techniques, including a mode indication as previously described.

As previously described, the transition unit 1036 is used for transitioning the processor from the floating point mode to the packed data mode. The transition unit 1036 causes the processor to alter the top of stack indication to the initialization value and to alter all of the tags 1034 to the non-empty state. In this manner, the rename unit 1004 is initialized for the execution of packed data instructions. Upon completion of the transition, the instruction that caused the floating point to packed data mode transition is micro restarted. As a result, non-microcode event handlers (including operating system event handlers) are not required and the embodiment is operating system invisible. While the transition unit 1036 is shown located in the microcode ROM 1014, alternative embodiments could locate the transition unit 1036 anywhere on the processor. In another alternative embodiment, the transition unit 1036 could be implemented to perform transitions from the floating point mode to the packed data mode. During this transition, the transition unit 1036 would preserve the current top of stack indication in a storage area and alter the top of stack indication to the initialization value. When the transition unit 1036 is again invoked to transition back to the floating point mode, the transition unit 1036 would restore the previous top of stack indication. Furthermore, in alternative embodiments, the transition unit 1036 could be implemented in hardware or as a non-microcode event handler stored outside of the processor.

As previously described with reference to one embodiment, each grouping of packed data instructions is to terminate with the EMMS instruction. In response to executing the EMMS instruction, the execution unit 1010 causes the rename unit 1004 to alter the tags 1034 to the empty state. Thus, after executing the EMMS instruction, the processor is in the floating point mode: that is, all the tags 1034 are in the empty state and the top of stack indication is in the initialization state (as previously described, the top of stack indication was altered to the initialization value when transitioning to the packed data mode and was not altered during the execution of packed data instructions). As a result, a transition unit is not required for performing a transition from the packed data mode to the floating point mode. This is unlike the transition unit described with reference to FIG. 6A that must be invoked to transition the processor back and forth between the floating point and packed data modes. In addition, since a single aliased register file is used for the floating point and packed data states, this transition is not required to copy data between two separate register files. As a result, circuit complexity is reduced and die area on the processor is saved.

In other alternative embodiments, the alteration of the tags and the top of stack indication could be fully or partially performed upon the execution of the packed data instructions. For example, the need for the transition unit could be avoided by: 1) causing the execution of each packed data instruction that is not the EMMS instruction to alter the top of stack indication to the initialization value and to alter the tags to the non-empty state; and 2) causing the execution of the EMMS instruction to alter the tags to the empty state. In another alternative embodiment, the EMMS instruction is not implemented, but emulated using floating point instructions as later described with reference to FIG. 14.

The issue unit 1008 represents a buffer for storing instructions and their operands. The issue unit 1008 can be implemented as a series of reservation stations, a central instruction window, or a hybrid of the two. When using reservation stations, each of the functional units (e.g., ALUs) has its own buffer for storing instructions and information identifying their corresponding operands. In contrast, when using a central instruction window, a central buffer common to all functional units is used to store the instructions and information identifying their corresponding operands. An instruction's corresponding operands can be in several different forms depending upon what information is available. If the actual data is not available, then an instruction's corresponding operands identify either registers in the set of FP/PD registers 1022, the set of integer registers 1024, or the set of buffer registers 1020, depending on the type of data and whether the data has been committed. When the actual data becomes available, then that data is stored in the buffer. In one embodiment, the issue unit 1008 also receives information from the rename unit 1004. However, this information is not necessary to understanding the invention. The issue unit 1008 issues the instructions to the execution unit 1010 when the necessary information is acquired.

The execution unit 1010 executes the instructions. The execution unit 1010 transmits any operand information which must be stored to the retirement unit 1006 for storage as previously described above. In one embodiment, since instructions may be delayed in the issue unit 1008 due to a lack of operand information, the execution unit 1010 also transmits any operand information to the issue unit 1008. In this manner, any additional delay that would be caused by sending the operand information to the retirement unit 1006 and then to the issue unit 1008 is avoided. The execution unit 1010 is coupled to the status registers 1012. The status registers 1012 store control information for use by execution unit 1010. Such control information can include an EM indication and a TS indication as previously described herein. The execution unit 1010 includes a data alignment unit 1090 (also termed as a "load/store conversion unit") for aligning the various types of data accessed from retirement unit 1006. The operation of the data alignment unit will be further described with reference to FIGS. 12 and 13.

The altering of the tags 1034 can be implemented using any number of different mechanisms. For example, FIG. 10 shows the FP/PD mapping unit 1030 also containing a tag modifier unit 1092 for altering the tags. The tag modifier unit 1092 may be implemented any number of ways, including those described with reference to FIG. 6B.

For example, in one embodiment, since the floating point instructions may be implemented such that not all of the tags need to be modified at one time, the tag modifier unit 1092 is implemented such that it can not modify all the tags at one time (one such embodiment was as previously described with reference to FIG. 6B). In order to avoid circuit complexity, the global altering of the tags in response to a transition to the packed data state or in response to the execution of the EMMS instruction may be implemented using this existing mechanism. In this regard, a set of microcode instructions, represented by the EMMS unit 1094, may be stored in the microcode ROM 1014 for implementing the EMMS instruction. The microcode instructions in the EMMS unit 1094 and in the transition unit 1036 would cause the decode unit 1002 to issue several existing micro ops for altering each of the eight tags. Thus, in response to receiving the EMMS instruction, the decode unit 1002 would access the EMMS unit 1094 and issue the several existing micro ops. In response to each of these micro ops, the tag modifier unit 1092 would modify the corresponding tags to the empty state. In contrast, in response to accessing the transition unit 1036, the decode unit 1002 would issue the several existing micro ops that would cause the tag modifier unit 1092 to alter each of the tags to the non-empty state. In such an embodiment, the global altering of the tags may require approximately 4–8 clock cycles.

While one embodiment has been described for altering all the tags in response to a transition or the EMMS instruction, alternative embodiments may use any number of mechanisms. For example, the altering of all the tags to the empty or non-empty state may be completed in a single clock cycle by including a new micro op and implementing the tag modifier unit 1092 such that it can globally alter the tags (one such embodiment for the tag modifier unit 1092 is described with reference to FIG. 6B) responsive to the new micro op. In this embodiment, the EMMS unit 1094 is implemented to causes the decode unit 1002 to issue this single micro op (rather than several separate micro ops) to alter all of the tags to the empty state. In contrast, the transition unit 1036 is implemented to cause the decode unit 1002 to issue this single micro op (rather than the several separate existing micro ops) to alter all of the tags to the non-empty state. As another example, an alternative embodiment may include a bus that couples the execution unit 1010 to the tags 1034 and the retirement unit 1006. This alternative embodiment may be implemented such that, in response to the EMMS instruction, the processor is serialized (this may be performed by the rename unit 1004), the signals are sent on the bus to cause the tags to be altered (this may be performed by the execution unit 1010), and the processor is again serialized (this may be performed by the rename unit 1004). Such an embodiment may require approximately 10–20 clock cycles to alter all of the tags. In contrast, this alternative embodiment may be implemented such that the pre- and/or post serialization is performed by another unit or is not necessary. As another example the decode unit 1002 could be coupled to tags 1034 and include additional hardware for altering all of the tags 1034 in response to receiving the EMMS instruction.

Thus, the embodiment shown in FIG. 10 utilizes a single set of registers for executing floating point and packed data instructions, rather than separate floating point and packed data units as previously described with reference to FIG. 6A. Additionally, the embodiment in FIG. 6A requires separate circuitry for access the floating point registers as a stack and the packed data register as a fixed register file, whereas the FP/PD mapping unit 1030 uses the same circuitry. Furthermore, unlike the transition unit described with reference to FIG. 6A that must be invoked to transition the processor back and forth between the floating point and packed data modes, the transition unit described with reference to FIG. 10 is only required to transition the processor from the floating point mode to the packed data mode. In addition, since a single aliased register file is used for the floating point and packed data states, this transition is not required to copy data between two separate register files. As a result, the embodiment shown in FIG. 10 requires less circuit complexity and saves die space of the processor.

As previously described, while one embodiment is being described that includes instructions for performing floating point and packed data operations, alternative embodiment could implement different sets of instructions that cause a processor to perform different data type operations. For example, one set of instructions may cause the processor to perform scalar operations (floating point and/or integer) and another set of instruction may cause the processor to perform packed operations (floating point and/or integer). As another example, one set of instructions may cause the processor to perform floating point operations (scalar and/or packed) and another set of instruction may cause the processor to perform integer operations (scalar and/or packed). As another example, the single aliased register file can be operated as a stack referenced register file and as a flat register file. In addition, while one embodiment is described in which full aliasing is implemented, alternative embodiments having a single physical register file could be implemented to operate as partially aliased. This would require some mechanism (e.g., a table) for keeping track of what data should be stored in the single aliased physical register file.

Figure 11A:
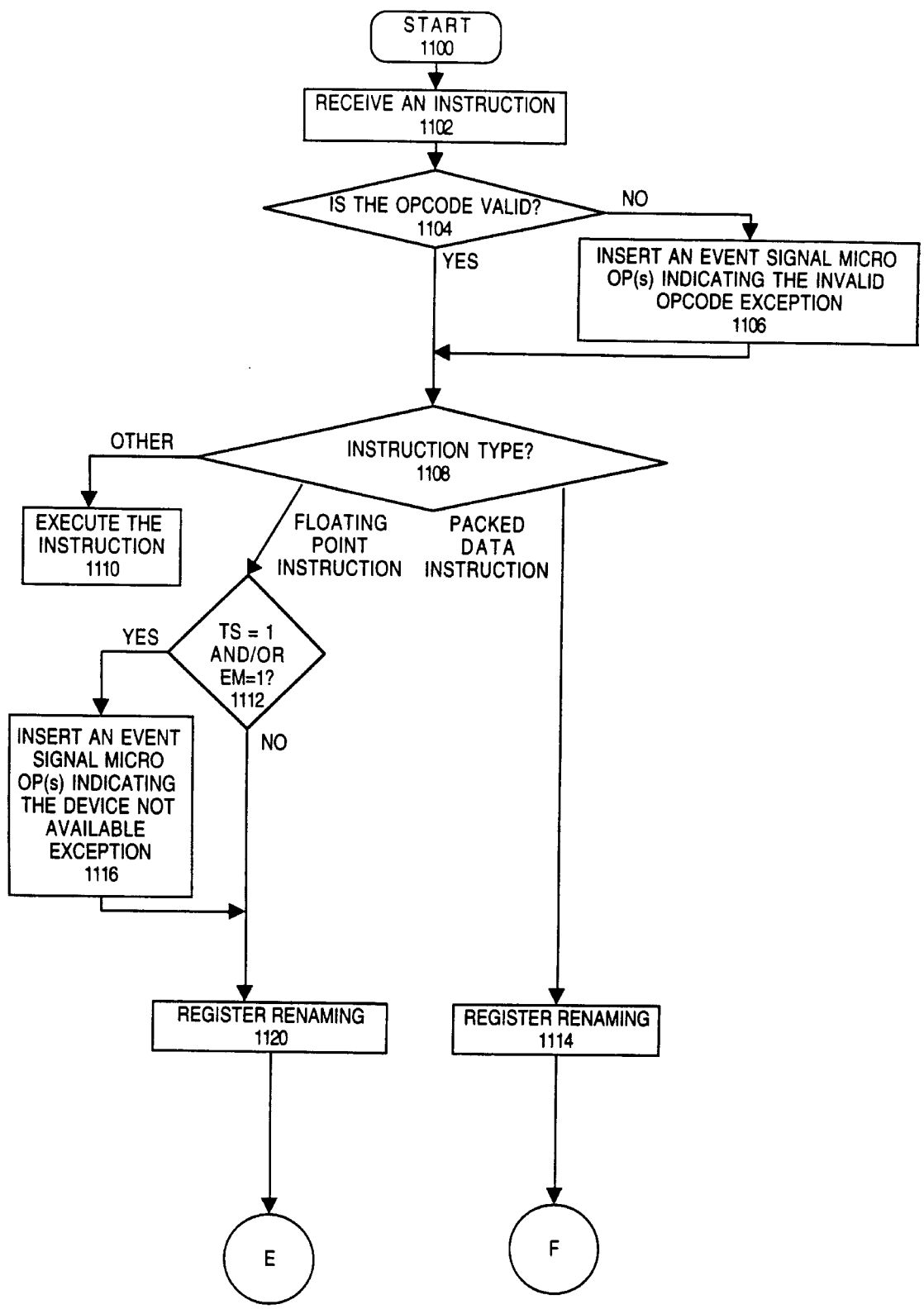
FIGS. 11A illustrates a portion of a method, in accordance with another embodiment of the invention, for executing packed data and floating point instructions on a single aliased register file in a manner that is compatible with existing software, that is invisible to various operating system techniques, that promotes good programming practices, and that may be practiced using the hardware arrangement of FIG. 10.
Figure 11B:
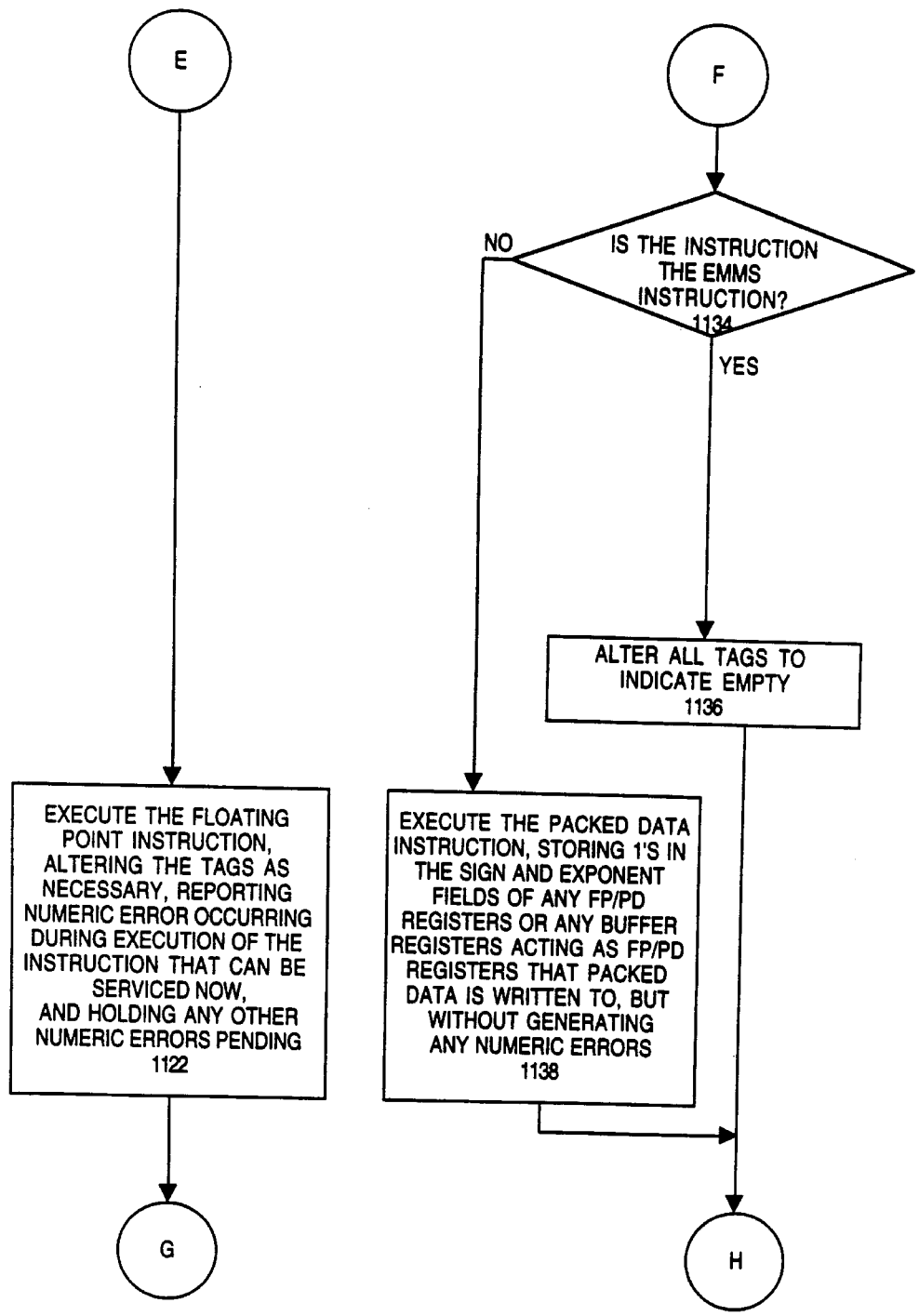
FIG. 11B is a flow diagram illustrating another portion of the method partially illustrated in FIG. 11A.
Figure 11C:
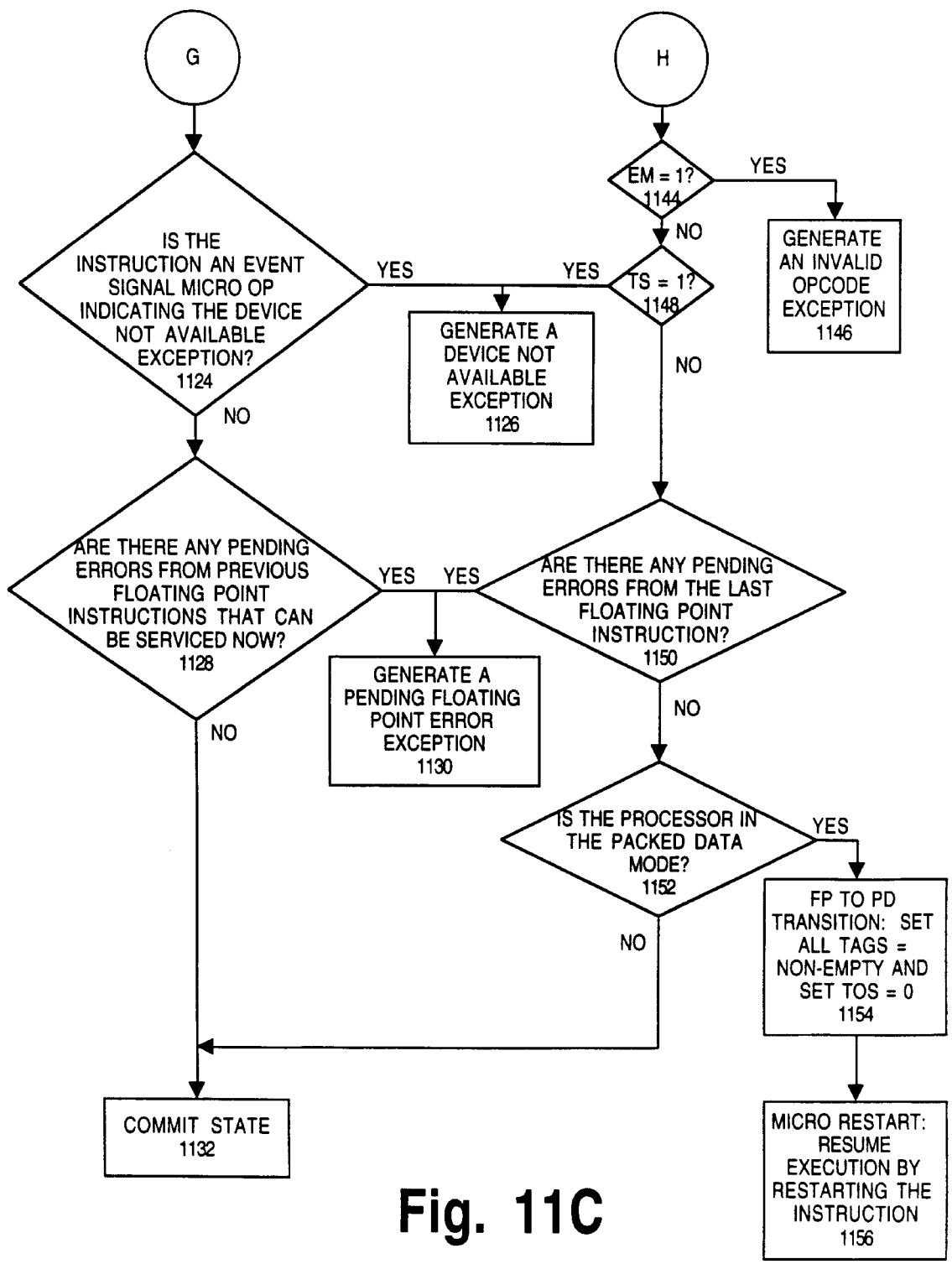
FIG. 11C is a flow diagram illustrating the remainder of the method partially illustrated in FIGS. 11A and 11B.

FIGS. 11A, 11B, and 11C illustrate a method, in accordance with another embodiment of the invention, for executing packed data and floating point instructions on a single aliased register file in a manner that is operating system invisible, that promotes good programming practices, and that may be practiced using the hardware arrangement of FIG. 10. This flow diagram is similar to the flow diagrams described with reference to FIGS. 4A–B and FIGS. 7A–C, 9, and 10. With reference to these previous flow diagrams, many alternative embodiments were described in which steps were altered, moved, and/or removed. It is to be understood that steps described with reference to FIGS. 11A–C that are similar to the steps performed in the previously described flow diagrams may be performed using such alternative embodiments. The flow diagrams start at step 1100. From step 1100, flow passes to step 1102.

As shown in step 1102, a set of bits is accessed as an instruction and flow passes to step 1104. This set of bits includes an opcode that identifies the operation(s) to perform by the instruction. Thus, step 1102 is similar to step 402 from FIG. 4A.

In one embodiment, the following steps are performed in the decode stage of the pipeline.

At step 1104, it is determined whether the opcode is valid. If the opcode is not valid, flow passes to step 1106. Otherwise, flow passes to step 1108. Step 1104 is similar to step 404 in FIG. 4.

At step 1106, one or more event signal micro ops is inserted indicating the invalid opcode exception should be generated. Event signal micro ops are used to avoid servicing errors until the retirement stage(s) of the pipeline. If an instruction is an event signal micro op, it flows through the decode stage(s), register renaming stage(s), and the execution stage(s). However, when the event signal micro op is received in the retirement stage(s), the state of the buffer registers is not committed and the appropriate event is generated. Event signal micro ops are inserted prior to or in place of the instruction which is causing the event. The use of micro ops is further described with reference to "Method and Apparatus for Signaling an Occurrence of an Event in a Processor," U.S. Ser. No. 08/203,790, by Darrell D. Boggs, et al. From step 1106, flow passes to step 1108.

At step 1108, it is determined what type of instruction has been received. If the instruction is neither a floating point instruction nor packed data instruction, flow passes to step 1110. Thus, if one or more event signal micro ops were inserted in step 1106, flow passes to step 1110. However, if the instruction is a floating point instruction, flow passes to step 1112. In contrast, if the instruction is a packed data instruction, flow passes to step 1114. Thus, step 1108 is similar to step 408 from FIG. 4A.

As shown in step 1110, the processor executes the instruction. If in step 1106 one or more micro ops were inserted that indicate the invalid opcode exception should be generated, the micro ops flow through the decode stage(s), register renaming stage(s), and the execution stage(s). However, when the event signal micro op(s) reach the retirement stage(s), the state of the buffer registers is not committed and the invalid opcode exception is generated. As previously described with reference to step 215 in FIG. 2, this event handler may be implemented to cause the processor to display a message, abort execution of the current task, and go on to execute other tasks. Of course, alternative embodiments may implement this handler in any number of ways that were previously described. Since the execution of other instructions is not necessary to understanding the invention, it is not further described here.

As shown in step 1112, it is determined whether the EM indication is equal to 1 (according to the described software convention, if the floating point unit should be emulated) and whether the TS indication is equal to 1 (according to the described software convention, if a partial context switch was performed). If the EM indication and/or the Ts indication are equal to 1, flow passes to step 1116. Otherwise, flow passes to step 1120. Thus, step 1112 is similar to step 412 from FIG. 4A.

At step 1116, one or more event signal micro ops is inserted to indicate the device not available exception should be generated. From step 1116, flow passes to step 1120.

As shown in both steps 1114 and 1120, register renaming is performed. From step 1120, flow passes to step 1122. In contrast, from step 1114, flow passes to step 1134. In one embodiment, the steps 1114 and 1120 are performed in the rename stage(s) of the pipeline.

In one embodiment, the following steps are performed in the execution stage(s) of the pipeline.

As shown in step 1122, the floating point instruction is executed. Step 1122 is similar to step 426 from FIG. 4B. To remain operating system invisible, one embodiment also alters the tags as necessary, reports any numeric errors that can be serviced now, and holds any other numeric errors pending. As previously described, altering the tags allows this embodiment to remain operating system invisible to any such operating system techniques that store the contents of only those floating point registers whose corresponding tag indicates a non-empty state. However, alternative embodiments could be implemented to be compatible with certain operating system techniques. For example, if an existing operating system does not utilize the tags, a processor that does not implement the tags would be still be compatible with that operating system. Furthermore, it is not necessary to the invention that numeric floating point exceptions be held pending, and thus, alternative embodiments which do not do so are still within the scope of the invention. From step 1122, flow passes to step 1124.

At step 1134, it is determined whether the packed data instruction is the EMMS instruction. Thus, step 1134 is similar to step 430 from FIG. 4B. If the packed data instruction is the EMMS instruction, flow passes to step 1136. Otherwise, flow passes to step 1138. As previously described, the EMMS instruction is used for altering the floating point tags to an initialization state and should be executed after executing any packed data instructions and/or prior to executing any floating point instructions to transition the processor to the floating point mode.

As shown in step 1136, all tags are altered to the empty state. In this manner, the tags have been initialized and are prepared for the execution of floating point instructions. Upon completion of step 1136, flow passes to step 1144. In an embodiment in which the EMMS instruction is not implemented, step 1134 and 1136 would be absent and flow would pass from step 1114 to step 1138.

As shown in step 1138, the packed data instruction is executed. During this step, 1's are stored in the sign and exponent fields of any FP registers or any buffer registers acting as FP/PD registers to which packed data is written to. Thus, step 1138 is similar to steps 434, 436, and 438 from FIG. 4B. Doing so promotes good programming techniques by encouraging the separation of floating point and packed data instructions. However, as previously described, alternate embodiments could avoid implementing this feature. While in one embodiment 1's are written into the sign and exponent fields, alternative embodiments could use any value representing NAN (not a number) or infinity. In addition, this step is performed without generating any numeric exceptions. If any memory events are generated as a result of attempting to execute the packed data instruction, execution is interrupted and the event is serviced. From step 1138, flow passes to step 1144.

In one embodiment, the following steps are performed in the retirement stage(s) of the pipeline.

At step 1124, it is determined if the instruction is an event signal micro op indicating the device not available exception. If so, it was determined in step 1112 that either or both of the TS and EM indications were equal to 1. Thus, if the instruction is an event signal micro op indicating the device not available exception, flow passes to step 1126. Otherwise, flow passes to step 1128. In this manner, the device not available exception may be incorporated into a processor that utilizes register renaming.

At step 1126, the device not available exception is generated and the corresponding event handler is executed. Thus, step 1126 is similar to step 416 from FIG. 4A. As previously described, this event handler may be implemented to use the EM and TS indication to determine whether to emulate the floating point instruction and/or whether a partial context switch was performed. As also previously described, the use of the EM and TS indications are a software convention, and may therefore be used for other purposes.

As shown in step 1144, it is determined if the EM indication is equal to one. Thus, step 1144 is similar to step 414 from FIG. 4A. If it is determined in step 1144 that the EM indication is equal to one, flow passes to step 1146 rather than step 1126. Otherwise, flow passes to step 1148.

At step 1146, the invalid opcode exception is generated and the appropriate event handler is executed. This is the same invalid opcode exception that was described with reference to step 1110 of FIG. 11A. The generation of the invalid opcode exception is similar to the invalid opcode exception generated in step 406 of FIG. 4A. As previously described with reference to step 215 in FIG. 2, this event handler may be implemented to cause the processor to display a message, abort execution of the current task, and go on to execute other tasks. Of course, alternative embodiments may implement this handler in any number of ways that were previously described. By diverting the attempted execution of the packed data instruction while EM is equal to 1 to the invalid opcode exception, the embodiment remains operating system invisible.

While one embodiment has been described for handling the EM indication in a manner which is operating system invisible, alternative embodiments could use other techniques. For example, an alternative embodiment could either generate the device not available exception, a different existing event, or a new event in response to the attempted execution of a packed data instruction while the EM indication is equal to 1. As another example, an alternative embodiment could ignore the EM indication when executing packed data instructions.

As shown in step 1148, it is determined if the TS indication is equal to one (according to the described software convention, if a partial context switch was performed). If a partial context switch was performed, flow passes to step 1126. Otherwise, flow passes to step 1150.

As previously described, at step 1126 the device not available exception is generated and the corresponding event handler is executed. Thus, in response to this event, the corresponding event handler may be implemented to poll the EM and TS indications. However, when packed data instructions are executed, flow passes through step 1144 and situations where the EM indication is equal to one are diverted to the invalid opcode exception. As a result, when packed data instructions are being executed and step 1126 is reached, the EM indication must be equal to 0 and the TS indication must be equal to 1. Since the TS indication is equal to 1, the event handler functions as previously described with reference to partial context switches and causes the processor to resume execution by restarting execution of the instruction received in step 1102. Since the packed data state is aliased on the floating point state, this event handler works for both the floating point and the packed data state. As a result, this method remains operating system invisible. Of course, alternate embodiments may implement this event handler in any number of ways as previously described. While one embodiment has been described for handling TS indication in a manner which is operating system invisible, alternative embodiments could use other techniques as previously described.

As previously described, if certain numeric errors are generated during the execution of a floating point instruction, those errors are held pending until the attempted execution of the next floating point instruction whose execution can be interrupted to service them. As shown in both steps 1128 and 1150, it is determined whether there are any such pending errors that can be serviced. Thus, these steps are similar to steps 420 and 422 from FIG. 4A. If there are any such pending errors, flow passes from both steps 1128 and 1150 to step 1130. However, if it is determined in step 1128 that there are no such pending errors, flow passes to step 1132. In contrast, if it is determined in step 1150 that there are no such pending errors, flow passes to step 1152. In an alternative embodiment, step 1150 is not performed and the floating point error is left pending during the execution the packed data instruction.

At step 1130, a pending floating point error event is generated. Thus, step 1130 is similar to step 424 from FIG. 4A. As previously described with reference to step 424 from FIG. 2, this event may be treated as either an internal event or an external event and serviced accordingly.

As shown in step 1152, it is determined whether the processor is in the packed data mode. If the processor is in the packed data mode, the execution of the packed data instruction has been successfully completed and flow passes to step 1132. However, if the processor is not in the packed data mode, the packed data instruction has been executed in the floating point mode. As a result, the execution of the packed data instruction is not accurate. To remedy this, the processor must be switched from the floating point mode to the packed data mode and the packed data instruction must be re-executed. To this end, if the processor is not in the packed data mode, flow passes to step 1154. The determination in step 1152 can be performed in any number of ways. For example, a mode indication as previously described with reference to FIG. 6A could be used. As another example, the top of stack indication and the tags could be polled. If the top of stack indication is in the initialization state and all of the tags are in the non-empty state, then the processor is in the packed data mode. However, if the top of stack indication is not in the initialization state or all of the tags are not in the non-empty state, the processor is not in the packed data mode.

At step 1154, the processor is transitioned from the floating point mode to the packed data mode and flow passes to step 1156. In step 1154, the processor is transitioned from the floating point mode to the packed data mode by altering all the tags to the non-empty state and altering the top of stack indication to the initialization value. Altering all the tags to the non-empty state promotes good programming techniques in that it encourages the separate grouping of floating point and packed data instructions. In addition, from an operating system compatibility perspective, certain operating system techniques store the contents of only those floating point registers whose corresponding tags indicate a non-empty state. Thus, in an embodiment in which the packed data state is aliased on the floating point state, altering all tags to the non-empty state causes such operating systems to preserve the packed data state as if it were the floating point state. Alternative embodiments could be implemented to be compatible with less of these operating system techniques. For example, if an operating system does not utilize the tags, an embodiment that does not implement the tags would still be compatible with that operating system. Altering the top of stack indication to zero is used for performing efficient programming techniques as previously described. In addition, altering the top of stack indication to the initialization value and not altering the top of stack indication during the execution of the packed data instructions allows the same circuitry to be used to operate the FP/PD registers as a floating point stack and as a fixed register file as previously described with reference to FIG. 10. Since the floating point and packed data states are aliased on a single register file, transitioning does not require data to be copied between separate floating point and packed data register files. This reducing the amount of time required to transition between the floating point and packed data modes. As previously described, the floating point to packed data transition can be implemented in microcode. In an alternative embodiment, the execution of each packed data instruction alters the top of stack indication to the initialization value.

As shown in step 1156, the instruction received in step 1102 is restarted by performing a micro-restart. Since a micro-restart is used, execution of the current task can be resumed without any action being taken external to the processor—no non-microcode event handlers need to be executed. In this manner, this embodiment is compatible with existing operating systems. Alternative embodiments could be implemented to be less compatible. For example, an additional event could be incorporated into the processor and an additional event handler could be added to the operating system to perform this transition.

At step 1132, the state of the buffer registers is committed to their corresponding FP/PD or integer registers. Upon completion of step 1132, the processor is free to continue execution.

Thus, a method for executing packed data instructions that is compatible with existing operating system and that promotes good programming techniques is described. Since the packed data state is aliased on the floating point state, the packed data state will be preserved and restored by existing operating systems as if it was the floating point state. Furthermore, since events generated by the execution of the packed data instructions are serviceable by existing operating system handlers, these event handlers need not be modified and new event handlers need not be added. As a result, the processor is backwards compatible and upgrading does not require the cost and time required to develop or modify an operating system.

Variations of this embodiment, some of which were described, may be fully or partially compatible with such operating systems and/or promote good programming techniques. For example, alternative embodiment may move, alter, and/or remove one or more steps from this flow diagram. If certain steps are removed from FIGS. 11A, 11B and/or 11C, certain hardware would not be required in FIG. 10. For example, if the TS indication is not utilized, the TS indication is not required. Of course, the invention could be useful for any number of system architectures and is not limited to the architecture described herein.

Figure 12A:
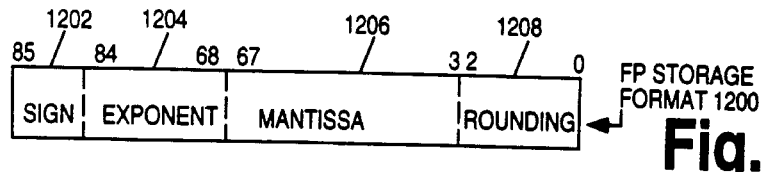
FIG. 12A illustrates a floating point storage format according to one embodiment of the invention described with reference to FIG. 10.
Figure 12B:
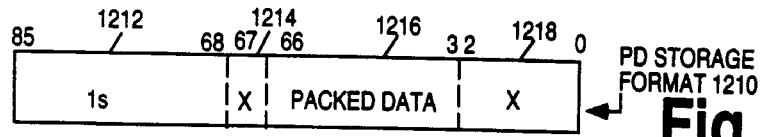
FIG. 12B illustrates the storage format for packed data according to the embodiment of the invention described with reference to FIG. 10.
Figure 12C:
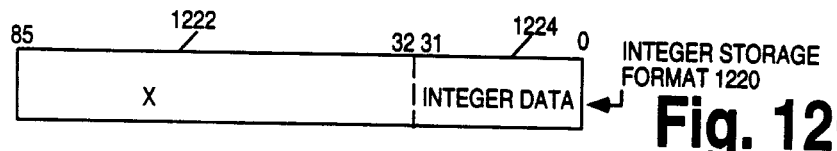
FIG. 12C illustrates a storage format for integer data in accordance with the embodiment of the invention described with reference to FIG. 10.

FIGS. 12A, 12B, and 12C illustrate the storage formats for storing floating point data, packed data, and integer data according to the embodiment described with reference to FIG. 10. Of course, alternative embodiments could use any number of different storage formats for storing floating point data, packed data and integer data.

FIG. 12A illustrates a floating point storage format according to one embodiment of the invention described with reference to FIG. 10. FIG. 12A shows a floating point storage format 1200 including a sign field 1202 comprising bit 85, and exponent field 1204 comprising bits [84:68], a mantissa field 1206 comprising bits [67:3], and a rounding field 1208 comprising its [2:0]. As previously described, the same floating point instructions used for storing the floating point state in memory when performing task switches must also work for storing any packed data state aliased on the floating point registers. In one embodiment, the processor does not store the rounding bits in the rounding field 1028. As a result, the packed data must be stored somewhere within the mantissa field 1206 of the floating point storage format 1200.

FIG. 12B illustrates the storage format for packed data according to the embodiment of the invention described with reference to FIG. 10. FIG. 12B shows a packed data storage format 1210 including a sign/exponent field 1212 comprising bits [85:68], a first reserved field 1214 comprising bit [67], a packed data field 1216 comprising bits [66:3], and a second reserved field 1218 comprising bits [2:0]. As previously described, all 1's are stored in the sign/exponent field 1212 when packed data is written into a register. Also as previously described, the packed data field 1216 is aliased on the mantissa field 1206 so that the existing floating point instructions will stored the packed data state. In one embodiment, the first and second reserved fields 1214 and 1218 are written to zero when packed data is written into a register. While one embodiment of the invention has been described in which the packed data field 1216 of the packed data storage format 1210 starts at the same bit location as the mantissa field 1206 of the floating point storage format 1200, alternative embodiments could alter this relationship.

FIG. 12C illustrates the storage format for integer data in accordance with the embodiment of the invention described with reference to FIG. 10. FIG. 12C shows an integer data storage format 1220 including an reserved field 1222 comprising bits [85:32], and an integer data field 1224 comprising bits [31:0]. While one embodiment is described in which integer data is stored in 32 bits, an alternative embodiment could be implemented to store integer data in one or more formats using in any number of bits. For example, alternative embodiments could support a 64-bit format. In one embodiment, each of the integer registers 1024 that is software visible includes only 32 bits. As a result, the integer storage format 1220 is used only in the buffer registers 1020.

Figure 13:
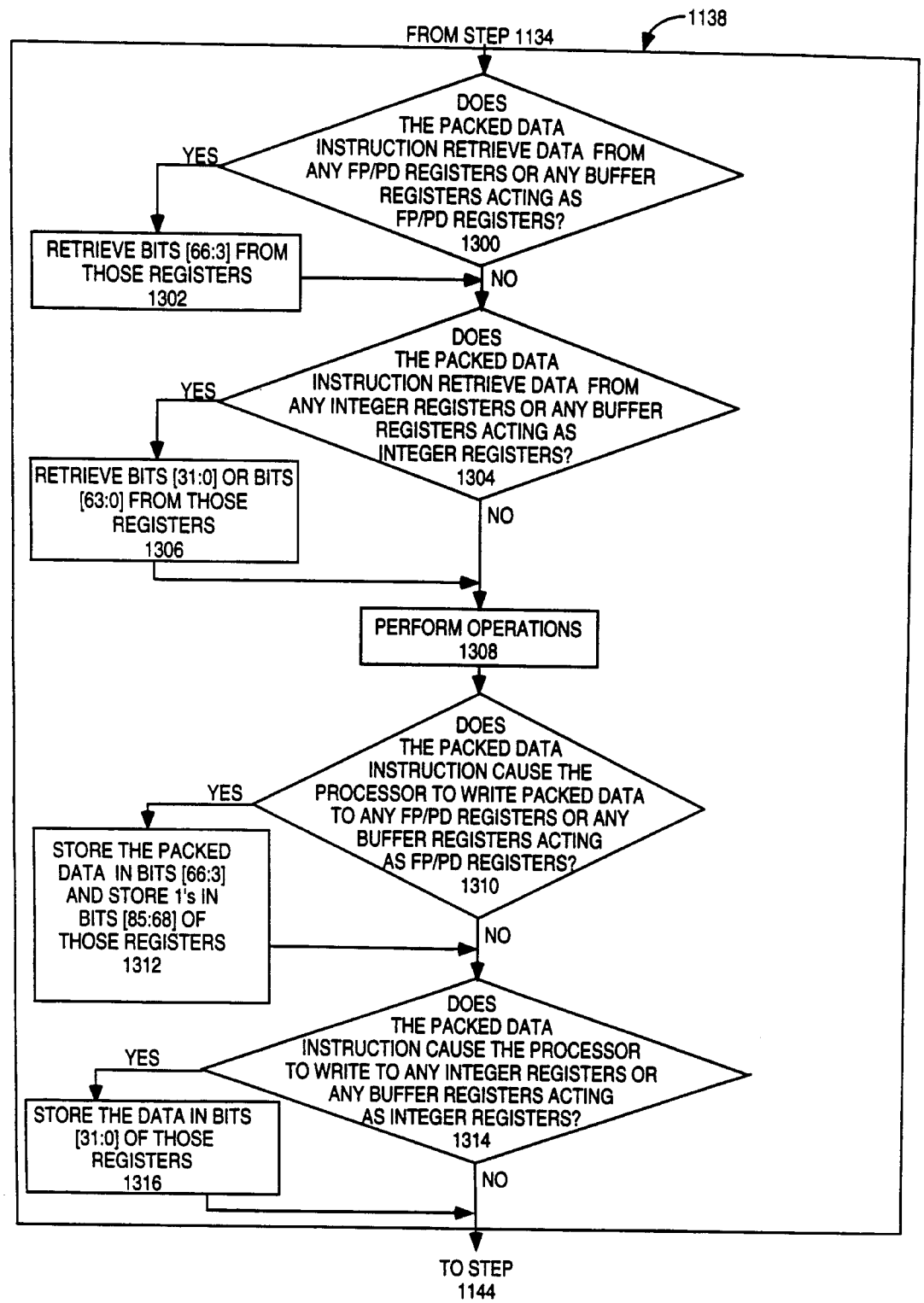
FIG. 13 illustrates a method, according to one embodiment of the invention, for performing step 1138 from FIG. 11B when the storage formats described with reference to FIGS. 12A, 12B, and 12C are implemented.

FIG. 13 illustrates a method, according to one embodiment of the invention, for performing step 1138 from FIG. 11B when the storage formats described with reference to FIGS. 12A, 12B, and 12C are implemented. Flow passes from both step 1138 to step 1300.

At step 1300, it is determined whether the packed data instruction retrieves packed data from any FP/PD registers on any buffer registers acting as FP/PD registers. If so, flow passes to step 1302. Otherwise, flow passes to step 1308.

As shown in step 1302, the bits [66:3] from those aliased buffer or FP/PD registers are retrieved and flow passes to step 1308. This step is necessary in that the packed data is not stored starting at bit zero, but is stored starting at bit 3 as shown in FIG. 12B. As a result, bits [2:0] must be discarded. In one embodiment, this step is performed by the data alignment unit 1090 from FIG. 10. In this embodiment, the data is transferred from the retirement unit 1006, through the issue unit 1008, and to the execution unit 1010 in the format shown in FIG. 12B. Thus, data is received by the execution unit 1010 in the format shown in FIG. 12B and the data alignment unit 1090 is enabled to extract bits [66:3]. While FIG. 10 shows a single data alignment unit, in one embodiment each functional unit in the execution unit 1010 that operates on packed data includes a data alignment unit for extracting bits [63:3]. Since the data is aligned in the execution unit 1010, the use of the packed data format is transparent to the rest of the processor. The data alignment unit(s) can be implemented to access bits [66:3] using any number of techniques. For example, in one embodiment the data alignment unit(s) is designed to shift to the right by three bits all packed data retrieved from the FP/PD registers or the buffer registers acting as FP/PD registers. In an alternative embodiment, the retirement or issue units could be implemented to strip away bits [2:0] and/or bits [85:67]. As another example, an alternative embodiment could be implemented such that the packed data is stored starting at bit zero.

At step 1304, it is determined whether the packed data instruction retrieves packed data from any integer registers or any buffer registers acting as integer registers. If so, flow passes to step 1306. Otherwise, flow passes to step 1308.

As shown in step 1306, the bits [31:0] from those aliased buffer or integer registers are retrieved and flow passes to step 1308. This step is necessary in that the data is stored starting at bit zero. As previously described, in one embodiment this step is performed by the data alignment unit 1090 from FIG. 10. In this embodiment, the data is transferred from the retirement unit 1006, through the issue unit 1008, and to the execution unit 1010. If the data is accessed from the buffer registers 1020, the data is received by the execution unit 1010 in the format shown in FIG. 12C and the data alignment unit(s) is enabled to extract bits [31:0]. However, if the data is accessed from the integer registers 1024 in an embodiment in which the integer registers 1024 are 32-bit registers, the data is received by the execution unit 1010 in the 32-bit format. In either case, the 32-bits of data may be treated as any of the 64-bits of a the packed data item. For example, a first move instruction could be implemented to move 32 bits from an integer register to the upper bits a packed data item, while a second move instruction could be implemented to move 32 bits from an integer register to the lower 32 bits of a packed data item.

As shown in step 1308, the operations required by the instruction are performed and flow passes to step 1310.

At step 1310, it is determined whether the packed data instruction causes the processor to write to any FP/PD registers or any buffer registers acting as FP/PD registers. If so, flow passes to step 1312. Otherwise, flow passes to step 1314.

If the packed data instruction causes the processor to write to any FP/PD registers or buffer registers acting as FP/PD registers, the data must be stored in the proper format. Thus, at step 1312 the packed data is stored in bits [66:3] of those FP/PD or buffer registers. In one embodiment, the data alignment unit 1090 from FIG. 10 is again employed. Again, there are a number of techniques for performing this functions. For example, the data alignment unit(s) could be implemented to shift the data to the left by three bits, pad bits [2:0] with zeros, pad bit [67] with zero, and store 1's in bits [85:68]. In an alternative embodiment, the retirement unit could be implemented to store the data in this format.

At step 1314, it is determined whether the packed data instruction causes the processor to write to any integer registers or any buffer registers acting as integer registers. If so, flow passes to step 1316. Otherwise, flow passes to step 1144.

If the packed data instruction causes the processor to write to any integer registers or buffer registers acting as integer registers, the packed data must be stored in the proper integer storage format. Thus, at step 1316 the data is in the integer registers as bits [31:0] or in the buffer registers as bits [63:0] or [31:0] (depending on the implementation). Since there are 64-bits of data, any 32-bits of the data may be stored in those registers. For example, a first move instruction could be implemented to move the upper bits of a packed data item into an integer register, while a second move instruction could be implemented to move the lower 32 bits of a packed data item into an integer register. In one embodiment, this step is again performed by the data alignment unit 1090 from FIG. 10. Of course, any number of techniques could be used for implementing step 1316, including those previously described.

In this manner, the storage formats used by the different types of data are properly aligned in the registers of the processor. In one embodiment, the same storage formats are used in the buffer registers 1020 that are used in the FP/PD registers 1022 and the integer registers 1024. Of course, alternative embodiments could use any number of different storage formats, and thus, such alternative embodiments would still be within the scope of the invention. For example, one alternative embodiment uses these data storage formats in the set of buffer registers 1020 and uses different data storage formats in the registers visible to the software (e.g., FP/PD registers 1022 and integer registers 1024).

As previously described, transitioning between the floating point and packed data mode can be time consuming and is not an efficient programming practice. To aid programmers in determining if they are performing many such transitions, different performance monitoring techniques can be used. For example, in one embodiment a performance monitor counter is used. A performance monitor counter is visible to the programmer and counts the number of time different conditions are met in the processor. In one embodiment of the invention, one of these conditions is transitions between the floating point and packed data modes. In this manner, the programmer can learn how many transitions a program requires. For further information concerning program counters, see "Apparatus for Monitoring the Performance of a Processor" U.S. Ser. No. 07/883,845, by, Robert S. Dreyer, et al.

Because prior art floating point processors do not allow direct manipulation of the floating point tags, an emulation of the EMMS instruction using floating point instructions may be performed.

FIG. 14 is a flow diagram illustrating a method for clearing the tags according to one embodiment of the invention. This flow diagram commences at step 1402 by storing the floating point environment at a predetermined location in memory. This is performed using the FNSAVE or FSAVE instruction in the Intel Architecture processor. Once this has been performed, the tag and/or TOS portions of the predetermined memory location to which the environment was stored may be modified to its empty state at step 1404. This is performed using any number of prior instructions, including MOV instructions with immediate operands for the appropriate bit pattern for the tag and TOS bits. Any other appropriate instruction which would set the tag and TOS portions of the predetermined memory location to an empty state may be used. Subsequently, the environment may then be reloaded at step 1406 from the modified predetermined memory location. Because the other portions of the environment (such as the control word, status word, etc.) should be left unmodified, only modifying the floating point tags, the remainder of the environment is left unchanged from the store environment operation 1402. Note further that in order to prevent any unanticipated interrupt from occurring, this embodiment of the process may be performed using any known prior technique, including the use of instructions which disable interrupts (e.g., FNSTENV). At any rate, because the environment has now been reloaded using any prior art technique such as FRSTOR or FLDENV, the environment has now been reloaded with only the floating point tags modified to their empty state. Note further that step 1404 may further include an additional step which clears the portion of the floating point environment which includes the top of stack indication stored in top of stack field 350.

In yet another alternative embodiment, the EMMS instruction may be emulated by popping the floating point registers a sufficient number of times until all the tag bits are empty. In either event, EMMS may be performed as a dedicated instruction or it may be emulated, and either method is within the teachings of this disclosure.

Figure 15A:
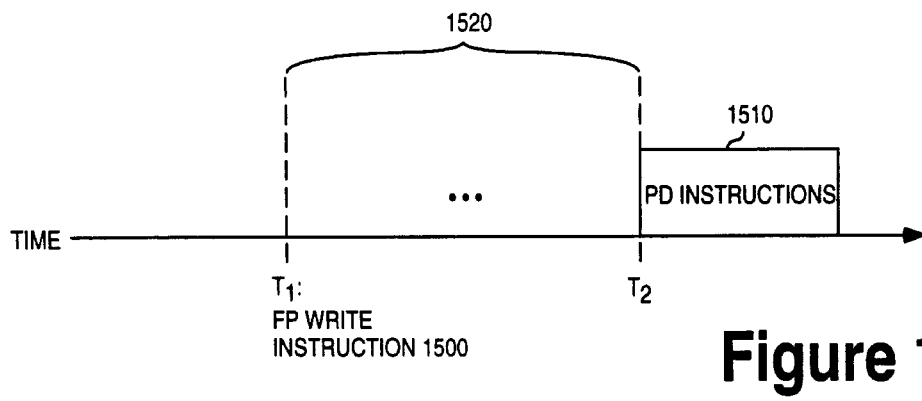
FIG. 15A shows an execution stream including packed data and floating point instructions to illustrate the interval of time during which separate physical register files that are aliased may be updated.

FIGS. 15A shows an execution stream, including packed data and floating point instructions, to illustrate the interval of time during which separate physical register files that are aliased may be updated. FIG. 15A shows a floating point instruction 1500 followed by a set of packed data instructions 1510. In addition, FIG. 15A shows the floating point instruction 1500 is executed at time T1, while the execution of the set of packed data instructions 1510 starts at time T2. Execution of the floating point instruction 1500 causes the processor to write a value to a floating point register. An interval 1520 marks the time between time T1 and time T2 during which this value must be aliased. For example, in one embodiment described with reference to FIGS. 6A–9 in which separate physical register files are used for executing floating point and packed data instructions, the floating point state is not copied from the physical floating point registers into the corresponding physical packed data registers until time T2 (assuming another value is not written to the same floating point register prior to time T2). In contrast, when a single physical register file is used (the embodiments described with reference FIGS. 10–11C), the floating point value is stored in the aliased register at time T1.

Thus, the two extremes of the interval 1520 are described. However, alternative embodiments could be implemented that alias the registers any time during the interval 1520. For example, alternative embodiments that use separate physical register files for executing floating point and packed data instructions could be implemented such that data written to the floating point physical register file is also written to the packed data physical register file at time T1. In one embodiment that writes the value to both physical register files at the same time (e.g., time T1), that portion of the transition unit that copies the data from the floating point registers to the packed data registers may be implemented as hardware (of course, alternative embodiments may use software, firmware and/or hardware). As another example, alternative embodiments that use separate physical register files for executing floating point and packed data instructions could be implemented such that data written to the floating point physical register file is written to the packed data physical register file when free processing time is available during interval 1520 (but sometime before time T2). In this manner, these embodiments may reduce the transition time.

Figure 15B:
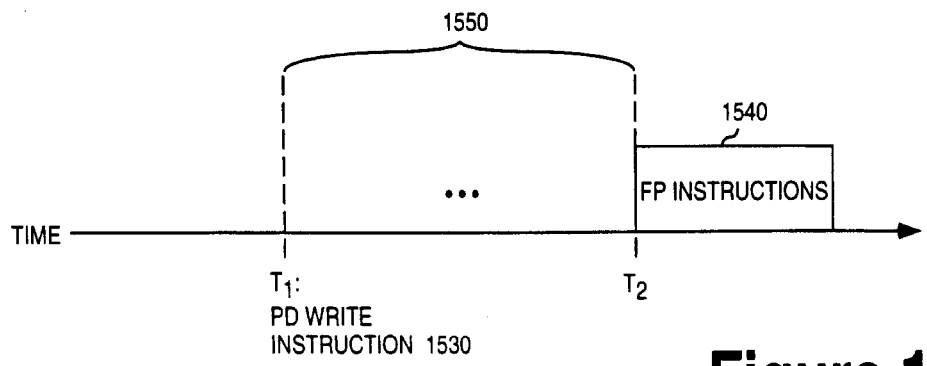
FIG. 15B shows another execution stream including packed data and floating point instructions to illustrate the interval of time during which separate physical register files that are aliased may be updated.

FIGS. 15B shows an execution stream, including packed data and floating point instructions, to illustrate the interval of time during which separate physical register files that are aliased may be updated. FIG. 15A is similar to FIG. 15B, except a packed data instruction 1530 is followed by a set of floating point instructions 1540. FIG. 15A shows the packed data instruction 1530 is executed at time T1, while the execution of the set of floating point instructions 1540 is started at time T2. Execution of the packed data instruction 1530 causes the processor to write a value to a packed data register. An interval 1550 marks the time between time T1 and time T2 during which this value must be aliased. All of the alternative embodiments described with reference to FIG. 15A (with reference to a floating point instruction followed by packed data instructions) may also be implemented with reference to FIG. 15B (with reference to a packed data instructions followed by floating point instructions).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. In a computer system, a method comprising the steps of:
   receiving a first instruction which specifies a packed data operation to be performed upon data stored in a register file, wherein a plurality of tags are associated with said register file are maintained to indicate whether locations in said register file are either empty or non-empty responsive to execution of floating point instructions which modify data contained in said register file;
   responsive to receiving said first instruction setting all of said plurality of tags to a non-empty state;
   receiving a second instruction which marks the end of a set of instructions which specify packed data operations to be performed upon data stored in said logical register file; and
   responsive to said receiving of said second instruction, setting only said plurality of tags to an empty state.

2. The method of claim 1 further comprising the step of clearing a top of stack pointer responsive to said receiving said first instruction or said second instruction.

3. The method of claim 1 wherein each register in said register file includes a mantissa portion and a corresponding exponent portion, and packed data is stored in the mantissa portion of a resister in said register file.

4. The method of claim 3 further comprising the step of setting said corresponding exponent portion to a predetermined value responsive to said receiving of said first instruction.

5. The method of claim 1 wherein each of said plurality of tags includes two bits.

6. The method of claim 5 wherein said setting of only said plurality of tags to an empty state includes setting said two bits to a set state.

7. The method of claim 6 wherein said setting of only said plurality of tags to a non-empty state includes setting both of said two bits to other than set state.

8. In a computer system, a method comprising the steps of:
   receiving a first instruction which marks the end of packed data instructions which operate upon data stored in a software visible register file, wherein a plurality of tags associated with said software visible register file indicate whether locations in said first storage area software visible register file are either empty or non-empty responsive to execution of floating point instructions which modify data contained in said software visible register file; and
   responsive to receiving said first instruction, setting only said plurality of tags to an empty state.

9. The method of claim 8 further comprising the step of setting all of said plurality of tags to a non-empty state responsive to receiving a second instruction which specifies a packed data operation to be performed upon data stored in said software visible register file, said setting of said plurality of tags indicating execution of instructions which specify packed data operations.

10. The method of claim 9 wherein each register in said software visible register file includes a mantissa portion and a corresponding exponent portion, and packed data is stored in the mantissa portion.

11. The method of claim 10 further comprising the step of storing a predetermined value in the corresponding exponent portion of each register written responsive to said receiving of said second instruction.

12. The method of claim 8 further comprising the step of clearing a top of stack pointer responsive to said receiving said first instruction.

13. The method of claim 9 further comprising the step of clearing a top of stack pointer responsive to said receiving said first instruction or said second instruction.

14. The method of claim 8 wherein each register in said software visible register file includes a mantissa portion and a corresponding exponent portion, and packed data is stored in the mantissa portion of registers in said software visible register file.

15. The method of claim 8 wherein each of said plurality of tags includes two bits.

16. The method of claim 15 wherein said setting of only said plurality of tags to an empty state includes setting said two bits to a set state.

17. The method of claim 16 wherein said setting of only said plurality of tags to a non-empty state includes setting both of said two bits to other than said set state.

18. A method comprising the computer-implemented steps of:
   executing both floating point and packed data instructions that address the same registers of an architecturally visible register file having N registers, wherein the N registers of the architecturally visible register file may be implemented using N or more physical registers; and
   executing a single instruction after executing packed data instructions and before executing floating point instructions that causes the alteration of tags associated with the architecturally visible register file to indicate the registers are empty.

19. The method of claim 18, said step of executing said single instruction does not cause the alteration of other information related to exceptions associated with performing operations on data stored in said architecturally visible register file.

20. The method of claim 18, wherein said step of executing said single instruction also causes the clearing of a top of stack indication used for executing said floating point instructions.

21. The method of claim 18, further comprising the step of:

altering all the tags to indicate the registers are non-empty responsive to executing any packed data instruction.

22. A method comprising the computer-implemented steps of:

executing both floating point and packed data instructions that address the same registers of an architecturally visible register file having N registers, wherein the N registers of the architecturally visible register file may be implemented using N or more physical registers, wherein the floating point instructions address the architecturally visible register file in a stack referenced manner, while the packed data instructions address the architecturally visible register file in a non-stack referenced manner;

executing a single instruction after executing packed data instructions and before executing floating point instructions that prepares the architecturally visible register file for executing floating point instructions by causing the alteration of tag for each register in the architecturally visible register file to indicate the corresponding register is empty.

23. The method of claim 22, wherein said step of executing said single instruction further includes the step of resetting a top of stack pointer.

24. The method of claim 23, wherein said step of executing said single instruction does not cause the alteration of other control and status information related to the architecturally visible register file.

25. The method of claim 22 further comprising the step of:

altering all the tags to indicate the corresponding registers are non-empty response to executing any of said packed data instructions.

* * * * *

UNITED STATES PATENT AND TRADEMARK OFFICE
CERTIFICATE OF CORRECTION

PATENT NO.   : 5,940,859
DATED        : August 17, 1999
INVENTOR(S)  : Bistry et al.

It is certified that error appears in the above-identified patent and that said Letters Patent is hereby corrected as shown below:

Column 1,
Line 62, delete "20" before the word "provided".

Column 11,
Line 25, delete "Ti" and insert -- T1 --.

Column 16,
Line 47, delete "riot" and insert -- not --.

Column 18,
Line 31, TABLE 1, under "Tag bits", delete "00, 01" and insert -- 00, 11 --.

Column 19,
Line 39, delete "Microsoft>" and insert -- Microsoft® --.

Column 21,
Line 59, delete "end" and insert -- and --.

Column 26,
Line 28, delete "embodiment.," and insert embodiment, --.

Column 38,
Line 57, delete "Lo" and insert -- to --.

Column 45,
Line 12, delete "Ts" and insert -- TS --.

Column 53,
Line 63, delete "resister" and insert -- register --.

UNITED STATES PATENT AND TRADEMARK OFFICE
CERTIFICATE OF CORRECTION

PATENT NO.  : 5,940,859
DATED       : August 17, 1999
INVENTOR(S) : Bistry et al.

It is certified that error appears in the above-identified patent and that said Letters Patent is hereby corrected as shown below:

Column 54,
Lines 15-16, delete "first storage area" after the word "said".

Signed and Sealed this

Seventh Day of September, 2004

JON W. DUDAS
*Director of the United States Patent and Trademark Office*